US009460387B2

(12) United States Patent
Sinyavskiy et al.

(10) Patent No.: US 9,460,387 B2
(45) Date of Patent: Oct. 4, 2016

(54) APPARATUS AND METHODS FOR IMPLEMENTING EVENT-BASED UPDATES IN NEURON NETWORKS

(75) Inventors: Oleg Sinyavskiy, San Diego, CA (US); Eugene Izhikevich, San Diego, CA (US)

(73) Assignee: QUALCOMM TECHNOLOGIES INC., San Diego, CA (US)

( * ) Notice: Subject to any disclaimer, the term of this patent is extended or adjusted under 35 U.S.C. 154(b) by 296 days.

(21) Appl. No.: 13/588,774

(22) Filed: Aug. 17, 2012

(65) Prior Publication Data

US 2014/0052679 A1    Feb. 20, 2014

(51) Int. Cl.
*G06N 3/10* (2006.01)
*G06N 3/04* (2006.01)

(52) U.S. Cl.
CPC ............... *G06N 3/10* (2013.01); *G06N 3/049* (2013.01)

(58) Field of Classification Search
None
See application file for complete search history.

(56) References Cited

U.S. PATENT DOCUMENTS

| | | | |
|---|---|---|---|
| 5,063,603 A | 11/1991 | Burt | |
| 5,355,435 A | 10/1994 | DeYong | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |
| 6,458,157 B1 | 10/2002 | Suaning | |
| 6,545,705 B1 | 4/2003 | Sigel | |
| 6,545,708 B1 | 4/2003 | Tamayama | |
| 6,546,291 B2 | 4/2003 | Merfeld | |
| 6,581,046 B1 | 6/2003 | Ahissar | |
| 7,536,374 B2 | 5/2009 | Au | |
| 7,849,030 B2 | 12/2010 | Ellingsworth | |
| 8,015,130 B2 | 9/2011 | Matsugu | |

(Continued)

FOREIGN PATENT DOCUMENTS

| CN | 102226740 | 10/2011 |
|---|---|---|
| CN | 102226740 A | 10/2011 |

(Continued)

OTHER PUBLICATIONS

Khotanzad, Alireza, and J-H. Lu. "Classification of invariant image representations using a neural network." Acoustics, Speech and Signal Processing, IEEE Transactions on 38.6 (1990): 1028-1038.*

(Continued)

*Primary Examiner* — Kakali Chaki
*Assistant Examiner* — Daniel Pellett
(74) *Attorney, Agent, or Firm* — Seyfarth Shaw LLP

(57) ABSTRACT

Event-based updates in artificial neuron networks may be implemented. An internal event may be defined in order to update incoming connections of a neuron. The internal event may be triggered by an external signal and/or internally by the neuron. A reinforcement signal may be used to trigger an internal event of a neuron in order to perform synaptic updates without necessitating post-synaptic response. An external event may be defined in order to deliver response of the neuron to desired targets. The external and internal events may be combined into a composite event configured to effectuate connection update and spike delivery to post-synaptic target. The scope of the internal event may comprise the respective neuron and does not extend to other neurons of the network. Conversely, the scope of the external event may extend to other neurons of the network via, for example, post-synaptic spike delivery.

29 Claims, 39 Drawing Sheets

(56) References Cited

U.S. PATENT DOCUMENTS

| | | | |
|---|---|---|---|
| 8,103,602 B2 | 1/2012 | Izhikevich | |
| 8,315,305 B2 | 11/2012 | Petre | |
| 8,467,623 B2 | 6/2013 | Izhikevich | |
| 2002/0038294 A1 | 3/2002 | Matsugu | |
| 2003/0050903 A1 | 3/2003 | Liaw | |
| 2004/0193670 A1 | 9/2004 | Langan | |
| 2005/0015351 A1 | 1/2005 | Nugent | |
| 2005/0036649 A1 | 2/2005 | Yokono | |
| 2005/0283450 A1 | 12/2005 | Matsugu | |
| 2006/0161218 A1 | 7/2006 | Danilov | |
| 2006/0224533 A1 | 10/2006 | Thaler | |
| 2007/0176643 A1 | 8/2007 | Nugent | |
| 2007/0208678 A1 | 9/2007 | Matsugu | |
| 2009/0043722 A1* | 2/2009 | Nugent | 706/25 |
| 2009/0287624 A1 | 11/2009 | Rouat | |
| 2010/0086171 A1 | 4/2010 | Lapstun | |
| 2010/0166320 A1 | 7/2010 | Paquier | |
| 2010/0299296 A1* | 11/2010 | Modha et al. | 706/25 |
| 2010/0299297 A1* | 11/2010 | Breitwisch et al. | 706/33 |
| 2011/0016071 A1 | 1/2011 | Guillen | |
| 2011/0106741 A1 | 5/2011 | Denneau | |
| 2011/0119214 A1* | 5/2011 | Breitwisch et al. | 706/33 |
| 2011/0119215 A1 | 5/2011 | Elmegreen | |
| 2011/0160741 A1 | 6/2011 | Asano | |
| 2012/0011090 A1 | 1/2012 | Tang | |
| 2012/0084240 A1* | 4/2012 | Esser et al. | 706/27 |
| 2012/0084241 A1* | 4/2012 | Friedman et al. | 706/27 |
| 2012/0109866 A1 | 5/2012 | Modha | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |
| 2013/0073500 A1 | 3/2013 | Szatmary | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0297539 A1 | 11/2013 | Piekniewski | |
| 2013/0297541 A1 | 11/2013 | Piekniewski | |
| 2013/0297542 A1 | 11/2013 | Piekniewski | |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325777 A1 | 12/2013 | Petre | |
| 2014/0032458 A1 | 1/2014 | Sinyavskiy | |
| 2014/0032459 A1 | 1/2014 | Sinyavskiy | |

FOREIGN PATENT DOCUMENTS

| | | |
|---|---|---|
| JP | 4087423 | 3/1992 |
| RU | 2108612 C1 | 4/1998 |
| RU | 2108612 | 10/1998 |
| RU | 2406105 | 10/2010 |
| RU | 2424561 | 7/2011 |
| RU | 2424561 C2 | 7/2011 |
| WO | 2008132066 | 6/2008 |
| WO | 2008083335 | 7/2008 |

OTHER PUBLICATIONS

Breiman, Leo. "Random forests." Machine learning 45.1 (2001): 5-32.*

Fu, Michael C. "Gradient estimation." Handbooks in operations research and management science 13 (2006): 575-616.*

Paugam-Moisy, Hélene, Régis Martinez, and Samy Bengio. "A supervised learning approach based on STDP and polychronization in spiking neuron networks." ESANN. 2007.*

Mitra, Srinjoy, Stefano Fusi, and Giacomo Indiveri. "A VLSI spike-driven dynamic synapse which learns only when necessary." Circuits and Systems, 2006. ISCAS 2006. Proceedings. 2006 IEEE International Symposium on. IEEE, 2006.*

Eurich, Christian W., et al. "Delay adaptation in the nervous system." Neurocomputing 32 (2000): 741-748.*

Paugam-Moisy, Hélene, Régis Martinez, and Samy Bengio. "Delay learning and polychronization for reservoir computing." Neurocomputing 71.7 (2008): 1143-1158.*

Belhadj, Bilel, et al. "FPGA-based architecture for real-time synaptic plasticity computation." Electronics, Circuits and Systems, 2008. ICECS 2008. 15th IEEE International Conference on. IEEE, 2008.*

Linares-Barranco, Alejandro, et al. "Inter-spike-intervals analysis of AER Poisson-like generator hardware." Neurocomputing 70.16 (2007): 2692-2700.*

Nelson, Sacha B., Per Jesper Sjöström, and Gina G. Turrigiano. "Rate and timing in cortical synaptic plasticity." Philosophical Transactions of the Royal Society of London. Series B: Biological Sciences 357.1428 (2002): 1851-1857.*

Florian, Răzvan V. "Reinforcement learning through modulation of spike-timing-dependent synaptic plasticity." Neural Computation 19.6 (2007): 1468-1502.*

Giulioni, Massimiliano, et al. "Robust working memory in an asynchronously spiking neural network realized with neuromorphic VLSI."*

Izhikevich, Eugene M., Joseph A. Gaily, and Gerald M. Edelman. "Spike-timing dynamics of neuronal groups." Cerebral cortex 14.8 (2004): 933-944.*

Ponulak, Filip, and Andrzej Kasinski. "Supervised learning in spiking neural networks with ReSuMe: sequence learning, classification, and spike shifting." Neural Computation 22.2 (2010): 467-510.*

Fidjeland, Andreas K., and Murray P. Shanahan. "Accelerated simulation of spiking neural networks using GPUs." Neural Networks (IJCNN), The 2010 International Joint Conference on. IEEE, 2010.*

Bohte, "Spiking Neural Networks" Doctorate at the University of Leiden, Holland, Mar. 5, 2003, pp. 1-133.*

Martin, S. J., P. D. Grimwood, and R. G. M. Morris. "Synaptic plasticity and memory: an evaluation of the hypothesis." Annual review of neuroscience 23.1 (2000): 649-711.*

Suri, Manan, et al. "Phase change memory for synaptic plasticity application in neuromorphic systems." Neural Networks (IJCNN), The 2011 International Joint Conference on. IEEE, 2011.*

Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.ewi.nl/-sbohte/publication/phdthesis.pdf>.

Brette et al., Brian: a simple and flexible simulator for spiking neural networks, The Neuromorphic Engineer, Jul. 1, 2009, pp. 1-4, doi: 10.2417/1200906.1659.

Cuntz et al., "One Rule to Grow Them All: A General Theory of Neuronal Branching and Its Paractical Application" PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online], 2010 [retrieved on Jun .15, 2013], Retrieved from the Internet: URL:http://ieeexplore.ieee.org/xpls/abs_all.jsp?arnmber=5596678&tag=1.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.

Gewaltig et al., NEST (Neural Simulation Tool), Scholarpedia, 2007, pp. 1-15, 2( 4 ): 1430, doi: 1 0.4249/scholarpedia.1430.

(56) References Cited

OTHER PUBLICATIONS

Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet<URL:http://www.google.com/url?sa=t&rct=j&g=Giuck+%22STIMULUS+GENERALIZATION+AND+REPRESENTATION+IN+ADAPTIVE+NETWORK+MODELS+OF+CATEGORY +LEARN I NG%22+ 1991&source=web&cd=9&ved=OCEwQFjA>.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, "Polychronization: Computation with Spikes", Neural Computation, 25, 2006, 18, 245-282.

Izhikevich, "Simple Model of Spiking Neurons", IEEE Transactions on Neural Networks, vol. 14, No. 6, Nov. 2003, pp. 1569-1572.

Izhikevich, "Relating STDP to BCM", Neural Computation 15, 1511-1523 (2003).

Karbowski et al., "Multispikes and Synchronization in a Large Neural Network with Temporal Delays", Neural Computation 12, 1573-1606 (2000).

Laurent, "The Neural Network Query Language (NNQL) Reference" [retrieved on Nov. 12, 2013]. Retrieved from the Internet: URL:http://nnql.org/nnql.org.

Laurent, "Issue 1—nnql—Refactor Nucleus into its own file—Neural Network Query Language" [retrieved on Nov. 12, 2013]. Retrieved from the Internet: URL:https://code.google.com/p/nnql/issues/detail?id=1.

Nichols, A Reconfigurable Computing Architecture for Implementing Artificial Neural Networks on FPGA, Master's Thesis, The University of Guelph, 2003, pp. 1-235.

Pavlidis et al. Spiking neural network training using evolutionary algorithms. In: Proceedings 2005 IEEE International Joint Conference on Neural Networks, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

Simulink® model [online], [Retrieved on Dec. 10, 2013] Retrieved from <URL: http://www.mathworks.com/products/simulink/index.html>.

Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8 (Russian Article with English Abstract).

Sjostrom J., W. Gerstner. Spike-Timing Dependent Plasticity. Scholarpedia, [Online], 2010, 5(2), 1362.

Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.1000879#>.

PCT International Search Report for PCT/US2013/055381 dated Nov. 14, 2013.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Gluck, Stimulus Generalization and Representation in Adaptive Network Models of Category Learning [online], 1991 [retrieved on Aug. 24, 2013]. Retrieved from the Internet<URL:http://www.google.com/url?sa=t&rct=j&q=Gluck+%22STIMULUS+GENERALIZATION+AND+REPRESENTATIO N+IN+ADAPTIVE+NETWORK+MODELS+OF+CATEGORY+LEARNING%22.

Fidjeland et al 'Accelerated Simulation of Spiking Neural Networks Using GPUs' WCCI 2010 IEEE World Congress on Computational Intelligience Jul. 18-23, 2010—CCIB, Barcelona, Spain, pp. 536-543, [retrieved on Nov. 14, 2012]. Retrieved from the Internet: <URL:http://www.doc.ic.ac.uki-mpsha/IJCNN10b.pdf>.

PCT International Search Report for PCT/US2013/052127 dated Dec. 26, 2013.

PCT International Search Report for PCT/US2013/032546 dated Jul. 11, 2013.

Sjostrom et al., 'Spike-Timing Dependent Plasticity' Scholarpedia, 5(2):1362 (2010), pp. 1-18.

Graham "The Surf Hippo User Manual Version 3.0 8". Unite de Neurosciences Integratives et Computationnelles Institut Federatif de Neurobiologie Alfred Fessard, CNRS. France. Mar. 2002 [retrieved Jan. 16, 2014]. [retrieved biomedical.univ-paris5.fr].

Sinyavskiy O. Yu.: 'Obuchenic s podkrepleniern spaikovoy neiroiniy seti v zadache upravleniya agentom v diskretnoy virtualnoy srede.' Nelineinaya Dinamika vol. T. 7., No. 24, 2011, pp. 859-875.

Aleksandrov (1968), Stochastic optimization, Engineering Cybernetics, 5, 1116.

Baras et al., (2007), Reinforcement learning, spike-time-dependent plasticity, and the BCM rule, Neural Comput 19, 22452279.

Bartlett et al., (2000), A biologically plausible and locally optimal learning algorithm for spiking neurons, Retrieved from http://arp.anu.edu.au/ftp/papers/jon/brains.pdf.gz.

Baxter et al., (2000), Direct gradient-based reinforcement learning, In Proceedings of the International Symposium on Circuits and Systems, (pp. III-271-274).

Bohte et al., (2000), SpikeProp: backpropagation for networks of spiking neurons, In Proceedings of ESANN'2000, (pp. 419-424).

Bohte (2005), A computational theory of spike-timing dependent plasticity: achieving robust neural responses via conditional entropy minimization, SEN-E0505.

Booij (2005), A Gradient Descent Rule for Spiking Neurons Emitting Multiple Spikes, Information Processing Letters n. 6, v.95, 552558.

El-Laithy (2011), A reinforcement learning framework for spiking networks with dynamic synapses, Comput Intell Neurosci.

Fletcher (1987), Practical methods of optimization, New York, NY: Wiley-Interscience, pp. 12-32.

Florian (2005), A reinforcement learning algorithm for spiking neural networks SYNASC '05 Proceedings of the Seventh International Symposium on Symbolic and Numeric Algorithms for Scientific Computing.

Fu (2008), What You Should Know About Simulation and Derivatives Naval Research Logistics, vol. 55, No. 8 , 723-736.

Gerstner (2002). Spiking neuron models: single neurons, populations, plasticity, Cambridge, U.K.: Cambridge University Press, pp. 2-3, 102-105.

Fu et al, (1995), "Likelihood ratio gradient estimation for regenerative stochastic recursion", Advances in Applied Probability, 27, 4, 1019-1053.

Glynn (1995), Likelihood ratio gradient estimation for regenerative stochastic recursions, Advances in Applied Probability, 27, 4, 10191053.

Izhikevich, 'Simple Model of Spiking Neurons', IEEE Transactions on Neural Networks, vol. 14, No. 6, Nov. 2003, pp. 1569-1572.

(56) References Cited

OTHER PUBLICATIONS

Izhikevich (2007), Solving the distal reward problem through linkage of STDP and dopamine signaling, Cerebral Cortex, vol. 17, pp. 244352.
Kiefer (1952), Stochastic Estimation of the Maximum of a Regression Function, Annals of Mathematical Statistics 23, #3, 462466.
Pfister (2003), Optimal Hebbian Learning: A Probabilistic Point of View, In ICANN Proceedings. Springer.
Larochelle et al., (2009), Exploring Strategies for Training Deep Neural Networks, J. of Machine Learning Research, v. 10, pp. 1-40.
Klampfl (2009), Spiking neurons can learn to solve information bottleneck problems and extract independent components, Neural Computation, 21(4), pp. 911-959.
Pfister (2006), Optimal Spike-Timing Dependent Plasticity for Precise Action Potential Firing in Supervised Learning, Neural computation ISSN 0899-7667, 18 (6).
Reiman et al. (1989), Sensitivity analysis for simulations via likelihood ratios. Oper Res 37, 830844.
Robbins (1951), A Stochastic Approximation Method, Annals of Mathematical Statistics 22, #3, 400407.
Kleijnen et al., "Optimization and sensitivity analysis of computer simulation models by the score function method", Invited Review European Journal of Operational Research, Mar. 1995.
Rumelhart et al., (1986), Learning representations by back-propagating errors, 38 Nature 323 (6088), pp. 533536.
Rumelhart (1986), Learning internal representations by error propagation, Parallel distributed processing, vol. 1 (pp. 318362), Cambridge, MA: MIT Press.
Sinyavskiy, et al. (2010), "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weight Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 52395244).
Weber et al., (2009), Goal-Directed Feature Learning, In: Proc, International Joint Conference on Neural Networks, 3319 3326.
Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Williams (1992), Simple Statistical Gradient-Following Algorithms for Connectionist Reinforcement Learning, Machine Learning 8, 229256.
Yi (2009), Stochastic search using the natural gradient, ICML '09 Proceedings of the 26th Annual International Conference on Machine Learning. New York, NY, USA.
Amari (1998), Why natural gradient?, Acoustics, Speech and Signal Processing, (pp. 1213-1216). Seattle, WA, USA.
Gluck, "Stimulus Generalization and Representation in Captive Network Models of Category Learning" Psychological Science, vol. 2, No. 1, Jan. 1991, pp. 50-55.
Fyfe et al., (2007), Reinforcement Learning Reward Functions for Unsupervised Learning, ISNN '07 Proceedings of the 4th international symposium on Neural Networks: Advances in Neural Networks.
PCT International Search Report and Written Opinion for Intl application No. PCT/ U52012/055933, dated Dec. 4, 2012.
Rosenstein M T et al., "Supervised learning combined with an actor-critic architecture," Technical Report 02-41, Department of Computer Science, University of Massachusetts, Amherst, Oct. 18, 2002, pp. 1-10.
International Search Report—PCT/US2013/055381—ISA/EPO—Nov. 21, 2013.
Sinyavskiy O.Y., et al., "Reinforcement Learning of a Spiking Neural Network in the task of Control of an Agent in a Virtual Discrete Environment", Nelin. Dinam., 2011, vol. 7, No. 4, pp. 859-875.

\* cited by examiner

```
1  DEFINE UNIT TeacherNeuron
2  {
3       // This may be a regular neuron, not detailed here
4  }
5
6  DEFINE UNIT InputNeuron
7  {
8       // This may be a regular neuron, not detailed here
9  }

10 DEFINE UNIT Neuron
11 {
12      INIT
13      {
14          float I = 0;
15          float v = 0;
16          float u = 0;
17          // initialize some more variables, if needed 18          bool teaching_signal = false;
19      }

20      UPDATE_RULE
21      {
22          CODE
23          {
24              // update neural dynamics. For e.g.:
25              v += -v*0.99;
26          }
27      }

28      EVENT_RULE
29      {
30          EXEC_CONDITION { v >= 1}
31          CODE
32          {
33              // reset neural dynamics,
34              // update local variables. For e.g.:
35              v = 0;

36              // automatically trigger POSTSYNAPTIC_EVENT
37              // _RULE defined in the synapse, and
38              // propagate the spike
39
40          }
```

42      DENDRITIC_EVENT_RULE
43      {
44          EXEC_CONDITION { teaching_signal }
45          CODE {
46              // reset dendritic values. For e.g.:
47              teaching_signal = false;

48              // automatically trigger DENRITIC_EVENT_RULE
49              // defined on the synapse, and does not
50              // propagate spikes
51          }
52      }
53  }

54  DEFINE SYNAPSE FeedForwardSynapse
55  {
56      INIT
57      {
58          float w = 0.0;
59          int t_in = 0;
60          int t_out = 0;
61      }
62      PRESYNAPTIC_EVENT_RULE
63      {
64          // Spike delivery
65          Unit.I += w;

66          // Log pre spike
67          t_in = Sys.Now;

68          // Update the synaptic efficacy - LTD
69          w += LTD( t_in, t_out ); // not detailed here 70      }
71      POSTSYNAPTIC_EVENT_RULE
72      {
73          // Log post spike
74          t_out = Sys.Now;
75          // Update the synaptic efficacy - LTP
76          w += LTP( t_in, t_out ); // not detailed here
77      }
78
79      DENRITIC_EVENT_RULE
80      {
```

FIG. 15A
(Continued)

```
81              // Update the synaptic efficacy - modulated STDP
82              w += MSTDP(t_in, t_out, Sys.Now)
83              //Example of voltage-dependent MSTDP calculation:
84              //0.1*exp(-(t_out - t_in))*exp(-(Sys.Now -
85              ///t_out))*(Unit.v-1);
86         }
87 }

88 DEFINE SYNAPSE TeacherSynapse
89 {
90      PRESYNAPTIC_EVENT_RULE
91      {
92           Unit.teaching_signal = true;
93 }
94 }

95 CREATE 1 InputNeuron;
96 CREATE 1 Neuron AS SpecialNeuron;
97 CREATE 1 TeacherNeuron;

98 CONNECT FROM InputNeuron TO SpecialNeuron WITH
   FeedForwardSynapse;
99 CONNECT FROM TeacherNeuron TO SpecialNeuron WITH
   TeacherSynapse;
100      // The SpecialNeuron can be connected to the rest of
   the network
```

```
1  DEFINE UNIT InputNeuron
2  {
3      // This may be a regular neuron, not detailed here
4  }

5  DEFINE UNIT MyNeuron
6  {
7      INIT
8      {
9          float v = 0;
10         float threshold = 1;
11         // initialize some more variables, if needed 12         int spike_counter = 0;
13     }

14     UPDATE_RULE
15     {
16         CODE
17         {
18             // update neural dynamics. For e.g.:
19             v += -v*0.99;
20         }
21     }

22     EVENT_RULE
23     {
24         EXEC_CONDITION { v >= threshold }
25         CODE {
26             // reset neural dynamics,
27             // update local variables. For e.g.:
28             v = 0;
29             spike_counter +=1;

30             // automatically trigger POSTSYNAPTIC_EVENT
31             // _RULE defined in the synapse, and
32             // propagate the spike
33         }
34     }

35     DENDRITIC_EVENT_RULE
36     {
37         EXEC_CONDITION { spike_counter >= 100}
38         CODE {
```

FIG. 15B

```
39                  // reset dendritic values, perform intrinsic
40                  //plasticity update For e.g.:
41                  threshold *=0.9;
42                  spike_counter = 0;

43                  // automatically trigger DENRITIC_EVENT_RULE
44                  // defined on the synapse, and does not
45                  // propagate spikes
46              }
47      }
48 }

49 DEFINE SYNAPSE FeedForwardSynapse
50 {
51      INIT
52      {
53          float w = 0.0;
54      }

55      PRESYNAPTIC_EVENT_RULE
56      {
57          // Spike delivery
58          Unit.v += w;
59      }

60      POSTSYNAPTIC_EVENT_RULE
61      {
62
63      }

64      DENDRITIC_EVENT_RULE
65      {
66          // Decay the synaptic efficacy
67          w *=0.99;
68      }
69 }

70 CREATE 1 InputNeuron;
71 CREATE 1 MyNeuron AS OutputNeuron;

72 CONNECT FROM InputNeuron TO OutputNeuron WITH
   FeedForwardSynapse;
```

FIG. 15B
(Continued)

```
1  DEFINE UNIT InputNeuron
2  {
3       // This may be a regular neuron, not detailed here
4  }

5  DEFINE UNIT TeacherNeuron
6  {
7       // This may be a regular neuron, not detailed here
8  }

9  DEFINE UNIT MyNeuron
10 {
11      INIT
12      {
13          float v = 0;
14          // initialize some more variables, if needed
15          bool generate_dendritic_event = false;
16      }

17      UPDATE_RULE
18      {
19          CODE
20          {
21              // update neural dynamics. For e.g.:
22              v += -v*0.99;
23          }
24      }

25      EVENT_RULE AS AxonicEvent
26      {
27          EXEC_CONDITION { v >= 1}
28          CODE {
29              // reset neural dynamics,
30              // update local variables. For e.g.:
31              v = 0;
32              // trigger AxonicEvent
33              // defined in the synapse, and manually
34              // propagate the spike
35              spike();
36          }
37      }

38      EVENT_RULE AS DendriticEvent
39      {
40          EXEC_CONDITION { generate_dendritic_event }
```

FIG. 15C

```
41          CODE {
42              // reset dendritic values, for e.g.:
43              generate_dendritic_event = false;
44
45              // automatically trigger DendriticEvent
46              // defined on the synapse, and does not
47              // propagate spikes

48          }
49      }
50 }

51 DEFINE SYNAPSE FeedForwardSynapse
52 {
53      INIT
54      {
55          float w = 0.0;
56          int t_in = 0;
57          int t_out = 0;
58      }

59      PRESYNAPTIC_EVENT_RULE
60      {
61          // Spike delivery
62          Unit.v += w;
63          // Log pre spike
64          t_in = Sys.Now;
65      }
66
67      EVENT_RULE AS AxonicEvent
68      {
69          // Log post spike
70          t_out = Sys.Now;
71      }

72      EVENT_RULE AS DendriticEvent
73      {
73          // Update the synaptic efficacy - modulated STDP
74          w += MSTDP(t_in, t_out, Sys.Now)
75          //Example of voltage-dependent MSTDP calculation:
76          //0.1*exp(-(t_out - t_in))*exp(-(Sys.Now -
77          ///t_out))*(Unit.v-1);
74      }
75 }
76 DEFINE SYNAPSE TeacherSynapse
77 {
```

FIG. 15C
(Continued)

```
78      PRESYNAPTIC_EVENT_RULE
79      {
80            Unit.generate_dendritic_event = true;
81      }
82 }
83 CREATE 1 InputNeuron;
84 CREATE 1 MyNeuron AS OutputNeuron;
85 CREATE 1 TeacherNeuron;

86 CONNECT FROM InputNeuron TO OutputNeuron WITH
   FeedForwardSynapse;
87 CONNECT FROM TeacherNeuron TO OutputNeuron WITH
   TeacherSynapse;
```

FIG. 15C
(Continued)

```
1. DEFINE UNIT InputNeuron
2. {
3.      // This may be a regular neuron, not detailed here
4. }

5. DEFINE UNIT TeacherNeuron
6. {
7.      // This may be a regular neuron, not detailed here
8. }

9. DEFINE UNIT MyNeuron
10. {
11.         INIT
12.         {
13.             float v = 0;
14.             // initialize some more variables, if needed
15.         }

16.         UPDATE_RULE
17.         {
18.             CODE
19.             {
20.             // update neural dynamics. For e.g.:
21.             v += -v*0.99;
22.             }
23.         }

24.         EVENT_RULE
25.         {
26.             EXEC_CONDITION { v >= 1}
27.             CODE {
28.                 // reset neural dynamics,
29.                 // update local variables. For e.g.:
30.                 v = 0;
31.                 // automatically trigger POSTSYNAPTIC_EVENT
32.                 // _RULE defined in the synapse, and
33.                 // propagate the spike

34.             }
35.         }

36.         EVENT_RULE AS TeacherEvent
37.         {
38.             //Define ability to generate TeacherEvent that
```

FIG. 15D

```
39.            //automatically call a TeacherEvent rule
40.            // defined on the synapse
41.
42.      }

43. }

44. DEFINE SYNAPSE FeedForwardSynapse
45. {
46.      INIT
47.      {
48.            float w = 0.0;
49.            int t_in = 0;
50.            int t_out = 0;
51.      }

52.      PRESYNAPTIC_EVENT_RULE
53.      {
54.            // Spike delivery
55.            Unit.v += w;
56.            // Log pre spike
57.            t_in = Sys.Now;
58.      }

59.      POSTSYNAPTIC_EVENT_RULE
60.      {
61.            // Log post spike
62.            t_out = Sys.Now;
63.      }

64.      EVENT_RULE AS TeacherEvent
65.      {
66.            // Update the synaptic efficacy - modulated STDP
67.            w += MSTDP(t_in, t_out, Sys.Now)
68.            //Example of voltage-dependent MSTDP calculation:
69.            //0.1*exp(-(t_out - t_in))*exp(-(Sys.Now -
70.            ///t_out))*(Unit.v-1);

71.      }
72. }

73. DEFINE SYNAPSE TeacherSynapse
74. {
75.      PRESYNAPTIC_EVENT_RULE
76.      {
78            // Triggers TeacherEvent rule defined on a unit
```

FIG. 15D
(Continued)

```
77.         Unit.TeacherEvent
78.     }
79. }

80. CREATE 1 InputNeuron;
81. CREATE 1 MyNeuron AS OutputNeuron;
82. CREATE 1 TeacherNeuron;

83. CONNECT FROM InputNeuron TO OutputNeuron WITH
    FeedForwardSynapse;
84. CONNECT FROM TeacherNeuron TO OutputNeuron WITH
    TeacherSynapse;
```

```
1. DEFINE UNIT InputNeuron
2. {
3. // This may be a regular neuron, not detailed here
4. }

5. DEFINE UNIT MyNeuron
6. {
7.      INIT
8.      {
9.      float v = 0;
10.         float threshold = 1;
11.         // initialize some more variables, if needed
12.         int spike_counter = 0;
13.     }
14.
15.     UPDATE_RULE
16.     {
17.         CODE
18.         {
19.             // update neural dynamics. For e.g.:
20.             v += -v*0.99;
21.         }
22.     }

23.     EVENT_RULE
24.     {
25.         EXEC_CONDITION { v >= threshold }
26.         CODE {
27.             // reset neural dynamics,
28.             // update local variables. For e.g.:
29.             v = 0;
30.             spike_counter +=1;
79              // automatically trigger POSTSYNAPTIC_EVENT
80              // _RULE defined in the synapse, and
81              // propagate the spike
31.         }
32.     }

33.     EVENT_RULE AS OverexcitabilityEvent
34.     {
35.         EXEC_CONDITION { spike_counter >= 100 }
36.         CODE {
37.             threshold *=0.9;
38.             spike_counter = 0;
39.             // automatically triggers OverexcitabilityEvent
```

FIG. 15E

```
40.                 // defined on the synapse, and does not
41.                 // propagate spikes

42.         }
43.     }
44. }

45. DEFINE SYNAPSE FeedForwardSynapse
46. {
47.     INIT
48.     {
49.         float w = 0.0;
50.     }

51.     PRESYNAPTIC_EVENT_RULE
52.     {
53.         // Spike delivery
54.         Unit.v += w;
55.     }

56.     POSTSYNAPTIC_EVENT_RULE
57.     {
58.     }

59.     EVENT_RULE AS OverexcitabilityEvent
60.     {
61.         // Decay the synaptic efficacy
62.         w *=0.99;
63.     }
64. }

65. CREATE 1 InputNeuron;
66. CREATE 1 MyNeuron AS OutputNeuron;

67. CONNECT FROM InputNeuron TO OutputNeuron WITH
    FeedForwardSynapse;
```

FIG. 15E
(Continued)

```
1
2  DEFINE UNIT InputNeuron
3  {
4        // This may be a regular neuron, not detailed here
5  }

6  DEFINE UNIT TeacherNeuron
7  {
8        // This may be a regular neuron, not detailed here
9  }

10 DEFINE UNIT MyNeuron
11 {
12       INIT
13       {
14            float v = 0;
15            // initialize some more variables, if needed
16       }

17       UPDATE_RULE
18       {
19            CODE
20            {
21                 // update neural dynamics. For e.g.:
22                 v += -v*0.99;
23            }
24       }

25       EVENT_RULE
26       {
27            EXEC_CONDITION { v >= 1}
28            CODE {
29                 // reset neural dynamics,
30                 // update local variables. For e.g.:
31                 v = 0;
32                 // automatically trigger POSTSYNAPTIC_EVENT
33                 // _RULE defined in the synapse, and
34                 // propagate the spike
35            }
36       }

37       EVENT_RULE AS OverexcitabilityEvent
38       {
39            EXEC_CONDITION { spike_counter >= 100}
40            CODE {
41                 threshold *=0.9;
```

FIG. 15F

```
42                  spike_counter = 0;
43                  //automatically triggers
    OverexcitabilityEvent
44                  // defined on the synapse, and does not
45                  // propagate spikes
46              }
47          }

48          EVENT_RULE AS TeacherEvent
49          {
50              // Define ability to generate TeacherEvent that
51              // automatically calls the TeacherEvent rule
52              // defined on the synapse

53          }
54 }

55 DEFINE SYNAPSE FeedForwardSynapse
56 {
57      INIT
58      {
59          float w = 0.0;
60          int t_in = 0;
61          int t_out = 0;
62      }

63      PRESYNAPTIC_EVENT_RULE
64      {
65          // Spike delivery
66          Unit.v += w;
67          // Log pre spike
68          t_in = Sys.Now;
69      }

70      POSTSYNAPTIC_EVENT_RULE
71      {
72          // Log post spike
73          t_out = Sys.Now;
74      }

75      EVENT_RULE AS TeacherEvent
76      {
77          // Update the synaptic efficacy - modulated STDP
78          w += MSTDP(t_in, t_out, Sys.Now)
79          //Example of voltage-dependent MSTDP calculation:
80          //0.1*exp(-(t_out - t_in))*exp(-(Sys.Now -
```

FIG. 15F
(Continued)

```
81            ///t_out))*(Unit.v-1);

82      }

83      EVENT_RULE AS OverexcitabilityEvent
84      {
82              // Decay the synaptic efficacy
85              w *=0.99;
86      }
87 }

88 DEFINE SYNAPSE TeacherSynapse
89 {
90      PRESYNAPTIC_EVENT_RULE
91      {
92              // Triggers TeacherEvent rule defined on a unit
93              Unit.TeacherEvent
94      }
95 }

96 CREATE 1 InputNeuron;
97 CREATE 1 MyNeuron AS OutputNeuron;
98 CREATE 1 TeacherNeuron;

99 CONNECT FROM InputNeuron TO OutputNeuron WITH
   FeedForwardSynapse;
100      CONNECT FROM TeacherNeuron TO OutputNeuron WITH
   TeacherSynapse;
```

```
83 DEFINE UNIT TeacherNeuron
84 {
85      // This may be a regular neuron, not detailed here
86 }
87
88 DEFINE UNIT InputNeuron
89 {
90      // This may be a regular neuron, not detailed here
91 }

92 DEFINE UNIT Neuron
93 {
94      INIT
95      {
96          float I = 0;
97          float v = 0;
98          float u = 0;
99          // initialize some more variables 100         bool teaching_signal = false;
101     }

102     UPDATE_RULE
103     {
104         CODE
105         {
106             // update neural dynamics ...
107         }
108     }

109     EVENT_RULE
110     {
111         EXEC_CONDITION { v > 30 }
112
113         CODE
114         {
115             // reset neural dynamics,
116             // update local variables 117             // automatically trigger POSTSYNAPTIC_EVENT
118             // _RULE defined in the synapse, and
119             // propagate the spike
120         }
121     }
```

FIG. 15G

```
122         DENDRITIC_EVENT_RULE
123         {
124             EXEC_CONDITION { teaching_signal }
125
126             CODE
127             {
128                 // reset dendritic values
129                 teaching_signal = false;
130
131                 // automatically trigger DENRITIC_EVENT_RULE
132                 // defined on the synapse, and does not
133                 // propagate spikes
134             }
135         }
136     }

137     DEFINE SYNAPSE FeedForwardSynapse
138     {
139         INIT
140         {
141             float w = 0.0;
142             int t_in = 0;
143             int t_out = 0;
144         }

145         PRESYNAPTIC_EVENT_RULE
146         {
147             // Spike delivery
148             Unit.I += w;
149
150             // Log pre spike
151             t_in = Sys.Now;
152
153             // Update the synaptic efficacy - LTD
154             w += LTD( t_in, t_out ); // not detailed here
155         }

156         POSTSYNAPTIC_EVENT_RULE
157         {
158             // Log post spike
159             t_out = Sys.Now;
160
161             // Update the synaptic efficacy - LTP
```

FIG. 15G
(Continued)

```
162                w += LTP( t_in, t_out ); // not detailed
   here
163        }

164        DENRITIC_EVENT_RULE
165        {
166                // Update the synaptic efficacy - LTP
167   `213456        w += LTP( t_in, t_out ); // not
   detailed here
168        }
169    }

170    DEFINE SYNAPSE TeacherSynapse
171    {
172        PRESYNAPTIC_EVENT_RULE
173        {
174            Unit.generate_dendritic_event = true;
175        }
176    }

177    CREATE 1 InputNeuron AS InputNeuron;
178    CREATE 1 TeacherNeuron AS TeacherNeuron;
179    CREATE 1 Neuron AS SpecialNeuron;

180    CONNECT FROM InputNeuron TO SpecialNeuron WITH
   FeedForwardSynapse;
181    CONNECT FROM TeacherNeuron TO OutputNeuron WITH
   TeacherSynapse;

182    // The SpecialNeuron can be connected to the rest of
   the network
```

FIG. 15G
(Continued)

```
1   DEFINE UNIT TeacherNeuron
2   {
3       // This may be a regular neuron, not detailed here
4   }

5   DEFINE UNIT InputNeuron
6   {
7       // This may be a regular neuron, not detailed here
8   }

9   DEFINE UNIT Neuron
10  {
11      INIT
12      {
13          float I = 0;
14          float v = 0;
15          float u = 0;
16          // initialize some more variables 17          bool teaching_signal = false;
18      }

19      UPDATE_RULE
20      {
21          CODE
22          {
23              // update neural dynamics ...
24          }
25      }

26      // This is a regular/traditional event_rule
27      EVENT_RULE
28      {
29          EXEC_CONDITION { v > 30 }
30
31          CODE
32          {
33              // reset neural dynamics,
34              // update local variables 35              // automatically trigger POSTSYNAPTIC_EVENT
36              // _RULE defined in the synapse, and
37              // propagate the spike
38          }
39      }
```

FIG. 15H

```
40      // Custom event rule
41      CUSTOM_EVENT_RULE
42      {
43          EXEC_CONDITION { teaching_signal }
44
45          CODE
46          {
47              // reset dendritic values
48              teaching_signal = false;
49
50              // explicitly call a rule
51              // defined on the synapse
52              Syn.DendriticRule;
53          }
54      }
55 }

56 DEFINE SYNAPSE FeedForwardSynapse
57 {
58      INIT
59      {
60          float w = 0.0;
61          int t_in = 0;
62          int t_out = 0;
63      }

64      PRESYNAPTIC_EVENT_RULE
65      {
66          // Spike delivery
67          Unit.I += w;

68          // Log pre spike
69          t_in = Sys.Now;
70
71          // Update the synaptic efficacy - LTD
72          w += LTD( t_in, t_out ); // not detailed here
73      }

74      POSTSYNAPTIC_EVENT_RULE
75      {
76          // Log post spike
77          t_out = Sys.Now;
78
79          // Update the synaptic efficacy - LTP
80          w += LTP( t_in, t_out ); // not detailed here
81      }
```

```
82      EVENT_RULE AS DendriticRule
83      {
84              // Update the synaptic efficacy - LTP
85              w += LTP( t_in, t_out ); // not detailed here
86      }
87 }

88 DEFINE SYNAPSE TeacherSynapse
89 {
90      PRESYNAPTIC_EVENT_RULE
91      {
92              Unit.generate_dendritic_event = true;
93      }
94 }

95 CREATE 1 InputNeuron AS InputNeuron;
96 CREATE 1 TeacherNeuron AS TeacherNeuron;
97 CREATE 1 Neuron AS SpecialNeuron;

98 CONNECT FROM InputNeuron TO SpecialNeuron WITH
   FeedForwardSynapse;
99 CONNECT FROM TeacherNeuron TO OutputNeuron WITH
   TeacherSynapse;

100     // The SpecialNeuron can be connected to the rest of
   the network
```

APPARATUS AND METHODS FOR IMPLEMENTING EVENT-BASED UPDATES IN NEURON NETWORKS

CROSS-REFERENCE TO RELATED APPLICATIONS

This application is related to U.S. patent application Ser. No. 13/239,123, filed Sep. 21, 2011, and entitled "ELEMENTARY NETWORK DESCRIPTION FOR NEUROMORPHIC SYSTEMS,", U.S. patent application Ser. No. 13/239,148, filed Sep. 21, 2011, and entitled "ELEMENTARY NETWORK DESCRIPTION FOR EFFICIENT LINK BETWEEN NEURONAL MODELS AND NEUROMORPHIC SYSTEMS,", U.S. patent application Ser. No. 13/239,155, filed Sep. 21, 2011, and entitled "ELEMENTARY NETWORK DESCRIPTION FOR EFFICIENT MEMORY MANAGEMENT IN NEUROMORPHIC SYSTEMS", U.S. patent application Ser. No. 13/239,163, filed Sep. 21, 2011, and entitled "ELEMENTARY NETWORK DESCRIPTION FOR EFFICIENT IMPLEMENTATION OF EVENT-TRIGGERED PLASTICITY RULES IN NEUROMORPHIC SYSTEMS,", U.S. patent application Ser. No. 13/239,259, filed Sep. 21, 2011, and entitled "APPARATUS AND METHOD FOR PARTIAL EVALUATION OF SYNAPTIC UPDATES BASED ON SYSTEM EVENTS", and U.S. patent application Ser. No. 13/239,255, filed Sep. 21, 2011, and entitled "APPARATUS AND METHODS FOR SYNAPTIC UPDATE IN A PULSE-CODED NETWORK", U.S. patent application Ser. No. 13/560,902 entitled "APPARATUS AND METHODS FOR GENERALIZED STATE-DEPENDENT LEARNING IN SPIKING NEURON NETWORKS", filed Jul. 27, 2012, and U.S. patent application Ser. No. 13/560,891 entitled "APPARATUS AND METHODS FOR EFFICIENT UPDATES IN SPIKING NEURON NETWORKS", filed Jul. 27, 2012, each of the foregoing being co-pending, commonly owned and incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to parallel distributed computer systems for simulating neuronal networks that perform neural computations, such as visual perception, motor control, and/or other neural computations.

2. Description of Related Art

Most neuronal models and systems consist of networks of simple units, called neurons, which interact with each other and with the external world via connections called synapses. The information processing in such neuronal systems may be carried out in parallel.

Some existing parallel hardware architectures and corresponding languages that may be optimized for parallel execution and simulation of neuronal models may utilize event-driven network updates. When implementing learning in neural networks, it may be desirable to be able to utilize events that may selectively modify some aspects of the network (e.g., change synaptic weights), while keeping the other aspects of the network unaffected (e.g., modify these weights without generating neuron output).

However, existing implementations, utilize events that combine connection weight adaptation and post-synaptic response generation for a neuron of the network.

Accordingly, there is a salient need for additional mechanisms that may decouple network-wide connection adaptation from post-synaptic response generation in a network thereby allowing for more flexible implementation of learning algorithms in spiking neuron networks.

SUMMARY

The present technology satisfies the foregoing needs by providing, inter alia, apparatus and methods for implementing flexible event based updates.

One aspect of the disclosure relates to a method of operating an artificial spiking neuron having an input connection and an output connection. The method may comprise providing one or more events of a first event type including a first event. The first event may be configured to effectuate an update of a plasticity of the input connection. The plasticity of the input connection may be configured to adjust a parameter associated with the input connection. The adjustment may be characterized by a time period. The method may comprise providing one or more events of a second event type including a second event. The second event may be configured to effectuate delivery of a response of the neuron via the output connection.

In some implementations, the first event may be based on an external signal provided to the neuron. The parameter may comprise an input connection weight.

In some implementations, the input connection may be configured to provide a feed-forward stimulus to the neuron. The neuron may be operable in accordance with a learning process configured to produce target outcome. The external signal may comprise a reinforcement signal configured based on whether the response within a pre-determined range from the target outcome.

In some implementations, the feed-forward stimulus may comprise a plurality of spikes characterized by an inter spike interval (ISI) comprising an interval between individual of the plurality of spikes. The tie period may exceed the ISI determined for consecutive individual ones of the plurality of spikes.

In some implementations, the external signal may be configured to cause the one or more events of the first event type independently from the one or more events of the second event type.

In some implementations, a given event of the first event type may be configured to be triggered independently from a given event of the second event type so as to enable a response-free time interval subsequent to the given event of the first event type being triggered.

In some implementations, the modification of weights may be characterized by a plasticity time window. The response-free time interval may be configured in excess of the plasticity time window.

In some implementations, the input connection may be capable of providing feed-forward stimulus to the neuron. The external signal may be provided via an interface configured separate from the input connection.

In some implementations, the plasticity update of the input connection may be configured based on a time at which the external signal is provided.

In some implementations, the feed-forward stimulus may comprise at least one spike. The plasticity update may be further configured based on a time associated with the at least one spike.

In some implementations, the plasticity update may comprise adjusting a probability of data transmission through the input connection. The adjusting may be based on one or both of (i) a time interval between the providing of the external signal and neuron response time, or (ii) a time interval between the at least one spike the response time. The response time may be associated with a response of the neuron generated prior to the external signal being provided.

In some implementations, the plasticity update may comprise adjusting efficacy associated with the input connection determined based on one or both of (i) a time interval between the providing of the external signal and neuron response time, or (ii) a time interval between the at least one spike the response time. The response time may be associated with a response of the neuron generated prior to the external signal being provided.

In some implementations, the plasticity update may comprise adjusting one or both of (a) communication delay or b) a weight associated with the input connection. The adjusting may be determined based on one or both of (i) a time interval between the providing of the external signal and neuron response time or (ii) a time interval between the at least one spike the response time. The response time may be associated with a response of the neuron generated prior to the external signal being provided.

In some implementations, the neuron may be configured to operate in accordance with a neuron process characterized by a state. The state may have a response generation threshold associated therewith. The response generation threshold may be associated with the neuron generating the response. The response may be based on one or more input spikes provided to the neuron via the input connection to the neuron. The response may be characterized by the state breaching the response generation threshold.

In some implementations, the method may comprise storing a present value of the state in a memory location associated with the neuron. The one or more events of the first event type may be configured to provide the input connection with read-only access to the memory location.

In some implementations, the first event may be configured based on one or more of (i) a timer expiration, (ii) a buffer overflow signal, or (iii) a trigger associated with the neuron process. The buffer may be configured to store a time history of the one or more input spikes.

In some implementations, the one or more events of the first event type may be configured to provide the input connection with read-only access to the time history of the one or more input spikes.

In some implementations, the one or more events of the first event type may be configured to provide the input connection with read-only access to a time history of one or more of the response of the neuron.

In some implementations, a provision associated with the first event type may be configured independent of the second event type so that the plasticity update is capable of being effectuated without causing and/or being associated with the response.

In some implementations, the method may further comprise providing one or more events of a third event type including a third event. The third event may be associated with a pre-synaptic event. The pre-synaptic event may be capable of causing the plasticity update of the input connection.

In some implementations, the first event and the second event may be configured to be provided contemporaneously with one another.

In some implementations, the second event may be capable of causing a plasticity update of the output connection.

Another aspect of the disclosure relates to a method of reinforcement learning for an artificial spiking neuron network. The method may comprise operating the neuron in accordance with a reinforcement learning process. The reinforcement learning process may be configured to generate an output based on an input signal and reinforcement signal. The method may comprise, based on the reinforcement signal, selectively triggering a first event of a first event type. The first event may be configured to cause a plasticity update of a connection of the neuron. The selective triggering may be configured to enable application of the plasticity update independent from the generation of the output. The input signal may convey information about environment external to the neuron.

In some implementations, the connection may be configured to provide the input to the neuron. The reinforcement learning process may be configured to achieve a target outcome. The reinforcement signal may be based on a measure characterizing discrepancy between the desired outcome and the output.

In some implementations, the reinforcement signal may comprise a negative reward determined based on the discrepancy being outside a predetermined value.

Yet another aspect of the disclosure relates to a computerized spiking neuron network system configured to implement an event-based update in the network. The system may comprise one or more processors configured to execute computer program modules. The execution of the computer program modules may cause the one or more processors, based on a first event, to update a first and a second interface respectively associated with a first and a second spiking neuron of the network. The first event may be characterized by an absence of a first and a second output being respectively generated by the first and the second spiking neuron responsive to the event.

In some implementations, the execution of the computer program modules may cause the one or more processors to generate a second event configured to cause delivery of one or both the first output or the second output via one or both of the first output interface or the second output interface associated, respectively, with the first and the second spiking neuron.

In some implementations, the execution of the computer program modules may cause the one or more processors to generate a custom event configured to execute a user-defined update of one or both of the first spiking neuron or the second spiking neuron.

These and other objects, features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the technology. As used in the specification and in the claims, the singular form of "a", "an", and "the" include plural referents unless the context clearly dictates otherwise.

BRIEF DESCRIPTION OF THE DRAWINGS

FIG. 15A is a program listing illustrating network update due to externally triggered dendritic event, in accordance with one or more implementations.

FIG. 15B is a program listing illustrating network update due to internally triggered dendritic event, in accordance with one or more implementations.

FIG. 15C is a program listing illustrating network update due to axonic and dendritic events, in accordance with one or more implementations.

FIG. 15D is a program listing illustrating network update due to an externally triggered custom event, in accordance with one or more implementations.

FIG. 15E is a program listing illustrating network update using internally triggered custom events, in accordance with one or more implementations.

FIG. 15F is a program listing illustrating network update using custom events comprising multiple trigger conditions, in accordance with one or more implementations.

FIG. 15G is a program listing illustrating network update comprising dendritic event configured without triggering spike delivery, in accordance with one implementation.

FIG. 15H is a program listing illustrating network update using a custom event, configured to execute synaptic rules, in accordance with one implementation.

FIG. 18 is a block diagram illustrating logical flow of the doublet event rule in accordance with one implementation.

FIG. 19 is a block diagram illustrating END event framework extension in accordance with one or more implementation.

Figure 1:
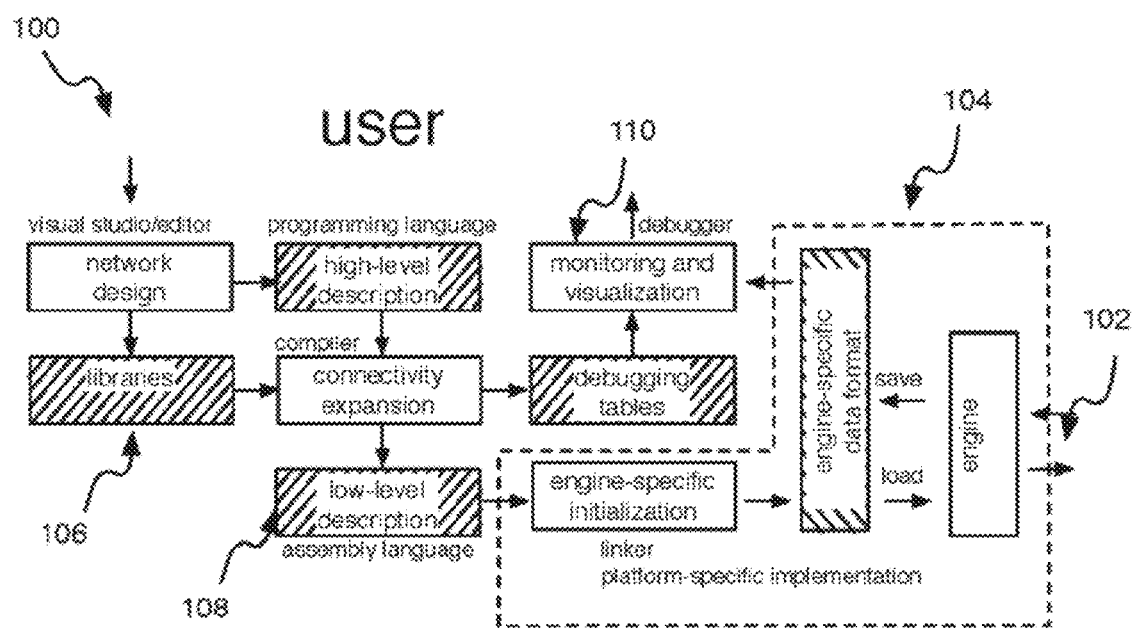
FIG. 1 is a block diagram depicting neural simulator according to one implementation.

All Figures disclosed herein are © Copyright 2012 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present technology to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the technology.

In the present specification, an implementation showing a singular component should not be considered limiting; rather, the technology is intended to encompass other implementations including a plurality of the same component, and vice-versa, unless explicitly stated otherwise herein.

Further, the present technology encompasses present and future known equivalents to the components referred to herein by way of illustration.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, and/or any other device capable of executing a set of instructions and processing an incoming data signal.

As used herein, the term "computer program" or "software" may include any sequence of human and/or machine cognizable steps which perform a function. Such program may be rendered in virtually any programming language or environment including one or more of C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which enables information exchange between the entities.

As used herein, the term "memory" may include any type of integrated circuit or other storage device adapted for storing digital data. By way of non-limiting example, memory may include one or more of ROM, PROM, EEPROM, DRAM, SDRAM, DDR/2 SDRAM, EDO/FPMS, RLDRAM, SRAM, "flash" memory (e.g., NAND/NOR), MEMRISTOR memory, PSRAM, and/or other types of memory.

As used herein, the terms "microprocessor" and "digital processor" may be meant generally to include all types of digital processing devices. Examples of digital processing devices may include one or more of digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the terms "event", "action potential", "pulse", "spike", "burst of spikes", and "pulse train" may be meant generally to refer to, without limitation, any type of a pulsed signal, e.g., a rapid change in some characteristic of a signal, e.g., amplitude, intensity, phase, or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software representation of a latency or timing of the pulse, and any other pulse or pulse type associated with a pulsed transmission system or mechanism. As used herein, the term "spnet" may include a spiking network.

Detailed descriptions of the certain implementations of the technology, including systems, apparatus and methods, are disclosed herein. Although certain aspects of the technology can best be understood in the context of parallel simulation engine architecture, implemented in software and hardware, which can efficiently simulate large-scale neuronal systems, implementations of the technology may be used for implementing an the instruction set—Elementary Network Description (END) format—that is optimized for efficient representation of neuronal systems in hardware-independent manner.

For example, some implementations may be deployed in a hardware and/or software implementation of a neuromorphic computer system. In one such implementation, an image processing system may include a processor embodied in an application specific integrated circuit ("ASIC"), which can be adapted or configured for use in an embedded application such as a prosthetic device.

The present disclosure provides, among other things, a computerized apparatus and methods for facilitating learning by spiking neuron networks by implementing event-based updates. In one or more implementations, the network may be configured using elementary network description (END) for neuromorphic systems. In some implementations, the END description may comprise multiple event types configured to effectuate event-based functionality.

In some implementations, a pre-synaptic event may be defined in order, for example, to modify input connection (e.g., adjust synaptic weights using pre-synaptic plasticity rule of a neuron based on pre-synaptic activity of the connection). In one or more implementations, the pre-synaptic event may be configured based on a pre-synaptic input (e.g., a pre-synaptic spike) delivered via the connection.

In some implementations, a dendritic (or an internal) event may be defined in order, for example, to modify input connections of a neuron. The internal event may be triggered by an external signal and/or internally by the neuron. In one or more implementations, the dendritic event may be triggered by a timer, an overflow indicator associated with a buffer that may store neuron spiking history (pre-synaptic and/or post-synaptic); internally generated by the neuron, or provided to the neuron externally via, for example, reinforcement connection. In one or more implementations, the dendritic event may be configured not to cause post-synaptic response by the neuron, but rather the connection plasticity adaptation.

In some implementations, an axonic (or delivery) event may be defined in order, for example, to cause distribution of post-synaptic response of a neuron to appropriate destinations. In one or more implementations, the axonic event may be triggered by the neuron spike response process (e.g., the super-threshold condition). In some implementations, the dendritic and the axonic events and may be implemented sequentially with one another as a single complex event In some implementations, the scope of the internal event may comprise the respective neuron and does not extend to other neurons of the network. Conversely, the scope of the external event may extend to other neurons of the network via, for example, post-synaptic spike delivery.

In some implementations, a custom event may be defined in order, for example, to implement custom event rule of the END.

In some implementations, two or more custom events may be defined. In one or more implementations, the two or more custom events may comprise specific name (e.g., event tag). In some implementations, connections (e.g., synapses) may be configured to subscribe to one or more such custom events based on the tags in order to appropriately handle custom events.

In one or more implementations, the dendritic events may be utilized in order to facilitate reinforcement learning by the network. By way of illustration, upon receipt of reinforcement input (a 'dendritic spike), plasticity of incoming synapses of the neuron may be adjusted without delivering the post-synaptic response to post-synaptic targets. Subsequently, then the neuron state reaches super-threshold condition, the axonal event may be used to deliver neuron post-synaptic response to the desired destinations.

In one or more implementations, the dendritic and the axonic events may be combined to obtain a composite event, such as, for example, the post-synaptic spike used, for example, in used in the elementary neuromorphic description (END) framework v 1, v2, and v3.

Referring now to the example depicted in FIG. 1, one configuration of a neural simulator development environment 100 is shown and described in detail. In this example, network design, connectivity expansion, monitoring and visualization, engine-specific initialization, and engine blocks may comprise software tools while labeled libraries, high level description, debugging tables, low level description and engine-specific data format blocks may be implemented as data structures in specific formats which are described in more detail herein.

The neural simulator development environment of FIG. 1 allows a user to define an arbitrary neural system model and to execute the model on an arbitrary computational platform (the engine). Neural simulator development 100 may comprise a number of software tools (transparent blocks in FIG. 1) that interact with each other via data structures configured in some formats, and a computational engine 104, which can be embodied in a single computer, a computer cluster, GPU, or a specialized hardware. In some implementations, the computational engine 104 may be a part of computerized control/sensory input processing apparatus and exchanges data with the rest of the apparatus via a pair of arrows 102 in FIG. 1. By way of example, the computational engine 104 receives sensory information from the "real world" via the input 102 and sends motor commands to any appropriate actuators (not shown) of the control apparatus via the output 103 enabling the control/processing respond to the sensory inputs via a set of drivers.

A user may specify the desired network layout of the neural simulator 100 using a GUI network design tool, e.g., similar to Microsoft Visual Studio™. In some implementations, the neural simulator employs specialized libraries, configured to implement various specialized functions. Some specific library modules may be, for example, described briefly as "retina+thalamus+V1 with 1M neurons". In some implementations, the library modules may be described in more detail, providing initialization of various default parameters (as appropriate) that define one or more of plasticity, neuronal dynamics, cortical micro circuitry, and/or other information associated with a default parameter. The GUI network design tool saves the network layout of the neural simulator 100 in a "high-level description" format. In some implementations, the GUI network design tool is configured to modify the libraries 106 in FIG. 1.

The high-level description of the network layout is compiled into a low-level description (Elementary Network Description—END) 108 using the libraries 106. For example, the high-level description may comprise description of cortical areas V1 and V2 (not shown) and may require connecting them according to an appropriate connectivity rule stored in the library 106. The compiler allocates neurons, establishes the connections between the neurons, and saves the network layout 100 in a low-level description that is similar to an assembly language. In some implementations, the compiler may provide appropriate tables for monitoring and visualization tool during debugging.

Figure 2:
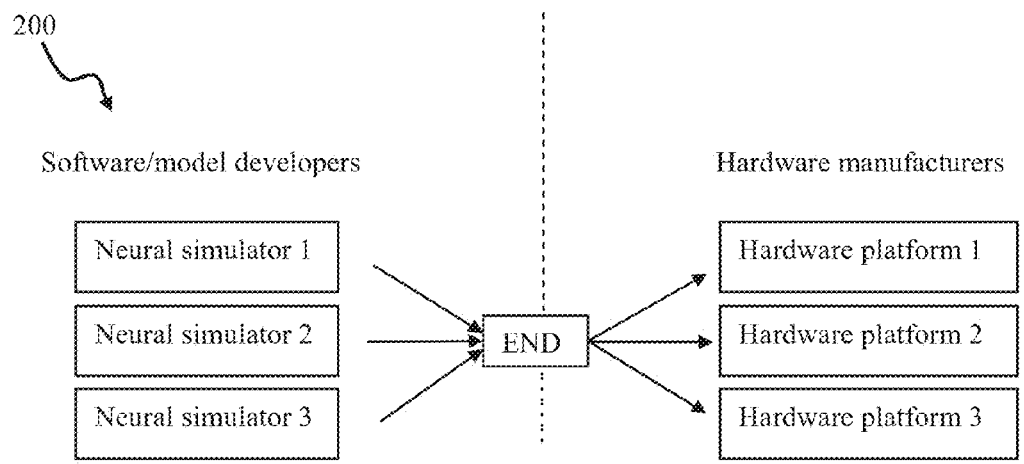
FIG. 2 is a block diagram illustrating model development workflow, in accordance with one implementation.

The Elementary Network Description (END) representation acts as an intermediary bottleneck (i.e., a link) between simulator tools and hardware platform implementations as illustrated in FIG. 2. The END representation provides an abstraction layer that isolates developing environment from the underlying hardware. One objective of END is to isolate the step of developing neural network models from hardware simulation tools, as illustrated in FIG. 2. The END approach may operate to partition implementation of neural models (such as the model of FIG. 1) into two steps. At the first step, neuroscientists create neural models of varying complexity using high-level description language and END representation. At the second step, developers (programmers and hardware engineers) modify and adapt underlying implementation blocks to adapt and optimize model operation for a particular hardware/software platforms. In this architecture, the END format performs the same services as LLVM (low-level virtual machine) or Java bytecode; however, the END format can be optimized for parallel representation and execution of neuronal systems.

The low-level description of the model is converted to the engine-specific binary form suitable for upload to the computational engine 104, as shown in FIG. 1. The computational engine is capable of saving its current state in the same format for subsequent re-uploading. The binary data is used by the monitoring and visualization block 110 of FIG. 1 during debugging and visualization of computation results and monitoring of the system. As described above, the computational engine interacts with the real world via sensors and actuators (connected to the hardware by drivers) as depicted by the arrows 102 in FIG. 1.

The elementary network description (END) of the network may comprise the lowest-level platform-independent model depiction. In one implementation, such description is configured similarly to assembly language description, commonly used in computer programming arts. However, while most existing computer assembly language implementations may be processor-dependent, the END description is hardware-agnostic.

The END description may operate as a platform-independent link between a high-level description and the platform-specific implementation of the neural model, as illustrated in FIG. 2. In FIG. 2, blocks 210 (Neural simulators 1-3) denote various network development tools (such as, NEURON, GENESIS, NEST), while blocks 220 (Hardware platform 1-3) denote different hardware implementations (e.g., CPU, multiprocessor computers (workstations, desktop, server, mainframe, ASICs, FPGA, and/or other hardware implementations) that are used to execute the respective neural simulator models.

In one implementation of the END implementation, input neural simulator model data may be provided in an XML format (or any other convenient structured data format), or in a relational database normal form, aimed at providing minimal set of input data that is sufficient to specify one or more aspects of neural simulation model. A given aspect of the neural simulation module may include one or more of a neuron, dendritic tree, synapse, neuronal and synaptic classes, plasticity rules, neuronal dynamics, and/or other aspects. This set of input data is configured via multiple relations between the above items. This set of input data may be configured in a variety of ways: (i) a collection of multiple files, individual ones of which describing a single data structure, e.g., a neuron; (ii) a single file (that may be compressed); or (iii) hierarchical directory/folder/file structure; or a combination thereof.

In some implementations, the fundamental (atomic) computational unit of the network simulation model is a neuron, referred to as a "unit". In some implementations, the unit may comprise a neuronal compartment where the units may be linked by junctions to form dendritic trees, which form neurons. In these examples, the synapses comprise connections from one unit to another, thereby enabling to describe unit (node) interconnections via a connectivity graph. Such graphs do not necessarily comprise trees connected to trees through synapses coming from somas.

In order to obtain operational network description, individual units (e.g., neuron, compartment) and individual synapses may be subject to a set of rules that govern its dynamics. In some implementations, some of these rules comprise clock-based rules that apply to neuronal units and junctions, while other rules may be event-based and apply to synapses.

By way of example, individual neuronal units may be subject to a set of rules that describe spike-generation mechanism for that unit, comprising: (i) the condition for firing a spike; and (ii) a set of modifications that may be applied to the unit dynamic state variables after the spike is fired. Similarly, individual synapses may be subject to spike rules that determine a set of actions performed on the synapse when a pre-synaptic unit fires and a set of actions performed on the synapse when a post-synaptic unit fires.

In one implementation, the END format may be used to generate a C code that implements the computational engine (e.g., the engine 104 in FIG. 1). In this implementation, which is referred to herein as END 1.0, the description of rules may comprise code strings that may be inserted into a C-code template in order to provide the neuronal model with arbitrary expandable functionality, as illustrated by the examples below.

END 1.0 may implement an object inheritance structure that may comprise object classes unit_class, junction_class, synaptic_class, and event_rule with possible subclasses. Individual ones of such classes may have instances, i.e., units, junctions, synapses, and rules.

END 1.0 can be configured to separate the data (units, junctions, synapses) from the methods (update and spike rules), thereby enabling the computational engine (e.g., the linker 112 of the engine 102 in FIG. 1) to implement data ⇆ methods interconnections. In some implementations of the computational engine, the computational operations may be grouped by data (e.g., for individual synapses, some or all of the actions (rules) are executed for that synapse). In other commonly used implementations of the computational engine, e.g., useful with GPU hardware, computational operations may be grouped by methods (e.g., for individual update rules, outstanding requests for some or all synapses that are subject to that update rule are executed). The END can be configured to operate equally well with any of the above operational grouping configurations.

When implementing large-scale models of complex real-life systems such as, for example, a mammalian visual system, some data structures described by the END format may consume the majority (in some implementations up to 99%) of the network model resources (memory or CPU, or both). Implementation of these data structures, typically referred to as "canonical structures", greatly benefits from the use of specialized hardware, such as an ASIC or FGPA optimized to simulate such canonical structures. Similarly, in some implementations where some rules and methods consume majority of CPU processing resources (e.g., take the most time to execute); development of specialized hardware accelerators may provide a substantial increase in processing of canonical methods. Different hardware implementations can hard-wire different methods, leading to a diversity of hardware platforms.

One of the goals attained with the END description may be to provide the minimal instruction set that is sufficient for describing neuronal models of arbitrary complexity. Herein, the following notation is used in describing the END format: class or type definition type is encased in angle brackets < . . . >; the fields within the class (or type) may be indented, with respect to the class definition, as shown in the Definition 1 example, below.

In the above definition, the statement <unit of (unit_class)> denotes definition of an instance of the class "unit_class" having fields "unit_id" and "Initialization" as follows:

<unit of (unit_class)>
    unit_id
    Initialization

This class defines a neuron or a compartment, but in principle, can be any neural unit, that may be executed by the model at a predefined model execution time step (e.g., 1 ms). The unit may be an instantiation of the object unit_class that specifies the operations performed at individual ones of the model time steps. The fields of the unit_class may be defined as follows:

unit_id is a unique label, e.g., a number or a string that identifies individual units. The unit_id may be a Perl or PHP or RegEx, or MATLAB expression that specifies a range of valid ids, and the actual id may be assigned during model build by the linker. For example, 'exc(1:1000)' or 'exc1:exc1000'.

Initialization may be a structure containing initial values of the class fields that may be different from the default values in the definition of the class. Some or all of these may be declared and initialized with default values in the unit_class.

<unit_class of (unit_class)>
    unit_class_id
    execution_condition
    update_rule
    event_condition
    after_event_rule
    initialization provides a generic definition of a neuronal model class that specifies neuronal dynamics, allocates neuronal variables, defines spike processing rules, and/or other information associated with the neural model class. The class <unit_class> is an object (as in object-oriented programming) that can be derived from another object of unit_class. The fields of the <unit_class> object may be defined as follows:

unit_class_id is a unique name of the object class (string), E.g., 'exc' or 'p23soma' or 'p4cmprtmnt3'. These object names may be used by the neuronal model as names of vectors to refer to the units, e.g., in background processes or in I/O processes.

execution_condition the condition that is evaluated at individual model execution time steps in order to determine whether or not to execute units of this class, for example: 'now %10==0'; or 'DA>0.1'. If the execution_condition is absent (the field is blank), then respective unit may be executed at individual model time steps (i.e., the system clock step cycle). When a class (subclass) may be derived from a base class (superclass), then the derived class execution condition overrides the base class execution condition.

update_rule defines a code string that will be converted by the linker to executable code. In some implementations, the code string may comprise a forward Euler numerical method notation, such as, for example:

```
`x(t+1) = x(t) + tau*(F(x(t)) ). `I += g* (E−V); g += tau*(−g)/5;
v += tau* ( 2*(v+70)*(v+50)−u+I)/20; u += tau*0.1*(2*(v+70)−u); .
```

In some implementations, the code string specifies mapping x(t+1)='x(t)+tau*(f(x(t)))' or a C-executable code (function or subroutine) that may be performed at individual steps of model execution. When the class is derived from a base class, then the object update_rule of the subclass may be executed first, followed by the base class rule, thereby allowing for update of certain variable by the subclass rule execution.

event_condition defines a logical statement needed to detect spikes. E.g. 'v>30'. It may be executed at individual clock cycles (model time step). When the class is derived from a base class, then the event_condition of the subclass replaces the event_condition of the base class.

after_event_rule the code that is executed when a spike may be detected. E.g. 'v=−65;u=u−8;' For a derived subclass, the subclass after_event_rule may be executed before the after_event_rule of the base class.

initialization sets the initial values of some or all variables and parameters of the unit. E.g., 'float v=0; float u=0; float g_AMPA=0;'. Different unit classes may have a different number of synaptic conductance types and/or assigned different variable names. The initialization string parsed by the linker in order to obtain names of some or all of the variables during build. Derived object classes may add new variables. For a derived subclass, the initialization of the base class may be executed first, and then this initialization later, as it may change some of the default parameters. The initialization may change the default parameter values inherited from the base class. By way of example, the initialization string 'float g_NMDA=1; g_AMPA=1' create a new variable g_NMDA and resets the value of the existing variable g_AMPA.

Similarly, junctions and synapses can be described using the same methodology as above.

```
<junction of (junction_class)>
    unit_id1
    unit_id2
    initialization
``` provides a generic definition of a neuronal model class that provides connectivity between pairs of units. The field junction_class refers to the name of the parent object class, for example, "gap_junction" or "dendritic_tree". The class fields may be as follows:

unit_id1, unit_id2 specifies the ids of the two connected neuronal units.

initialization

Sets the initial values for the parameters and variables. The class junction_class may be used as the base to define a subclass <junction_class of (junction_class)> and may be declared as follows:

```
<junction_class of (junction_class)>
    junction_class_id
    execution_condition
    unit_class_1
    unit_class_2
    update_rule
    initialization
``` where junction_class_id is a unique identification label that specifies the class that can be derived from another class.

execution_condition the condition that is evaluated at individual model execution time steps in order to determine whether or not to execute units of this class, for example: 'now %10==0'; or 'DA>0.1'. If the execution_condition is absent (the field is blank), then respective unit may be executed at individual model time steps. When a class (subclass) is derived from a base class (superclass), then the derived class execution condition overrides the base class execution condition.

unit_class_1 the class identifier of the unit_1;

unit_class_2 the class identifier of the unit_2; if omitted, the junction may be assumed to be applied to some or all unit classes.

update_rule defines a code string that will be converted by the linker to executable code. In some implementations, the code string may comprise a forward Euler numerical method notation, such as, for example:

'g_2to1*(V2−V1), g_1to2*(V1−V2)'.

In some implementations, applicable to Ohmic junctions, one can skip the _class part and just specify the conductance g_2to1 and g_1to2 in the <junction>. When the class is derived from a base class, then the object update_rule of the subclass may be executed first, followed by the base class rule, thereby allowing for update of certain variable by the subclass rule execution.

Initialization sets the initial values of variables, if any, used to execute the update_code.

The class synapse may be declared as follows:

```
<synapse of (synaptic_class)>
    pre
    post
    delay
    initialization
``` where,

| pre |
| post | are identifiers of the pre-synaptic unit and the post-synaptic unit, respectively.

delay specifies the axonal conduction delay value (in simulation time steps)

initialization sets the initial parameter and variable values. Similarly to the junction class, synapse class may be derived from a base synapse class may be declared as follows:

| <synaptic_class of (synaptic_class)> |
| synaptic_class_id |
| initialization | where, synaptic_class_id is the unique label that specifies the base class, which may be used as a vector identifier in order to refer to individual synapses in background processes (though the order may be scrambled). This class can be derived from another class.

initialization sets the initial values of the parameters and variables for individual synapses, e.g., 'float w=5; float sd=0; float p=0;'. The class defining a pre-synaptic event rule that accesses synaptic variables and post_unit variables, may be declared as follows:

| <presynaptic_event of (event_rule)> |
| synaptic_class |
| post_unit_class | where, synaptic_class denotes the name of the synaptic class to which this plasticity rule applies. The object event_rule may be used to specify actions performed when the pre-synaptic unit fires. The rules of the synaptic_class define the short-term plasticity (STP) and long-term potentiation (LTP) part of STDP rules for a pre-synaptic neuron (unit).

post_unit_class specifies the class of the post-synaptic unit thereby defining the domain of the action of the event_rule thereby providing information that may be required by the STDP rule execution (e.g., the class to deliver the post-synaptic potential (PSP) and to access variables such as last_spike). The class post-synaptic_event may be declared as follows:

| <post-synaptic_event of (event_rule)> |
| synaptic_class |
| post_unit_class | where, synaptic_class specifies the name of the synaptic class to which this plasticity rule applies. The object event_rule may be used to define a list of actions that may be performed with synaptic variables when the post-synaptic unit (as referenced with respect to these synapses) fires, thereby implementing the LTP part of the STDP plasticity rule that may be executed whenever the post-synaptic unit fires a spike.

post_unit_class specifies the class of the post-synaptic unit thereby defining an action domain for this rule. In one implementation, this rule may be configured to accesses synaptic variables. The event_rule class may be derived from a base class as follows:

| <event_rule of (event_rule)> |
| event_rule_id |
| rule |
| initialization | where, event_rule_id is a unique label that specifies the rule class. Generally, the rule class may be derived from another object class event_rule.

Rule is a string representation of a code that specifies action performed upon occurrence of an event. By way of example, delivery of the post-synaptic potential (PSP) may be specified as"

'g+=w' or 'I+=w' or 'g+=g*p'.

Similarly, actions associated with a presynaptic_event may be defined as:

'$p^*$=STP(now−last_active); $w$−=LTD(now−last_spike);' while actions associated with a post-synaptic_event may be defined as:

'$w$+=STDP(now−last_active)' where:

"last_active" is the time elapsed since a previous occasion when the synapse was active;

last_spike is the time of the last spike of the post-synaptic unit, and

'now' is the current time.

In addition, the event_rule class may specify tables, e.g., STDP, LTP, or other biologically motivated tables.

initialization sets the initial values of the tables as, for example: 'STDP={, . . . ,};' or 'STP={, . . . ,}; LTD={ . . . }'.

| <background_process> |
| execution_condition | the condition that is evaluated at individual simulation time steps to determine whether or not to run the process. E.g., 'now %10==0' or 'DA>0.1'. If absent, then the process may be run at individual time steps. The name of the unit_class or synaptic_class whose local variables can be accessed. The code below will be run in a loop within the class members with an arbitrary order (possibly in parallel). If absent, it may be assumed that the process is run once per 'true' execution_condition, and individual units or synapse can be accessed using the unit or synaptic class name E.g., the unit class 'exc' contains units exc[i] with possibly unknown order that does not necessarily correspond to the order in which they are listed update_rule the code to be executed, e.g. 'DA*=0.9' or in synaptic_class domain 'w+=DA*sd; sd*=0.995;' or without domain just 'exc[rand( )].I=100;' initialization
initialization of global variables, e.g., 'float DA=0'.

The time step of the simulation, and other run-time parameters, can be specified. There may be a few global variables that are accessible to everybody, e.g. "now"—the present time.

Classes that differ by a parameter may be declared as a single class and the parameter values may be specified in the instantiations. If there are only a few (e.g., two, three, or some other number) different values of the parameter, then it may make sense to specify two different classes, individual ones having the parameter hard-wired in the equations.

External interface of the END framework describes provision of external sensory input into neuronal network (e.g., the network 100 of FIG. 1) and delivery of outputs (via for example, the pathways 102 of FIG. 1) to external robotic apparatus. END external interface may comprise two major logical blocks: Sensory Input block, and Output and Monitoring block, described in detail below.

This block defines connection of the external input to various units of the network model. By way of example, sensory class for an N-channel (numbered 1 to N) spiking retinal input may be declared as follows:

```
<unit_class>
    unit_class_id = 'retina'
    after_event_rule   // may be empty
```

The above class declaration informs the input driver and the computational engine where the spikes from the retina will go. The structure of the input may be defined using the following declaration of N empty units:

```
<unit>
    unit_id = 'retina(1:N)'
```

In some implementations, there may be no update rules that are required to be executed at individual network time steps. Hence, the computational engine may not spend computational resources on these empty units. However, whenever the spikes from the input channels declared as 'retina' arrive, the input driver may put the unit index into a spike queue as if it actually fired a spike (this may trigger the after_event_rule execution by the engine, if it is not empty). The synapses from the unit to other units may tell the network what to do with spikes. In the case of retinal input on LGN, the retina units may have 1-3 synapses onto some LGN cells.

If the input channel feeds continuous signals, then the signal may update the variable "I" in individual units at a given time interval (e.g., every millisecond). In this case, one may specify the update rule and the event_condition.

The output and monitoring block provides an output interface for the network mode. In one implementation, applicable to motor output from the model, the output block specifies connections between the network units and external motor interface or some other actuators. In some implementations, the motor interface may comprise a muscle interface. In some implementations, the motor interface may comprise a motor interface configured to control an external robotic apparatus. A unit 'neck_muscles' comprising an N-channel motor output object for interfacing with, for example, neck muscles may be declared using END framework as follows:

```
<unit_class>
    asunit_class_id = 'neck_muscles'
    initialization = 'float I=0;'
```

The above declaration informs the output driver which neurons (units) to monitor for changes in the values of the current I. The respective N empty unit objects may be then created as follows:

```
<unit>
    unit_ id = 'neck_muscles'
```

During execution of the model, the computational engine ensures that at least some of the motor neurons (units) neck_muscles have non-zero (e.g., positive) synaptic projections to these neurons, so that whenever the motor neurons fire, the variable I within the unit object may be set to a positive value. The output driver, therefore, monitors the variable I at individual model time steps, and resets it to I=0 if needed. As the motor output interface does not require execution of update rules (at individual model execution time steps), the computational engine spends minimal resources on maintaining the 'neck_muscles units.

In some implementations, applicable to monitoring neural network execution, the output block specifies connections between the network units and external monitoring interface.

As described above, certain elements of the neuronal model benefit from computations that may be performed by specific hardware blocks (hardware accelerators). By way of example, consider a method update_rule of the unit unit_class that consumes a large portion (e.g., 99%) of the engine computational resources:

```
<unit_class>
    unit_class_id='simple_model'
    update_rule = 'v+=(0.04*v+5).*v+140-u+I; u+= a*(b*v-u);'
    event_condition = 'v>30'
    after_event_rule = 'v=-65;u+=d'
    initialization='float v=-65; float u=0; float a=0.1;
             float b=0.5; float d=8;'
```

Provided the implementation of the update_rule does not change from unit to unit and/or from one model run to another, then computational operations associated with the update_rule can be more efficiently executed by in a specialized hardware accelerator that may be implemented in, for example, an ASIC, FPGA, or specialized silicon. Within the END framework, a 'simple_model' class may be used to instruct the compiler to direct execution of the code, associated with, for example, the update_rule listed above to the appropriate location corresponding to the hardware accelerator interface. To create such mappings, instances of the simple_model class may be instantiated as follows:

```
<unit of (simple_model)>
    unit_id=509
    initialization 'a=0.01; d=2'
```

Such hardware accelerators (simple_model objects) may be used by the END as building blocks for constructing more complex objects. By way of example, the neuronal model with, for example, one million (1M) of simple_model units (neurons) and, for example, one thousand (1K) neurons with an extra slow neuronal variable, 'w' may be declared using class inheritance mechanism as follows:

```
<unit_class of (simple_model)>
    unit_class_id='complex_model'
    update_rule = 'w+=0.001*(0.3*v-w); I-=w'
    after_even_rule = 'w+=1'
    initialization='float w=0'
```

A processor in the computational engine (e.g., an ARM chip) that is attached to the specialized hardware may process 1K units of the above type in order to evaluate dynamics of the variable 'w' and incorporate it into the value of the variable I. Then the hardware accelerator (analog or digital) hardware may execute 1M+1K instances of the simple_model without even realizing that some of the instances correspond to a more complex model. The specialized hardware may contain the most commonly used implementations of neuronal models, synaptic dynamics. Users may be free to mix and match these canonical capabilities or to add to them whatever extra functionality may be needed.

The spnet may comprise N=Ne+Ni=1000 neurons, where Ne=800 excitatory neurons and Ni=200 inhibitory neurons. individual neurons may comprise M=100 synapses per neuron. Some or all excitatory synapses may be plastic (STDP), with a random delay ranging between 1 ms and D=20 ms. The inhibitory→excitatory synapses may be non-plastic with a delay of D=1 ms. There may be no inh→inh synapses. The low-level END description of the model may be expressed as follows. The first Ne units may be populated by Ne excitatory units:

```
<unit of (exc)>
    unit_id = 1:800
```

Next, Ni inhibitory units may be records of the class are populated as:

```
<unit of (inh)>
    unit_id = 801:1000
```

The spnet class may be then declared as shown in the Listing 1 below:

Listing 1.

```
<unit_class>
    unit_class_id='QIF2'
    update_rule = 'v+=0.5*((0.04*v+5).*v+140-u+I);
v+=0.5*((0.04*v+5).*v+140-u+I);'
    event_condition = 'v>30'
    after_event_rule = 'v=-65;'
    initialization = 'float v=-65; float u=0.2*v; float I=0'
<unit_class of (QIF2)>
    unit_class_id='exc'
    update_rule = 'u+=0.02.*(0.2*v-u);'
    after_event_rule = 'u+=8; last_spike=now'
    initialization = 'int last_spike=-1000;'
<unit_class of (QIF2)>
    unit_class_id='inh'
    update_rule = 'u+=0.1.*(0.2*v-u);'
    after_event_rule = 'u+=2;'
    Ne*M records of the class (exc->exc)
<synapse of (GLU)>
    pre = i      // i=1:Ne
    post = j     // a random number between 1 and N
```

-continued

Listing 1.

```
    delay // a random number between 1 and D
    Ni*M records of the class
<synapse of (GABA)>
    pre = i      // i=Ne+1:N
    post = j // a random number between 1 and Ne
<synaptic_class>
    synaptic_class_id = 'GLU'
    initialization = 'float w=6; float sd=0; int last_active=-1000;'
    delay=1  // default delay (if not specified in the instance )
<synaptic_class>
    synaptic_class_id='GABA'
    delay=1     // the same for all synapses
<presynaptic_event of (EPSP_plus_LTD)>
    synaptic_class = 'GLU'
    post_unit_class = 'QIF2'// i.e., exc and inh
<presynaptic_event of (Inhibition)>
    synaptic_class = 'GABA'
    post_unit_class = 'QIF2'// i.e., exc and inh
<postsynaptic_event of (LTP)>
    synaptic_class = 'GLU'
    post_unit_class='exc'
<event_rule>
    event_rule_id = 'EPSP_plus_LTD'
    rule = 'I+=w; sd-=LTD(now-last_spike); last_event=now'
    initialization = 'LTD = {array};'
    // exponential decay from LTP_A=1.2 to zero with LTD_tau=20 ms
<event_rule>
    event_rule_id = 'LTP'
    rule = 'sd+=LTP(now-last_active);'
    initialization = 'LTP = {array};'
<event_rule>
    event_rule_id = 'Inhibition'
    rule = 'I-=5;'
    initialization = ''
<background_process>
    id = 'Weight_update';
    execution_condition = 'now%1000==0'
    domain = 'GLU'
    update_rule = 'w += 0.01+sd; if (w<0) w=0; if (w>10) w=10; sd *= 0.9'
<background_process>
    id = 'randominput'
    update_rule = 'exc[int(floor(rand( )/RAND_MAX*N))].v=30;'
```

The low-level description of the model (such shown in Listing 1 above) may contain information that is necessary to uniquely define network architecture. The description shown in Listing 1 may not be suitable for, inter alia, performing model simulations, because it may not provide a sufficient level of detail for one or more of synapse connections for individual units, the pre-synaptic connections, post-synaptic targets, and/or other information useful for performing model simulations. A linker uses (e.g., the linker 108 in FIG. 1) the low-level END description and (i) populates some or all of the links between the units; (ii) saves the code and the data in binary or some other low-level (machine) format so that to facilitate data and code loading by the computational engine during model simulations. During simulation execution (runtime) the engine may create save-points (that is saving the engine execution state comprising for example, registers and memory content, program counter, and/or information associated with the engine execution state) in the same (or a different) format, so to enable a rapid restart of model execution from any save-point.

In one implementation, the computational engine may comprise a single-processor computer. The engine performs a number of computational cycles (steps through the network) at predetermined time step. In some implementations, the time step may be set to one millisecond.

In some implementations, the computational engine may be implemented on a multi-core processing platform, an array of single/multicore processors, an FPGA, or a programmable logic fabric with one or more embedded processor cores.

Individual <_class> instances in the low-level END description may correspond to a separate loop execution loop. Computations within individual execution loops/cycles may be performed in parallel in an order that is optimized for multi-core implementations. Some cycles may be performed in parallel with other cycles. A given_code may be "pre-compiled" and included into the appropriate place in the engine.

In order to achieve execution efficiency during model simulations, neuromorphic hardware implementing the computational engine may have one or more of the following features: (i) fast highly specialized processing of neuronal dynamics and basic synaptic events, such as synaptic release; (ii) a general purpose processor (e.g., an ARM core) for performing of computational background processes, such as slow synaptic update, turnover, rewiring, short-term plasticity, and/or other background processes; and/or other features. Such configuration enables fast execution of the basic synaptic processing (that less likely requires frequent modifications by the user) for the majority of synapses while allowing for implementation of proprietary boutique processing for a smaller fraction of synapses.

One objective of a "minimal instruction set" implementation may be to provide a low-level description format may comprise (i) unit (neuron) definitions, which declare memory allocations but do not contain actions, (ii) junctions, which couple units, but do not allocate memory of their own; and (iii) rules, which link actions with units or junctions. In some implementations, the actions may be clock-driven (that is, executed for the appropriate units at individual time steps of the neuronal mode simulation execution). In some implementations, the actions may be event-driven, (that is, the actions may be triggered by units via, for example, an event_condition declared for the unit class, which informs the simulator on the actions that are performed upon the unit firing a spike. Such events (spike), hence, trigger execution of event-based rules that may be applied to other units or junctions.

Within the END framework a synapse can be declared as a unit comprising memory configured to store various variables associated with synapse functionality, such as synaptic weight, delay, target destination, and/or other information associated with synapse functionality A synapse can be considered as pre-synaptic machinery that is ready to release transmitter. As with unit updates, synaptic update rules (e.g., maintenance 'w+=sd; sd*=0.9') may be clock-based or event-based. The synaptic action (e.g., release of neurotransmitter) may be triggered by a spike event at the unit corresponding to the pre-synaptic neuron. The rule describing the release can perform the depression part of the STDP and any of the short-term plasticity processes. The LTP part of STDP may be effectuated by a separate, other rule that may be triggered by the unit corresponding to the post-synaptic neuron. A junction specifies a connection between a synapse and a post-synaptic unit.

The minimal instruction set example of END enables construction of a simple event-based computer that has enough descriptive capacity to define an arbitrary neural network.

The syntax and structure of the classes and variables of the minimal instruction set example of END, described below, may be similar to the END 1.0 format describes supra.

```
<unit of unit_class>
    unit_id
    initialization
<unit_class (of unit_class)>
    unit_class_id
    initialization
<junction of junction_class>
    junction_id
    unit_1
    unit_2
<junction_class (of junction_class)>
    junction_class_id
    unit_class_1
    unit_class_2
<rule of rule_class>
    subject_id
``` the id of a unit or junction that is subject to this rule
    trigger_id
the id of the unit that triggers the rule for the subject (for event-based rules). If omitted, this rule may be clock-based.
    Delay
The delay with which this rule has to be executed. If omitted, there may be no delay

```
<rule_class (of rule_class)>
    rule_class_id
    execution_condition
``` e.g. 'now %10==0'. If omitted, then the rule may be executed individual time steps
    subject_class
the class to which this rule can be applied. Notice that subject class can be a unit or a junction

```
code
event_condition
initialization
```

Example 2

Spnet

Listing 2

```
// First, allocate memory for neurons
<unit_class>
    unit_class_id = 'neuron'
    initialization = 'float v=-65; float u=0; float I=0; int last_spike=-1000;'
<unit_class of neuron>
    unit_class_id = 'exc'
<unit_class of neuron>
    unit_class_id = 'inh'
<unit of exc>
    unit_id = 1:800
<unit of inh>
    unit_id = 1:200
// Now, assign dynamics to neurons (clock-based rule)
<rule_class>
    rule_class_id = 'QIF'
    subject_class = 'neuron'
    code = 'v+=0.5*((0.04*v+5).*v+140−u+I); v+=0.5*((0.04*v+5).*v+140−u+I);'
    event_condition = 'v>30'
<rule_class of QIF>
    rule_class_id = 'RS'
    subject_class = 'exc'
```

Listing 2

```
    code = 'u+=0.02.*(0.2*v-u);'
<rule of RS>
    subject_id = exc(1:800)
<rule_class of QIF>
    rule_class_id = 'FS'
    subject_class = 'inh'
    code = 'u+=0.1.*(0.2*v-u);'
<rule of FS>
    subject_id=inh(1:200)
    // Specify the after-spike rest (event-based rule)
<rule_class>
    rule_class_id = 'reset'
    code = 'v=-65; last_spike=now;'
<rule_class of reset>
    rule_class_id = 'RS_reset'
    subject_class = 'exc'
    code = 'u+=8;'
<rule of RS_reset>
    subject_id = exc(1:800)
    trigger_id = exc(1:800)
<rule_class of reset>
    rule_class_id = 'FS_reset'
    subject_class = 'inh'
    code = 'u+=2;'
<rule of FS_reset>
    subject_id = inh(1:200)
    trigger_id = inh(1:200)
    //specify synapses.
    // Inhibitory synapses are not plastic.
<rule_class>
    rule_class_id = 'inhibition'
    subject_class = 'neuron'
    rule = 'I-=6'
    // 200*100 records of the form below, each specifying an inh
synapse
<rule of inhibition>
    subject_id = {an exc or inh unit}
    trigger_id = {an index of inh unit}
    //Excitatory synapses are plastic, so their weights are stored
<unit_class>
    unit_class_id = 'synapse'
    initialization = 'float w=5; float sd=0; int last_active=-1000;'
<unit of synapse>
    unit_id = 1:80000
    //for each synapse, specify its target. This is done via
junctions
<junction_class>
    junction_class_id = 'GLU'
    unit_class_1 = 'synapse'
    unit_class_2 = 'neuron'
    // Assign the synapses, i.e., create 80000 records of the form
<junction of GLU>
    junction_id = 1:80000
    unit_1 = 1:80000
    unit_2 = {random neuron index}
    // Specify which pre-synaptic neurons trigger which synapses
<rule_class>
    rule_class_id = 'EPSP_plus_LTD'
    subject_class = 'GLU'
    code = 'I+=w;sd-=LTD(now-last_spike);last_active=now;'
    initialization = 'LTD={array}'
<rule of EPSP_plus_LTD>
    subject_id = 1:80000
    trigger_id = exc(rand(800))
    delay = rand(20)
    // Specify LTP when post-unit fires
<rule_class>
    rule_class_id = 'LTP'
    subject_class = 'synapse'
    rule = 'sd += LTP(now-last_active)'
    initialization = 'LTP={array}'
<rule of LTP>
    subject_id = 1:80000
    trigger_id = {corresponding post-synaptic neuron, though this
could in principle be anything else}
    //perform the sd-update (maintenance)
<rule_class>
    rule_class_id = 'synaptic_maintenance'
    subject_class = 'synapse'
    execution_condition = 'now%1000==0'
    code = 'w += 0.01+sd; if (w<0) w=0; if (w>10) w=10; sd *= 0.9'
<rule of synaptic_maintenance>
    subject_id = 1:80000
    // Finally, the random thalamic input that fires a neuron per ms
of time step
<rule_class>
    rule_class_id = 'input'
    code = 'fire({random neuron});'
<rule of input> // no parameters; just need this to instantiate the
input
```

The END 2.0 format may comprise the following features when compared to the END 1.0 format described, supra.

No inheritance (no object classes);

No background processes (global variables are used instead);

No separate pre-synaptic/post-synaptic rules (some or all may be part of the synaptic type)

Individual rules may include other rules and code strings, as well as execution conditions.

```
<rule>
    name
    exec_condition
``` the condition that may be evaluated at individual steps to determine whether or not to execute this rule. This can be a string e.g., 'now %10==0' or 'DA>0.1' or a reference to a rule name (this is useful if the condition needs some global tables). If absent, then the rule applies for individual execution time steps. This condition may access any variable that is defined in the code below.

Code the code string or other rule name that specifies what to do when the rule occurs. E.g., 'I+=w' or 'v+=tau*(2*(v+70)* (v+50)-u+I)/20; u+=tau*0.1*(2*(v+70)-u);'. In addition, the output of the rule can be a logical (true/false) statement that may be used in spike conditions. Multiple rule names can be provided here; they may be executed in the provided order init declares and sets the values of global variables used in this rule. E.g. 'STDP={, . . . ,}; DA=0' or 'STP={, . . . ,}; LTD={ . . . }'. Any instance variables may be defined in unit_type and synaptic_type; the linker checks that individual data types defined in different unit types and synaptic_types may be consistent with respect to the rule.

```
<unit_type>
    name
    update_rule
``` code string or rule name that may be executed at individual time steps. Multiple rules can be provided here; they may be executed in the order specified.

event_condition logical statement or rule name needed to detect spikes, e.g., 'v>30', executed at individual time steps event_rule the code or rule name that may be executed when a spike is detected. E.g. 'v=−65;u=u−8;'

Init declares and sets the initial values of individual variables and parameters used in the unit (i.e., instance variables). The linker (compiler) checks that these variables have consistent data types among individual unit types that use the same rules, for example, 'analog v=0; analog g_AMPA=0;'

```
<unit of unit_type>
unit_id
init
``` sets the parameter and variable values that may be different from the default values in the definition of the type. Individual ones or these have to be declared and already initialized with default values in the definitions of unit_type

```
<junction_type>
name
update_rule
init
<junction of junction_type>
unit_1
unit_2
init
<synaptic_type>
type
presynaptic_event_rule
``` the code or rule name that may be triggered when the pre-synaptic neuron fires. This takes care of LTP and PSP post-synaptic_event_rule the code or rule name triggered by firing of the post-synaptic unit. This takes care of the LTD part of STDP update_rule Code string or rule name that may be executed at individual time steps (e.g., may have execution_condition and may be executed rarely). Multiple rules can be provided here; they may be executed in the order specified. This may be needed for synaptic maintenance, in lieu of background processes.

```
<synapse of synaptic_type>
pre
post
delay
init
<global_variable>
update_rule
```

Rule name that initializes global variables and executes the code that updates them. The code may have access to specific instances of units, junctions, or synapses. In the simplest case, the rule can be just an assignment of the value of the global variable based on a value of an instance.

Notice that instance variables may be used in <rules> but they may be defined in <unit_type>, <junction_type>, and <synaptic_type>. It may be assumed that individual declaration of instance variables may be consistent with some or all of the rules. There may be two problems:

Situations where a variable may be used in a rule but is not defined in unit_type or junction_type or synaptic_type may be handled as follows:

The linker may generate an error

The linker uses a default type of the variable, e.g., "analog"

The linker may be instructed to look at other usage of the rule and if the variable is defined somewhere, it extends its definition.

In some implementations, a variable can be defined differently in two or more unit_types that use the same rule. Again, there may be multiple possible solutions to this:

The linker generates an error

The linker converts one of the definitions to the other one. For example, there can be a partially ordered set of definitions, e.g., int8<int16<int32<int64<analog, so that two definitions may be transformed to the common one The linker splits the rule into two rules, rule_a and rule_b, that act on different types of variables Example 2

Global Variables

```
<rule>
name = 'DA_update'
code = 'DA = exc[3].v + inh[1].u'
init = 'analog DA = 0'
<global_variable>
update_rule = 'DA_update'
```

Example 3

Spnet

The standard spnet network has N=1000 neurons; among them may be Ne=800 excitatory neurons and Ni=200 inhibitory neurons, with M=100 synapses per neuron. Some or all excitatory synapses may be plastic (STDP), with random delay between 1 and D=20 ms. The inhibitory→excitatory synapses may be non-plastic with delay D=1 ms. There may be no inh→inh synapses. The low-level description of the model is below.

```
<rule>
name='QIF2'    // only the v equation defined
code = 'v+=(0.04*v+5).*v+140+I; I=4*rand( )/MAX_RAND'
<rule>
name='spike'
code = 'v>30'
<unit_type>
name = 'exc'
update_rule = 'u+=0.02*(0.2*v−u); I−=u;'
update_rule = 'QIF2'
event_condition = 'spike'
after_event_rule = 'v=−65; u+=8; last_spike=now'
init = 'analog v=−70, u=−14, I=0; int last_spike=−1000'
<unit_type>
name='inh'    // inhibitory neuron
update_rule = 'u+=0.1.*(0.2*v−u); I−=u;'
update_rule = 'QIF2'
event_condition = 'spike'
after_event_rule = 'v=−65; u+=2;'
init = 'analog v=−70, u=−14, I=0; int last_spike=−1000'
```

```
//Ne records of the class
<unit of exc>
unit_id = 1:800    // i=1:Ne
//Ni records of the class
<unit of inh>
unit_id = 1:200    // i=1:Ni
<rule>
name = 'EPSP_plus_LTD'
code = 'I+=w; sd-=LTD(now-last_spike); last_active=now'
init = 'LTD = {array};'
<rule>
name = 'LTP'
code = 'sd+=LTP(now-last_active);'
init = 'LTP = {array};'
<rule>
name = 'Synaptic_Maintenance'
execution_condition = 'now%1000==0'
update_rule = 'w += 0.01+sd; if (w<0) w=0; if (w>10) w=10; sd *= 0.9'
<synaptic_type>
name = 'GLU'
presynaptic_event_rule = 'EPSP_plus_LTD'
post-synaptic_event_rule = 'LTP'
update_rule = 'Synaptic_Maintenance'
init = 'analog w=6, sd=0; int last_active=-1000;'
<synaptic_type>
name='GABA'
presynaptic_event_rule = 'I-=5'
delay=1    // Default delay; the same for all synapses
//Ne*M records of the class (exc-> exc or inh)
<synapse of GLU>
pre = exc[i]// i=1:Ne
post = exc[j] or inh[j] // random, between 1 and Ne or 1:Ni
delay     // a random number between 1 and D
//Ni*M records of the class (inh->exc)
<synapse of GABA>
pre = inh[i]// i=1:Ni
post = exc[j]    // a random number between 1 and Ne
```

The END format 3.0 implements several major changes when compared to the END 2.0 format. These may include:
Introduction of one-way junctions
Splitting of the junction update_rule into two rules: the update_rule (configured to modify junction variables); and the delivery_rule (to configured modify the post-synaptic unit variables)
Removal of the post-synaptic_event_rule
Splitting of the presynaptic_event_rule into: the prepost_rule (for LTP part of STDP); the postpre_rule (for LTD part of STDP); and the delivery_rule (for delivering PSP)
Atomic addition for the delivery_rule (for junctions and synapses)
Removal of the clock-based synaptic update rule (it can be implemented via postpre_rule)
Implementing global variables via links to instance variables.

Individual names and statements in END 3.0 may have similar meaning to those in END 2.0 unless stated otherwise. For END 3.0, the syntax exc:3 may be used to refer to the instance 3 of the type 'exc'.

The presynaptic_event_rule can comprise multiple independent rules. For the purposes of this description, the designators t1 and t2 denote the times of spikes of the pre-synaptic neuron arriving at the post-synaptic unit (i.e., conduction delay may be already incorporated into t1 and t2), where the t2 corresponds to the current simulation time (also referred to as 'now').

The prepost_rule may be executed at any time before t1 to implement the LTP part of STDP that would correspond to a pair of pulses with pre-synaptic neuron firing at t1 and a subsequent post-synaptic neuron firing after t1 but before or at t2. While the prepost_rule rule has access to the system variables prepre (now-t1) and prepost (post_spike-t1), it does not have access to any post unit variables or the system variable at time t2 ('now'), as it may be not clear when this rule is called. If prepost_mode=11 (1-to-1), then individual pre-synaptic spikes trigger 1 call for prepost_rule. If prepost_mode=1A (1-to-all), then individual pre-synaptic spike triggers prepost_rule for subsequent post-synaptic spikes (with its own prepost variable), up to the moment of the next pre-synaptic spike. The parameter prepost_max (if given) may limit the span of time after the pre-synaptic spike during which to consider post-synaptic spikes for prepost_rule. For example, if the LTP window of STDP is only 50, then there may be no point of considering pairs of pre-post spikes with the interval greater than 50. In some implementations, prepost_rule may be called when the earliest post spike after t1 occurs later than t1+prepost_max. In some implementations, the rule may be not called if the post spike never occurs during the period between t1 and t2.

The postpre_rule may be executed just before time t1 in order to update the synaptic variables based on the timing of the previous pre-synaptic spike (prepre=t2−t1) and the last post_synaptic spike (postpre). The latter variable may be provided even if a long period of time has elapsed since the previous post spike occurred. The variable 'now' points to the current time, and individual variables from the post-synaptic unit may be available for reading.

The delivery_rule may be called at time t1, but after the postpre_rule updated the synaptic weights. The delivery_rule has access to individual ones of the variables of the latter rule, plus has write access for atomic addition to the variables of the post unit.

Listing 3

```
<rule>
    name
    exec_condition
    code
    init
<unit_type>
    name
    update_rule
    event_condition
    after_event_rule
    init
<unit of unit_type>
    unit_id
    init
<junction_type>
    name
    update_rule
    delivery_rule
    init
<junction of junction_type>
    pre
    post
    init
<synaptic_type>
    type
    prepost_rule
```

In the code example shown in Listing 3, the rule may be triggered before t2 and it modifies the synapse. The rule can read and write synaptic variables but does not have access to any variables from the post-synaptic unit. The rule has access to prepre=t2−t1 and prepost (post spike-t1).
  prepost_mode
  Two modes may be supported, 11 (1-to-1) and 1A (1-to-all). The former calls the rule at most once, while the latter calls multiple times for individual post unit spikes after the pre unit last spike. Default: 11 prepost_max limits the scope of time after the pre unit spike to consider to form pre-post pairs. Some or all post spikes after t1+prepost_max may be ignored.

postpre_rule the code or rule name that may be triggered at t2 and modifies the synapse. It can read and write synaptic variables and has read access to variables from the post-synaptic unit. It has access to prepre, postpre, and now=t2.

delivery_rule the code or rule name that may be triggered at t2 and modifies variables of the post unit. It has read access to synaptic variables, prepre, postpre, and now=t2. This code may be atomic addition.

```
<synapse of synaptic_type>
    pre
    post
    delay
    init
```

In some implementations, it can be desirable to model short-term synaptic plasticity, which may be triggered by pre-synaptic spikes. Often, this may require having a variable or a vector of variables that may be modified by individual pre-synaptic spikes and then evolves according to some equation, but only values of this variable at the moment of pre-pulses may be needed. In this case, the variable may be part of individual synapses. However, since the value of some or all such variables is the same for all synapses, a compiler (linker) from END to an engine can remove these variables from synapses and use a single pre-synaptic variable instead, subject to a "pre-rule". The END format may have a special tag or a label, or a statement that would help the compiler to identify such pre-event triggered variables in synaptic event rules or pre-synaptic unit event rules.

If the END program is distributed among multiple engines, then individual engines can transfer the value of such variables with individual pre-synaptic spikes. In some implementations, individual engines that receive synapses from such pre-synaptic unit can keep a local copy of the variable, updating it the same way as it may be updated in the engine that hosts the pre-synaptic unit.

The spnet network may comprise N=Ne+Ni=1000 neurons, where Ne=800 excitatory neurons and Ni=200 inhibitory neurons. Individual neurons may comprise M=100 synapses per neuron. Some or all excitatory synapses may be plastic (STDP), with a random delay ranging between 1 ms and D=20 ms. The inhibitory→excitatory synapses may be non-plastic with a delay of D=1 ms. There may be no inh→inh synapses. The low-level END 3.0 description of the model may be expressed as follows.

Listing 4

```
<rule>
    name='QIF2'   // only the v equation defined
    code = 'v+=(0.04*v+5).*v+140+I; I=4*rand( )/MAX_RAND'
<rule>
    name='spike'
    code = 'v>30'
<unit_type>
    name = 'exc'
```

Listing 4

```
    update_rule = 'u+=0.02*(0.2*v-u); I-=u;'
    update_rule = 'QIF2'
    event_condition = 'spike'
    after_event_rule = 'v=-65; u+=8;'
    init = 'analog v=-70, u=-14, I=0;'
<unit_type>
    name='inh'   // inhibitory neuron
    update_rule = 'u+=0.1.*(0.2*v-u); I-=u;'
    update_rule = 'QIF2'
    event_condition = 'spike'
    after_event_rule = 'v=-65; u+=2;'
    init = 'analog v=-70, u=-14, I=0;'
    //Ne records of the class
<unit of exc>unit_id = i   // i=1:Ne
    //Ni records of the class
<unit of inh>
    unit_id = i   // i=1:Ni
<rule>
    name = 'LTD'
    code = 'sd-=LTD(postpre); w += 0.00001*prepre + sd*10*(1-
0.9999^prepre); if (w<0) w=0; if (w>10) w=10; sd *= 0.9999^prepre)'
    init = 'LTD = {array};'
    // sd'=-sd/10 sec; 0.9999^x = exp(-x/10000); the rule could be
optimized so that 0.9999^x is computed only once: w+10*sd; sd*=..;
w-=10*sd;' It could be further optimized so that 10* is removed (but
LTP and LTD tables are scaled up by 10).
<rule>
    name = 'LTP'
    code = 'sd+=LTP(prepost);'
    init = 'LTP = {array};'
<synaptic_type>
    name = 'GLU'
    prepost_rule = 'LTP'
    postpre_rule = 'LTD'
    delivery_rule = 'I+=w'
    init = 'analog w=6, sd=0;'
<synaptic_type>
    name='GABA'
    delivery_rule = 'I-=5'
    delay=1   // Default delay; the same for all synapses
    //Ne*M records of the class (exc-> exc or inh)
<synapse of GLU>
    pre = exc:i// i=1:Ne
    post = exc:j or inh:j // random, between 1 and Ne or 1:Ni
    delay    // a random number between 1 and D
    //Ni*M records of the class (inh->exc)
<synapse of GABA>
    pre = inh:i// i=1:Ni
    post = exc:j   // a random number between 1 and Ne
```

Elementary network interface (ENI) can be implemented as a communication protocol that implements data exchange between two simulations described in the low level description END format or any other entity that may be required to send/receive data to/from a simulation (e.g. input device, visualization/debug tool, and/or other entities). The ENI may be strongly entwined with END itself, and it can be used to partition large END files into smaller pieces, ensuring correct results. Certain parts of ENI may require detailed knowledge of the END engine handling of communication events.

Figure 3:
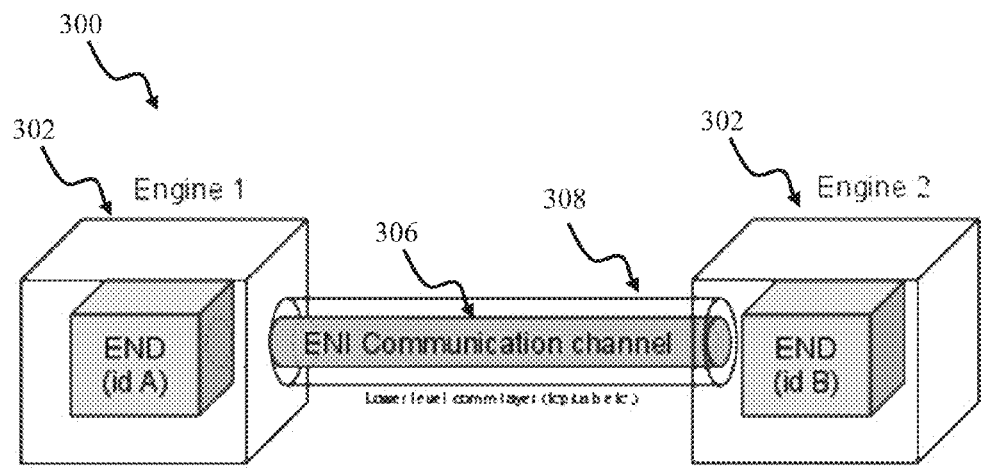
FIG. 3 is a block diagram illustrating one implementation of END simulations comprising ENI communications channel according to the disclosure.

Referring now to FIG. 3, a generalized communication framework 300 between two computational engines 302 (individual ones running an END model simulation) is shown and described. The ENI communication protocol may be implemented in some physical means of communication (e.g. USB/Bluetooth for peripherals or Ethernet/Infiniband, for more demanding situations). Individual ones of the computational engines 302 may implement the ENI (the communications pipe denoted as 306 in FIG. 3) on top of the transport layers available (the communications pipe denoted as 308 in FIG. 3). Note that ENI forms a layer of communication between models described by END, and not between the engines 302 themselves.

In some implementations, the engines 302 may be connected by the low level transport layer may discover each other and pair automatically. Manual setup may be possible (e.g. for engines connected via IP protocol). The communication specification file (ENI file) may be supplied along with the END file to the engine. Once the engine discovers that it is paired with another engine that runs the right END file, the ENI channel may be negotiated and established (green pipe in FIG. 1). The ENI communication specification file can be regarded as a mapping, which helps both parties to understand each other and target the right units of the right classes.

Figure 4:
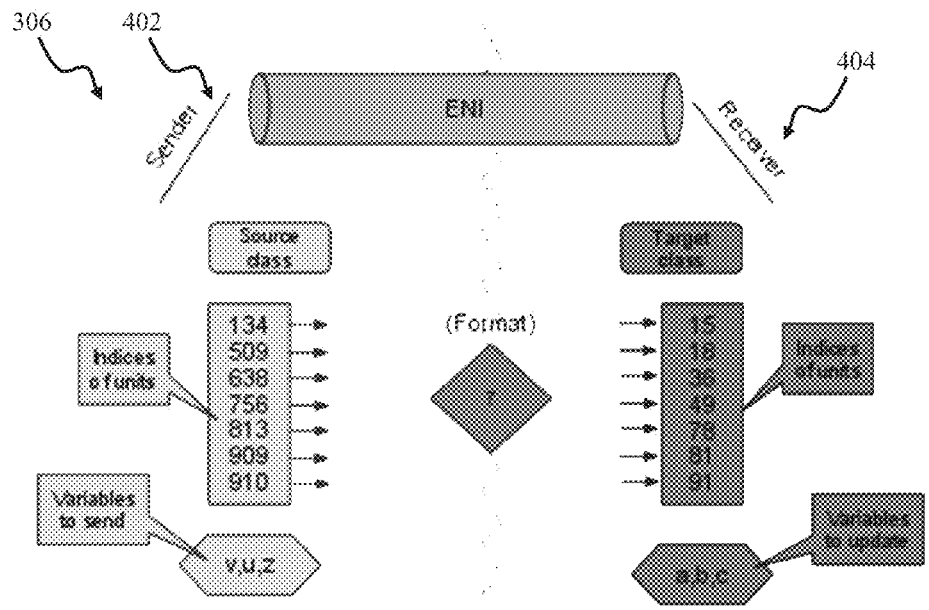
FIG. 4 is a block diagram illustrating ENI communications channel in accordance with one implementation.

FIG. 4 shows a block diagram of ENI communications channel 306 of FIG. 3. The channel 306 may be defined by its endpoints (the IDs of the low level END description, such as the END A and END B in FIG. 3) and a set of parameters that describes how the communication is performed and what type of information may be communicated. The communication channel 306 may be unidirectional, going from left to right direction, and may be defined by the sending entity 402 and the receiving entity 404. The data transfer may be one way (though negotiation and meta information in the transport layer are not restricted).

The ENI channel parameters may include one or more of:
Sender and receiver END ID's and an identifier that uniquely identifies the channel;
Sender and receiver classes;
Sender and receiver class instances (enumerated by their number within the class);
Content: events/spike notifications or values of certain parameters;
Format of the data sent;
Modes of operation (sync, async) and their parameters (frequency, phase shift, and/or other parameters);
And/or other parameters.

In one implementation, the ENI communication channel may be used to exchange (i) spike (event) notifications and (ii) values of selected class parameters (variables). These two content types may require different data sent through the channel, namely:
Unit indices (for spike notifications)
The actual values of variables (of some or all instances transmitted by the channel)

In one implementation, network unit indices interleaved with values variables. Such implementation may be applicable when the values need to be sent for the units that experienced an event (spike), so as to minimize network traffic. To summarize, the following data formats may be supported:
Indices (some units) either with values or not. If the values are missing, then the data may be interpreted as a spike notification.
No indices (some or all units) but only values. (If the values are missing then the data may be interpreted as a spike notification of individual ones of the units involved).

These two content types (i.e., events and data) are not mixed in a single ENI channel instance. In some implementations, whenever the ENI channel is set to transmit events/spike notifications, the target units may be ("artificially") fired; that is, the event may be scheduled on the receivers spike queue but any post event actions like LTP or reset are not performed. In some implementations, the units that can be fired externally do not have any local incoming synapses that may be subject to plasticity rules (e.g., LTP). In some implementations, the units may be configured to respond to both the external firing triggers and plasticity rules such that whenever they may be fired externally, the post event rues are not invoked. Such configuration ensures simulation consistency and enables split-simulations produce the same outcome as a "single simulation". Therefore, when partitioned appropriately, it may be (considering the restrictions above) possible to obtain the same results with the splits simulations as with the single simulation. In some implementations, the model partitioning may be facilitated via an introduction of special fake/receiving units as required.

FIG. 4 illustrates content, formats and expected behavior in the ENI communications channel. In the case of transmitting values of variables, the channel description specifies the set of variables of the sender and receiver classes. In other words, ENI specifies which variables within the source class may be mapped to which variables in the target class. The consistency requirement may be that either the internal representation of the variables sent through the channel may be compatible between sender and receiver or the communication channel performs necessary conversions. After individual communication events, the values in the target class may be updated to the new values.

In some implementations, the ENI channel transmits data related to units in END format. In some implementations, the data related to synapses or junctions (e.g., synaptic weights or other variables) may be transmitted.

The ENI channel can introduce a mapping from certain elements of the source unit class in the END format to certain elements of the target class. Individual channels establish communication between one sender class and one receiver class. The mapping establishes the indices that may be sent through the wire (refer to the FIG. 4), if spike notifications are being sent, or the order of values if parameter values may be communicated.

The ENI channel need not send information at individual model simulation cycles. The ENI files specify the periods T1, T2 (expressed in engine model simulations cycles) of sending/receiving. The designator T1 corresponds to the sending side period (so the data may be sent only every T1 cycles), T2 describes the receiver side (data may be expected to have been delivered to the simulation every T2 cycles). The data may be delivered to the engine at any point, but the engine may keep (buffer) it and may make it available to the running simulation at the appropriate receiving point.

The ENI communication channel may be configurable to operate in two modes—synchronous and asynchronous. In synchronous mode, the transmission and delivery may be synchronized to the nearest simulation cycle. In asynchronous mode, the (input) data may be continuously provided to the computational engine and delivered to the respective units of the simulation instance whenever it is ready. While the synchronous mode ensures timely delivery of data it may cause serious performance bottlenecks for high input data rates. Conversely, the non-synchronous mode may cause undefined model behavior due to variable data delivery times.

Figure 5:
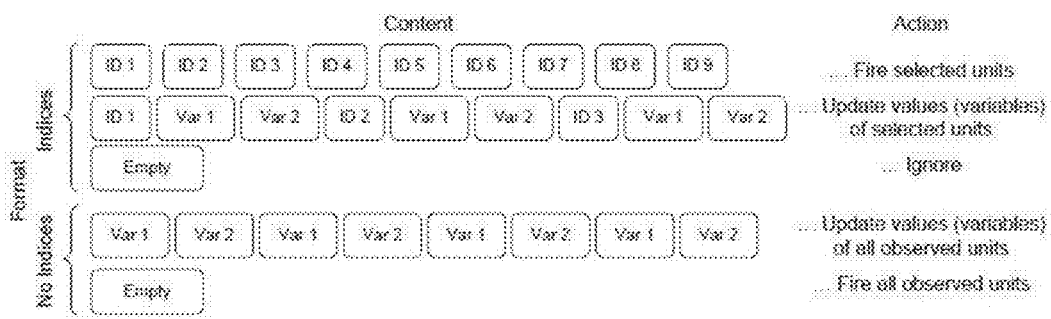
FIG. 5 is a block diagram detailing content, formats and expected behavior in ENI, in accordance with one implementation.
Figure 6:
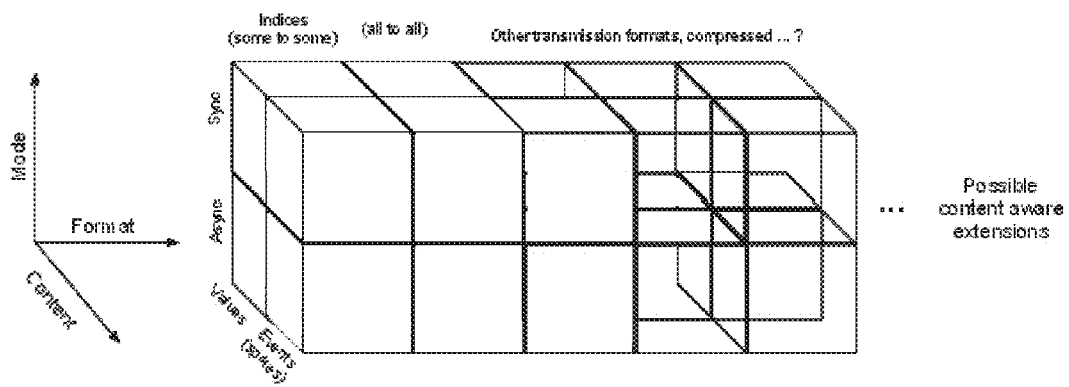
FIG. 6 is a graphical illustration depicting modes of operation of the ENI (scheme) in accordance with one implementation.

FIG. 5 presents examples of modes of operation of the ENI (scheme). Combined two formats, two content types and two modes of operation form a cube as illustrated in the implementation FIG. 6. In some implementations, the ENI may be extended in terms of possible data formats and may include content aware compression.

In one implementation of the synchronous mode, it may be assumed that the receiving engine cannot proceed through the data receiving point unless the necessary data has arrived (so the receiver synchronizes with the sender).

The channel in that mode specifies additional property—namely the phase shift S. If the shift S>0 the engine may proceed with the simulation if the data packet sent S cycles ago has arrived (since engines are synchronized it does not matter whether these are sender or receiver cycles). The phase shift allows for better utilization of the communication channel whenever the actual structure of neuro-simulation allows for it (that is certain projections sent through ENI channel have delays that can be used to relax requirements for the channel and introduce the shift, see FIGS. 7A and 7B). The underlying transport may introduce priorities to channels based on their phase shift (the time required to deliver the data).

The sender can proceed with other tasks after the data may be sent without waiting for any delivery notification, however if the message may be not delivered, the next attempt to send data over the channel may hold the simulation. (The sending engine may not proceed if more than S non-confirmed deliveries occur in a synchronous channel with phase shift S).

In some implementations, particularly where applicable to the non-synchronous (i.e., asynchronous) mode, the frequency of sending and receiving data may be specified, but the engine does not stop its execution until the data may be sent. On the receiving side, the asynchronous mode does not impose any data delivery timing restrictions. In some implementations, the computational engine may be configured to receive the data arriving in indivisible chunks (block transfer). In some implementations, the data may be transferred via a stream (streaming transfer). Other examples may be possible, such as, for example, a combination of block and streamed transfer. In the block transfer sub-mode, the transmitted message may be assumed to be delivered after data within the block has been delivered to the receiver (e.g., the receiver 404 in FIG. 4) and the communication transaction may be completed. In the streaming sub-mode, the data that becomes available at the receiver may be gradually transmitted to the engine, regardless of whether the transmission transaction has completed or not.

In the asynchronous block mode it may be assumed that the latest message is actually delivered to the engine, while others received before the engine encountered the receiving point may be discarded (It might be useful when a real-time input device (like a camera) is sending data in non-synchronous mode faster than the engine can handle). The asynchronous streaming mode accumulates the data, and delivers it at the closest receiving point.

Figure 7A:
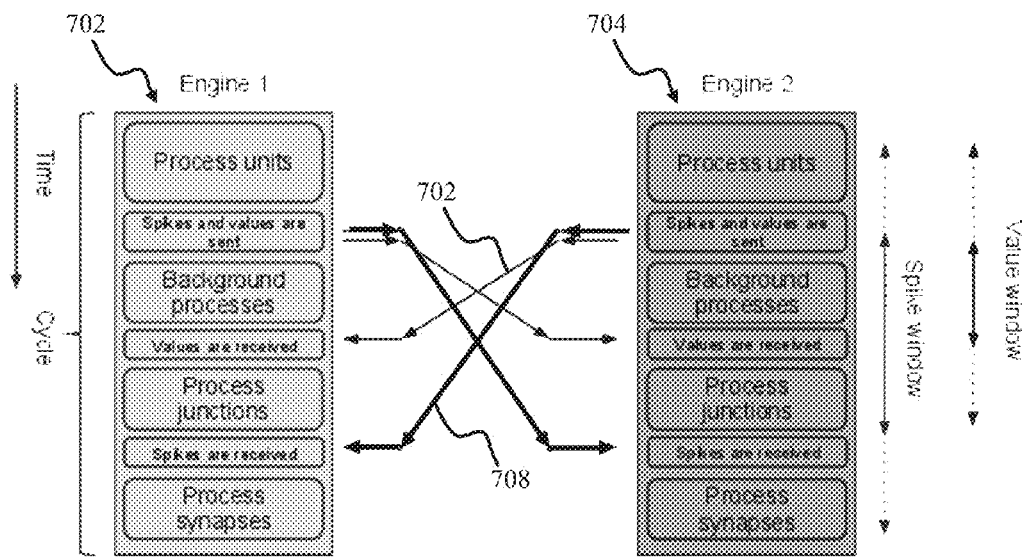
FIG. 7A is a block diagram illustrating a fully synchronous communication over the ENI channel, in accordance with one implementation.
Figure 7B:
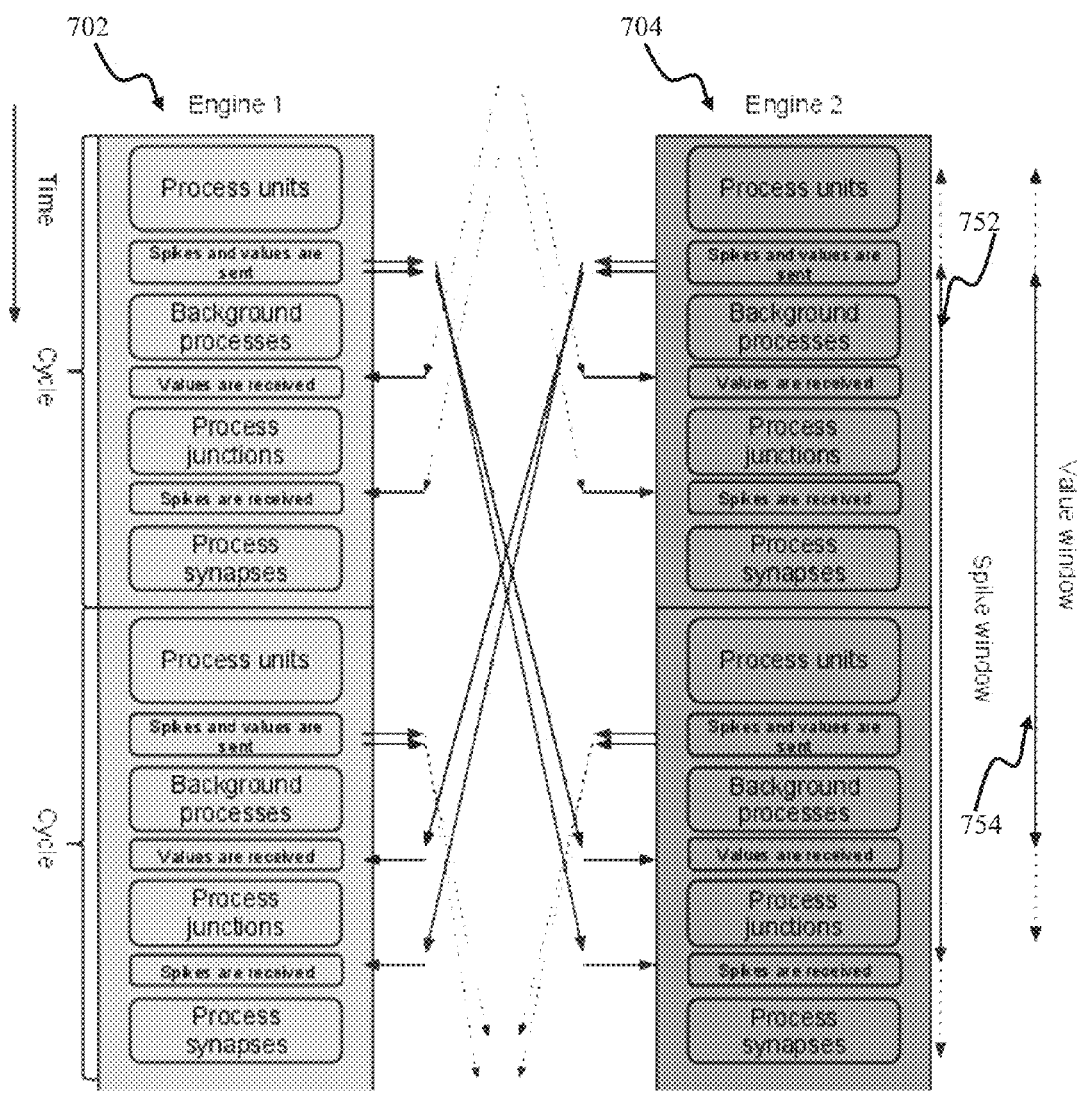
FIG. 7B a block diagram illustrating synchronous communication of the implementation of FIG. 7A with a shift (S=1 in both directions), in accordance with one implementation.

FIG. 7A illustrates one example of fully synchronous communication between two computation engines 702, 704. The implementation of FIG. 7A can ensure timely data exchange between the engines 702, 704, and can reduce communications delays, thereby minimizing potential communication channel jamming due to delays that may be associated with heavy and uneven data flows in large, real-time neuronal model simulation runs. In some implementations, various data transfer optimization may be used, which significantly expand the communication bandwidth. In FIG. 7B, the event indices and data values may be sent through separate ENI channels (denoted by the heavy and thin arrows 706, 708, respectively, in FIG. 7A), and have separate receiving points FIG. 7B illustrates one example of synchronous communication with a phase shift of one system clock cycle (simulation step) (S=1 in both directions). The communication channel is used more evenly due to the window overlap (as indicated by the vertical arrows 752, 754 in FIG. 7B, but spikes and values arrive with a delay of 1 ms/step.

The sending point refers to a logical constrict of the simulation model which may be used to describe the data and events that become available immediately after processing of units during model execution by the computational engine. Similarly, the receiving point may be used to describe data staging container used before processing junctions during individual simulation cycles. Such an arrangement may leave a short communication window but the following optional optimization may be possible:

The sending driver processes units in a priority order and sends out the data as soon as they become available while other units are still being processed by the engine in parallel.

The receiving driver executes local junctions while still awaiting for the necessary data to arrive.

If the channel sends spike notifications, the computational engine can process synapses from local units before receiving the data on spikes from non-local units. In such a case the communication window can be significantly expanded (as denoted by dotted arrows in FIG. 7B).

Listing 7 illustrates one example of an ENI definition file (known to sender/receiver drivers) useful in a network simulation that uses END. It will be appreciated by those skilled in the arts that while the examples below shows some or all of the data that may be required to set up a channel, the actual format of that file might change to XML or some other format.

Example 4

Example 4 describes engine simulations where 'Retina' END file sends indices of selected units from class 'RGC' that fired to the engine running 'LGN' END file. Selected elements of class 'exc' are fired. The communication may be synchronous, synchronization points appear at individual cycles on one or both of the sender or receiver, and the channel may have no shift (delay).

Listing 7

```
ENI_ID = 'CommC'
SOURCE_ID = 'Retina'
// id of the source END file (simulation)
TARGET_ID = 'LGN'
// id of the target END file (simulation)
MODE = SYNC
T1=1
// sender sync frequency - when to send data (in simulation cycles)
T2=1
// receiver sync frequency - when to expect data (in simulation cycles)
S=0
// receiver phase shift
FORMAT = INDICES
// Only spiking units will be observed by the channel
SENDER_VALUES = NONE
// only indices will be sent, that is channel will fire target units
RECEIVER_VALUES = NONE
SENDER_CLASS = 'RGC'
RECEIVER_CLASS = 'exc'
NUMBER_OF_UNITS = 500
// How many units will be observed by the channel?
SENDER_UNITS = 84 23 395 39 201 34 ...
RECEIVER_UNITS = 33 45 67 98 18 34 19 ...
```

Example 5

Example 5 illustrates engine simulations where the 'Camera' END may asynchronously send values of 'R, G, B' variables in class Pixel, to variables 'Red,Green,Blue' of class RGC in the Retina END file.

Listing 8

```
ENI_ID = 'ENI2'
SOURCE_ID = 'Camera'
// id of the source END file (simulation)
TARGET_ID = 'Retina'
// id of the target END file (simulation)
MODE = ASYNC
STREAM = NO
// the receiver will not accumulate data (only the latest data will be delivered to the engine)
T1=1
// sender sync frequency - when to send data (in simulation cycles)
T2=2
// receiver sync frequency - when to expect data (in simulation cycles)
FORMAT = NOINDICES
// All values will be sent every time
SENDER_VALUES = 'R,G,B'
// values of those variables will be sent
RECEIVER_VALUES = 'Red,Green,Blue'
// Values of those variables will be updated
SENDER_CLASS = 'Pixel'
RECEIVER_CLASS = 'RGC'
NUMBER_OF_UNITS = 1024
// How many units will be observed by the channel?
SENDER_UNITS = 1 2 3 4 5 6 7 8 9 10 11 ...
RECEIVER_UNITS = 33 45 67 98 18 34 19 ...
```

Figures 12, 13:
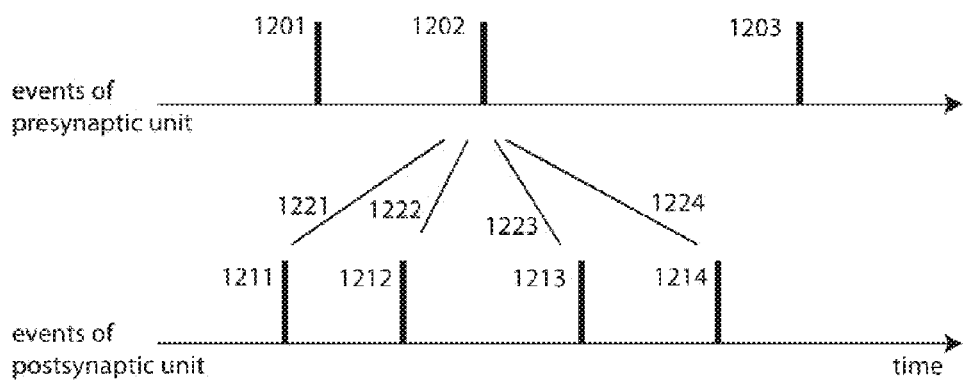
FIG. 12 is a block diagram illustrating the doublet-event rule implementing Spike-Timing Dependent Plasticity (STDP), in accordance with one implementation.
FIG. 13 comprises a table listing possible values of communications parameters, in accordance with one implementation.

The table shown in FIG. 13 lists possible values of communications parameters used in Listing 8:

In some implementations, many ways exist to handle a large neuro-simulation model (defined, for example, using a high level description format). In some implementations, the processing may be performed by a single processing computational engine. In some implementations, the processing may be distributed within a set of several computational engines (computing nodes). In order to achieve efficient workload distribution the model needs to be partitioned. In some implementations, one large low-level description (END file) of the model may be generated and the partitioning may be performed by the distributed computational engine. This example offers benefits of real time load adjustment and rebalancing, but is technically more complex and may require an advanced distributed load controller. In some implementations, the model may be partitioned into a set of END files and ENI communication channels, which may be executed separately from one another. There may be a way to split a neuro-simulation into parts using ENI, possibly by introducing additional "fake" units.

Figure 8:
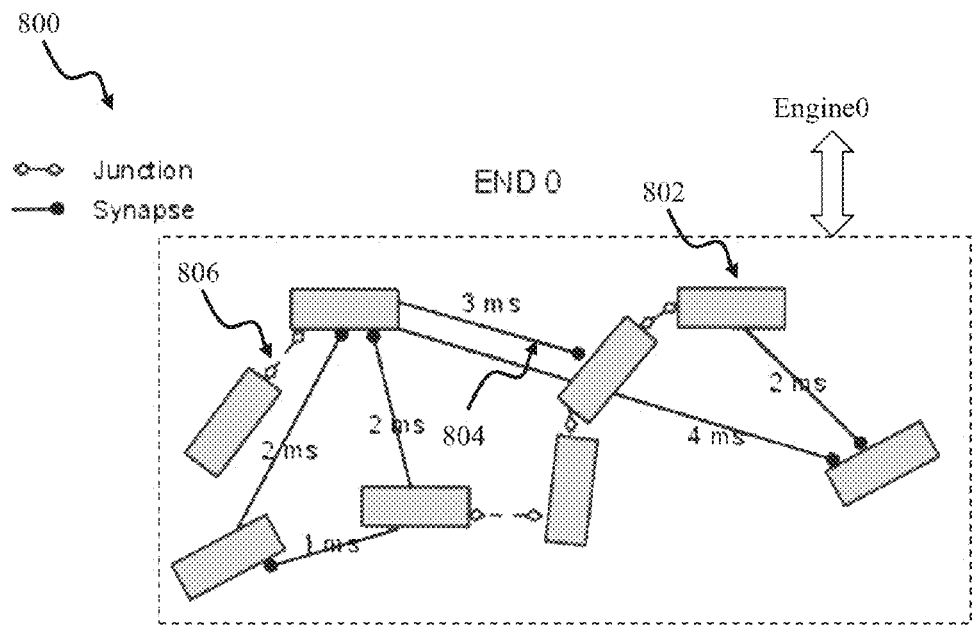
FIG. 8 is a block diagram illustrating a sample communication model with junctions and synapses with delays, in accordance with one implementation.
Figure 9:
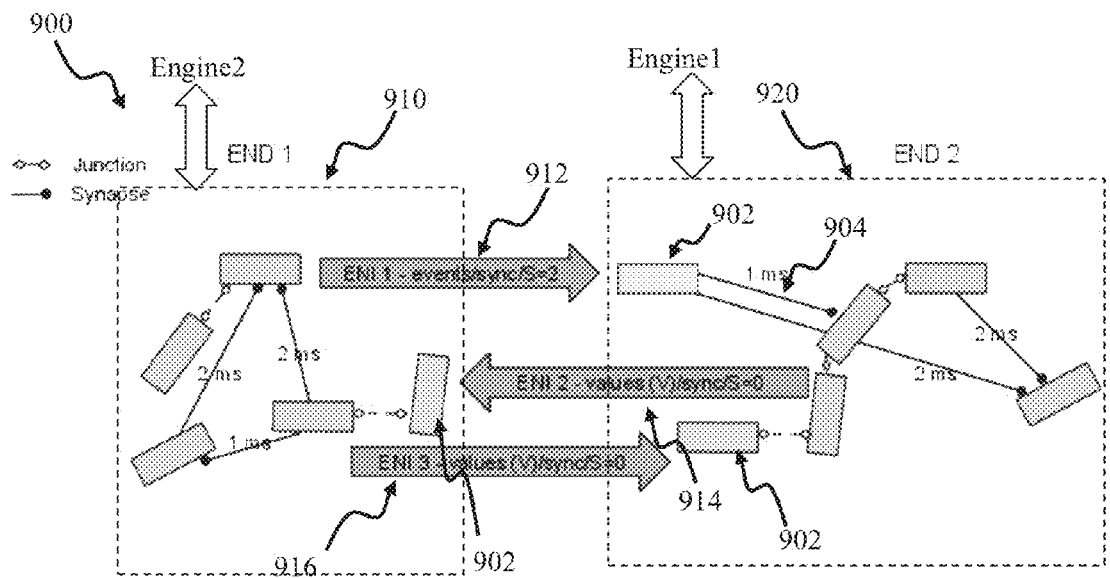
FIG. 9 is a block diagram illustrating communications model comprising ENI channels, according to one implementation.

FIGS. 8 and 9 illustrate one example of model partitioning according to certain aspects of the present technology. FIG. 8 shows the END model 800 comprising of several units 802, synapses 804 and junctions 806 and described using the END file END0. The numerals along the synapses 804 denote synaptic delays. The model 800 simulation may be executed using a single computational Engine0.

FIG. 9 illustrates partitioning of the model 800 into two partitions 910 and 920, described using the END files END1, END2, respectively. The partitions 910, may be interconnected using three ENI interfaces: ENI1, ENI2, ENI3, denoted as 912, 914, 916, respectively in FIG. 9. Some additional 'fake' units have been introduced (rectangles marked as 902). Because the ENI 1 channel has a phase shift S=2, the channel communication delay may be compensated by using smaller delays of the target synapses, as illustrated by a comparison of the synapses 804 and 904 in FIGS. 8 and 9, respectively. Note, that such implementation may be possible when there are no synapses of minimal delay (e.g., 0) in the original model (the model 800) along the partition line that may be replaced by an ENI channel. The compiler from a high-level definition language can take into account the delays while splitting the simulation to optimize communication (e.g. enlarge the communication window, balance the amount of data sent, and/or other operations to optimize communication). Simulation of the model 900 may be executed using two computational engines: Engine 1 and Engine 2, as illustrated in FIG. 9. The multi-partition simulation 900 may be capable of producing the same simulation results, compared to the single partition simulation implementation 800, providing the distributed computational Engine1/Engine2 has sufficient numerical precision to avoid rounding errors.

In some implementations of partitioned model (not shown), the following features may be implemented:

On the fly ENI channel setup and link negotiation (for dynamic debugging and monitoring);

Support for additional data formats, e.g., analog.

Support for dedicated hardware infrastructure to run ENI;

A convenient and intuitive way to specify ENI format

As described above with respect to the distributed model simulation (such as the partitioned mode 900 of FIG. 9), the model can be split into several partitions (e.g., the partitions 910, 920). Individual partitions may be executed on a single computational engine (engine1, Engine 2 of FIG. 9. In some implementations, the computational engine may comprise a single processing unit (CPU) implementation. Individual computational engines may comprise multiple processing units (PU), such as, for example, CPU, FPGA, MCU, running in parallel. Such parallelization enables a substantial increase in the model simulation throughput (that may scale with the number of parallel PUs). To enable parallel model execution, the simulation domain may be divided into several processing blocks (processing domains), individual blocks being assigned to individual PUs. Individual processing blocks may be configured to (i) keep track of local compartments, local spike queues, and/or other local information; (ii) store list (table) of incoming "synapses" (not applicable for END 3.0); and store s list of local junctions which can be processed without locking. Compartments may be tagged with domain id-s, which may be informed whenever they spike. When such an externally visible compartment spikes, the appropriate information may be sent to neighboring domain, which does the rest of processing (e.g., synaptic queues).

For individual steps, the voltages of compartments connected via external (remote) junctions may be sent to their target domains. Respectively, received voltages may be used to compute junction currents.

The data that the processing domains may be exchanging are one or more of: (i) the spikes; or (ii) junction voltages (or some other variables that are transmitted across junctions). Since most junctions will be of dendritic type (local), the amount of data in individual exchanges may not be large (if the domain division takes dendritic junctions into account).

In some implementations, a heterogeneous parallelized computational engine may be implemented using multi-core symmetric multiprocessors (SMP) hardware. In some implementations, the SMP implementation may contain a graphical processing unit to implement.

Figure 10:
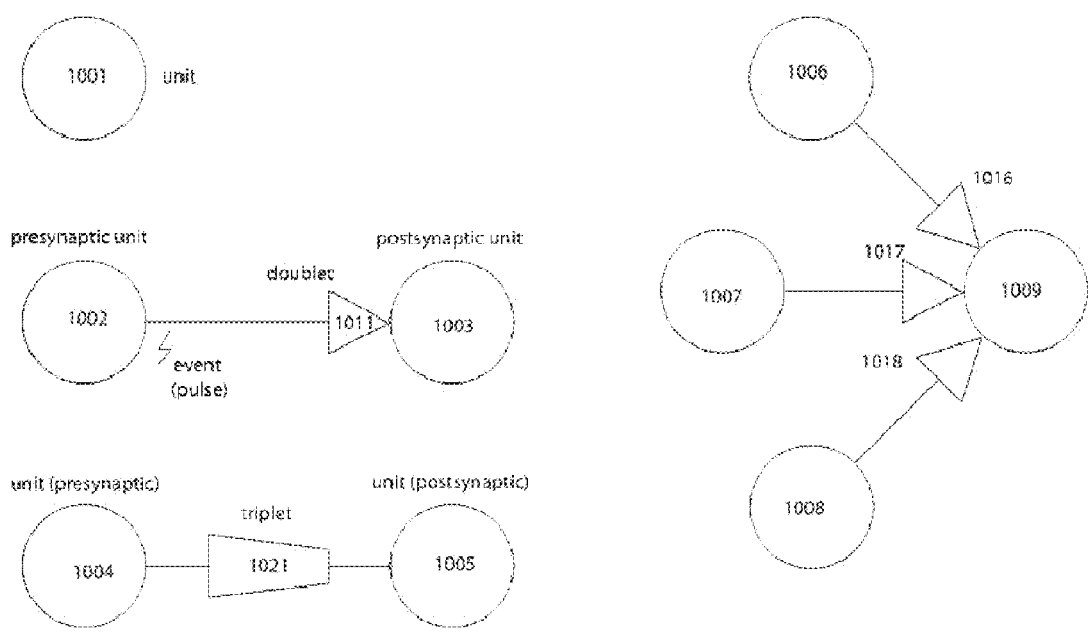
FIG. 10 is a block diagram illustrating various exemplary of the END engine, in accordance with one implementation.

FIGS. 10 through 12 describe different exemplary implementations of the technology that do not depend on the syntax of the END language. FIG. 10 illustrates the three basic structures of the END engine, which can be implemented on a standard CPU, GPU, or in an integrated circuit (e.g., an ASIC). These may be the "unit" 1001, the "doublet" 1011, and the "triplet" 1021. The END engine handles the execution of the unit, doublet, and triplet rules and the access to the memories of these elements. The END formats above can be treated as the hardware specification language that would configure a semiconductor circuit having such units, doublets, and triplets that executes a specified neuronal network.

In some implementations, individual basic structures (unit, doublet, and triplet) may be implemented as a single thread on a multi-thread processor. In some implementations, individual structures may be implemented as a super-unit, super-doublet, and super-triplet that may comprise dedicated circuits configured to processes units, doublets, and triplets respectively using time multiplexing (possibly, three different circuits for units, doublets, and triplets).

In some implementations, the unit 1001 represents a neuron or a part of a neuron, e.g., a dendritic compartment. In some implementations, the unit 1001 represents a population of neurons, with the activity of the neuron representing a "mean-firing rate" activity of the population or some other mean-field approximation of the activity of the population. Individual units may have their own memory variables and an update rule that describes what operations may be performed on its memory. The operations can be clock-based, i.e., executed at individual time steps of the simulation, or they can be event-based, i.e., executed when certain events may be triggered. The unit update rules may not involve variables that belong to other units. Hence the execution of the unit update rule may be independent on the order of execution of unit update rules of other units, thereby enabling parallel execution of the unit update rules.

Depending on the values of the unit variables, the units may generate events—pulses or spikes—that trigger synaptic events in other units via doublets. For example, a unit 1002 in FIG. 10 can influence unit 1003 via the doublet 1011, which represents a synapse from pre-synaptic neuron (pre-synaptic unit 1002) to post-synaptic neuron (post-synaptic unit 1003).

Units can have after event update rules that may be triggered after the event is triggered. These rules may be responsible for modification of unit variables that are due to the events, e.g., the after-spike resetting of voltage variables.

Individual doublets may have their own memory variables, and may access variables of the post-synaptic unit. The access may include read and write. Individual doublets may have a doublet event rule that makes a change to the doublet memory, to implement synaptic plasticity, and the post-synaptic unit memory, to implement delivery of pulses. The doublet event rule encompasses the synaptic rules described in the END formats above.

Since multiple doublets (e.g., 1016-1018 in FIG. 10) can connect corresponding multiple pre-synaptic units 1006-1008 to a single post-synaptic unit 1009, it may be desirable that the doublets modify the post-synaptic unit memory in parallel or in arbitrary order and the result be order-independent. This may be easy to achieve if the operation on the post-synaptic unit memory is atomic addition (as in GPUs), atomic multiplication (which is equivalent to addition via logarithmic transformation), or resetting to a value (with individual doublets trying to reset to the same value). In some implementations, the post-synaptic unit variable that is being modified by the doublet event rule may not use in the rule. The result may depend on the order of execution of doublet event rules.

In the context of neural computations, it may be desirable to have an axonal conduction delay, so that there may be a time-delay between an event generated by a pre-synaptic unit and the execution of the doublet event rule triggered by the unit. The delay can be implemented as a buffer, so that individual doublets receive the event with some delay. That is, the END engine registers an event generated by a pre-synaptic unit and puts a special marker into a delay-line queue depending on the magnitude of the delay. The delay may be counted down and then the event transmitted to the doublet for the execution of the doublet event rule.

In some implementations, the doublets do not have access to pre-synaptic unit variables. However, in some implementations, doublets may have access to some pre-synaptic unit variables. In some implementations, pre-synaptic unit may have variables that are modified during events triggered by the unit (i.e., event-based memory), and the modification does not depend on the values of the other pre-synaptic unit variables. In such an example, such event-based memory may reside in the pre-synaptic unit memory, or equivalently, it may be treated as if a copy of the event-triggered variables resided at individual doublets or shared among doublets The doublet event rule may be part of a class of doublet rules, which in some implementations may include post event rules and doublet update rules, as illustrated in FIG. 11. The post event rule may be a rule that is triggered by a post-synaptic unit and executed for doublets connecting to the post-synaptic unit. In some implementations, the post event rule of a doublet may depend on the timing of the immediately preceding pre-synaptic event. The doublet update rule may be a clock-based rule that is executed for individual doublets at one or more time steps (e.g., every system clock cycle within a period of time).

In the implementation illustrated in FIG. 12, the doublet event rule may comprise a timing event rule that (i) is configured based on the timing of events of the pre-synaptic and post-synaptic units; and (ii) controls the modification of doublet memory variables. The update rule, illustrated in FIG. 12, is at implementing Spike-Timing Dependent Plasticity (STDP)—standard form of plasticity in spiking networks.

The timing event rule can comprise a pre-post event rule that implements the part of the STDP that corresponds to pre-synaptic neuron firing first (or the spike arriving from the pre-synaptic neuron first) and then the post-synaptic neuron firing thereafter, e.g., the pulses 1202 generated before the pulses 1213, 1214. In the classical STDP this would correspond to the long-term potentiation (LTP) part of the STDP curve. This rule modifies the memory of the doublet based on the timings of the pre-synaptic and at least one subsequent post-synaptic firing, e.g., the pair 1202, 1213 (denoted by the line 1223); it may depend on the time difference.

The timing event rule can comprise a post-pre event rule that implements the long-term depression part of the classical STDP which occurs when the post-synaptic unit fires first and then the pre-synaptic unit fires after that, e.g., like the pulses 1211, 1212 generated before the pulse 1202. This rule modifies the doublet memory based on the relative timing of the pre-synaptic and post-synaptic firing; it may depend on the time difference, i.e., on the difference between the timing of the pulses 1212, 1202.

Both, pre-post and post-pre event rules may depend on the values of variables in the post-synaptic unit memory.

In some implementations, it may be desirable to allocate memory of doublets according to their pre-synaptic units, so that doublets having a common pre-synaptic unit may be grouped together and allocated consequently in the system memory. This approach can minimize the random access to system memory.

The doublet event rule can comprise a pulse delivery rule that modifies the values of variables of the post-synaptic unit based on the values of doublet memory and the post-synaptic unit memory.

The description of doublets can be provided by the description of synaptic variables and rules in the END format.

As depicted in FIG. 10, supra, the triplet 1021 connects two units 1004 and 1005. Such a triplet represents a junction in the END format. In some implementations, the triplet 1021 may comprise a gap junction connection between two neurons. In some implementations, the triplet 1021 corresponds to a resistance connection that connect two adjacent dendritic compartments of a neuron. In some implementations, the triplet 1021 may be a combination of both junction types. The triplet may comprise its own memory and it has access to memories of both units. The triplet may comprise a triplet update rule that is executed at individual simulation time steps. The triplet update rule may update the memory of individual triplets and the memory of at least one unit. In some implementations, the triplet update rule can update memory of both units. Because it may be desirable for such an update to be order-independent, the memory update of the at least one unit may be performed via atomic addition to a unit variable that does not participate in the triplet update rule.

The description of the triplets can be provided by the description of junctions in the END format.

Some implementations may implement purely mean-firing rate models where there are no events, but where individual units transmit a signal to other units via triplet update rule.

Triplets can be allocated in the system memory according to the pre-synaptic unit so that triplets originating from a common pre-synaptic unit are grouped together. Triplets can be allocated according to the post-synaptic unit. In some implementations, triplets can be allocated in the system memory according to the structure of the neural network. For example, if the neural network has multi-compartmental dendrites, then triplets responsible for connecting the dendritic compartments can be allocated optimally as to immunize memory access when the dynamical on the dendritic tree is evaluated during the system clock cycle.

Some implementations may implement purely event-driven architectures where units trigger events that deliver pulses to post-synaptic units via doublets. Those units that received at least a single pulse during the clock cycle may be tested for an event condition, and if it is satisfied, the after-event rule is executed and corresponding doublet event rules may be executed, so that pulses may be delivered to other units.

An Event Driven Architecture (EDA) may be defined as a generalization of the END format that acts as an abstraction layer configured to isolate computational description from the neuroscience description of the model. The EDA defines memory management, parallelism, and rules triggered by events and enables compilation of the END-code directly into EDA code.

The events in END format and EDA architecture correspond to pulses, whether physical or virtual, software representation of pulses, stereotypical bursts of pulses, or other discrete temporal events.

EDA memory management differs (from the point of view of ownership of variables) from the END framework in the following:

Units own their own variables. When an update rule for a unit A is executed, it may not require access to variables of any other units of the network. Conversely, no rules being executed by other units may require access to the variables of the unit A.

Synapses own their own "synaptic" variables, such as weights, variables such as last_active and/or other variables, and they may refer to (read from and write to) certain variables in the post-synaptic unit. When either presynaptic_rule or post-synaptic_rule is executed, two or more synapses may try to access and modify the same variable of the post-synaptic unit. However, the synapses do not compete for their own synaptic variables.

Junctions own their "junction" variables, but they access and modify variables in the unit_1 and unit_2. When junctions are executed, there may be no competition for parallel access to their junction variables, but there may be competition for the access to unit_1 and unit_2 variables.

Thus, units, synapses, and junctions may be treated as units, doublets, and triplets in terms of ownership of variables. Units own a set of variables, synapses own one set of variables and refer to another set owned by units. Junctions own one set of variables and refer to two other sets of variables owned by two units. This nomenclature can be applied to describe the END 1.0, 2.0 and 3.0 formats, as well as exemplary implementations below.

The class member Event_condition triggers execution of the following rules:
    After_event_rule that acts on the unit that has triggered the event (the trigger unit);
    presynaptic_event_rule that acts on synapses (doublets) that point from the trigger unit to other units;
    post-synaptic_event_rule that acts on synapses (doublets) that point to the unit from other units The class member Update_rule may be executed at individual time steps of the network simulation and it updates variables in units, synapses (possibly via a background process), and junctions, i.e., in units, doublets, and triplets.

Units, doublets, and triplets as elements may be referred to as the network elements. The END format, therefore, defines (i) elements, (ii) rules that act on elements, and (iii) events that are triggered by elements and cause execution of other rules that act on other (target) elements.

The objectives behind the development of the EDA framework according to certain aspects of the present technology include:
    elements (e.g., units, doublets, triplets, and/or other elements) that have their own variables and in addition may refer to variables in other elements;
    clock-driven rules (rules) that act on variables in elements; and
    event-driven rules (events) that are triggered by some elements and act on variables in other (target) elements.

The EDA instruction set starts with defining rules that act on abstract (symbolic) variables. Rules may include other rules defined earlier, so as to form a directed graph of rules with no cycles. Elements may be defined by the clock-driven rules that act on the same or other elements. Events may be defined by trigger condition and target rule that are applied to other elements.

One example of an EDA instruction set is shown below in Listing 5. Bold keywords in Listing 5 denote components of the END instruction set, whereas non-bold words denote user-defined names and values.

Listing 5

```
rule_name = rule
   code = '....'
   code = another_rule_name
   init = '....'
```

In Listing 5, the identifier "code" can refer to any string of code, or the name of another rule defined previously. While C-code syntax is used in the Listing 5, it will be appreciated by those skilled in the arts that any other language description (e.g., C#, Python, Perl, and/or other languages) is equally applicable to the technology. There may be multiple codes and rules included within a rule that can be executed in the order of inclusion. In some implementations, rules that are used in multiple element types can be defined separately, so that the engine can use its acceleration tricks to execute such rules in parallel. The statement "init" defines static (global within the rule) variables needed to execute the rule, e.g., it defines lookup tables. The "code" may refer to the static variables defined in "init", to instance variables defined in the element (see below) or to other instance variables defined in other element types, e.g., "I+=A·w+B·w" refers to an instance variable I, and to variables w defined in an elements A and B.

```
element_name = element
   rule = rule_name
   rank = a number or range of numbers
   init = '....'
```

The latter is a definition of an element type. Here, "rule" refers to a rule defined earlier or to a string of code. The parameter "rank" specifies the rank order of execution of the rule within a clock cycle. It takes fixed-point value from the interval [0 1]. E.g., rank=0.45 means that this rule may be executed after individual rules with lower rank and before individual rules with higher rank, but in parallel with the rules that have the rank 0.45. If rank is given as an interval, e.g., rank=min:max, then the engine has the freedom of executing this rule any time after individual rules with rank<min and before individual rules with rank>max. If "rank" is missing, it is equivalent to the default value rank=0:1, i.e., the engine has complete freedom of selecting when to execute this rule. If the rank is greater than 1, then the engine skips cycles to execute the rule. For example, rank=2.45 may cause the engine to skip 2 cycles until next execution of the rule. The string "init" defines the names of instance (local) variables of the element and sets their default initial values.

```
id = element_name
A = other_element_name.id
B = other_element_name.id
variable_name = value
```

The latter is a definition of an instance of the element type. Here, "element name" is the name of an element type defined earlier. The lines "variable_name=value" may set values of instance variables that are different from the default values defined in the "init" statement in the element definition. If the rule_name in the element definition refers to other elements (which is the case for doublets and triplets), then the ids of these elements may be specified here. Notice that one can use any variable name, not necessarily A and B (or Unit_1 and Unit_2 in END), to refer to other elements.

```
event_name = event
   trigger_condition = rule_name
   trigger_rank = number or number range
   target_code = rule_name
   target_rank = number or number range
```

The latter is a definition of an event type. Here, "trigger_condition" is a name of a rule or a string code that returns true/false value. This condition (applied to elements; see below) may be evaluated at the rank given by "trigger_rank" When the condition is true, it triggers execution of the "target_code" in the target element (defined below) at the rank "target_rank".

```
event_name
   trigger = element_name.id
   target = element_name.id
```

The latter is a definition of an instance of the event type. It specifies which element is the "trigger" and which element is the "target" of the event.

Example 3

SPNET without Delays

A network of randomly connected 800 excitatory and 200 inhibitory neurons (100 of exc→all and inh→exc connections) can be defined with excitatory synapses subject to STDP and no conduction delays (for conduction delays, see next example).

Listing 6

```
QIF = rule
   code = 'v+=0.5f*((0.04f*v+5.0f)*v+140.0f-u+I);
v+=0.5f*((0.04f*v+5.0f)*v+140.0f-u+I); I=0.0f;'
exc = element
   code = 'u+=0.02f*(0.2f*v-u);'
   code = QIF
   rank = 0
   init = 'float v=-65.0f; float u=-13.0f; float I=0.0f; int last_spike=-1000'
   1:800 = exc
inh = element
   code = 'u+=0.01f*(0.2f*v-u);'
   code = QIF
   rank = 0
   init = 'float v =-65.0f; float u=-13.0f; float I=0.0f; int last_spike=-1000;'
   1:200 = inh
spike = rule
   code = 'v>30'
after_spike_reset_exc = event
   trigger_condition = spike
   trigger_rank = 0.1
   target_rule = 'u+=8; last_spike=now'
   target_rank = 0.2
after_spike_reset_exc
   trigger = exc.1:800
   target = exc.1:800
after_spike_reset_inh = event
   trigger_condition = spike
   trigger_rank = 0.1
   target_rule = 'u+=2; last_spike=now'
   target_rank = 0.2
```

-continued

Listing 6

```
        after_spike_reset_inh
            trigger = inh.1:200
            target = inh.1:200
        inh_syn_event = event
            trigger_condition = spike
            trigger_rank = 0.1
            target_rule = 'I-=5.0f'
            target_rank = 0.3
        // make 200*100 such entries
        inh_syn_event
            trigger = inh.<random number between 1 and 200>
            target = exc.<random number between 1 and 800>
            weight_update = rule
            code = 'w += 0.01f + sd; if (w<0.0f) w=0.0f; if (w>10.0f)
    w=10.0f; sd *= 0.9f'
        exc_synapse = element
            code = weight_update
            rank = 999:1000// any time within that cycle
            init = 'float w=6.0f; float sd = 0.0f; int last_active = -1000'
            id = exc_synapse
            post = <either exc.id or inh.id with id = random>
        PSP_LTD_rule = rule
            code = 'post.I += w; sd -= LTD(now - post.last_spike);
    last_active = now'
            init = 'float LTD = {...}'
        PSP_LTD_event = event
            trigger_condition = spike
            trigger_rank = 0.1
            target_rule = PSP_LTD_rule
            target_rank = 0.3
        PSP_LTD_event
            trigger = exc.<each id>
            target = exc_synapse.<each corresponding id>
        LTP_rule = rule
            code = 'sd += LTP(now-last_active)'
            init = 'float LTP = {...}'
        LTP_event = event
            trigger_condition = spike
            trigger_rank = 0.1
            target_rule = LTP_rule
            target_rank = 0.4
        LTP_event
            trigger = {for each exc.id and inh.id}
            target = exc_synapse.<each corresponding id>
```

The linker may be configured to group events triggered by 'spike' rule (that are within with the same rank) into a single event, so that the computational engine executes the 'spike' condition once per model simulation step for individual units.

In some implementations, the rank information in provided in the definition of the rule; this way, there may be no need to repeat ranks in the definition of events.

In one or more implementations of spiking neuron networks (e.g., reinforcement learning) it may be beneficial to decouple plasticity adaptation from post-synaptic response generation by the neuron.

Figure 14:
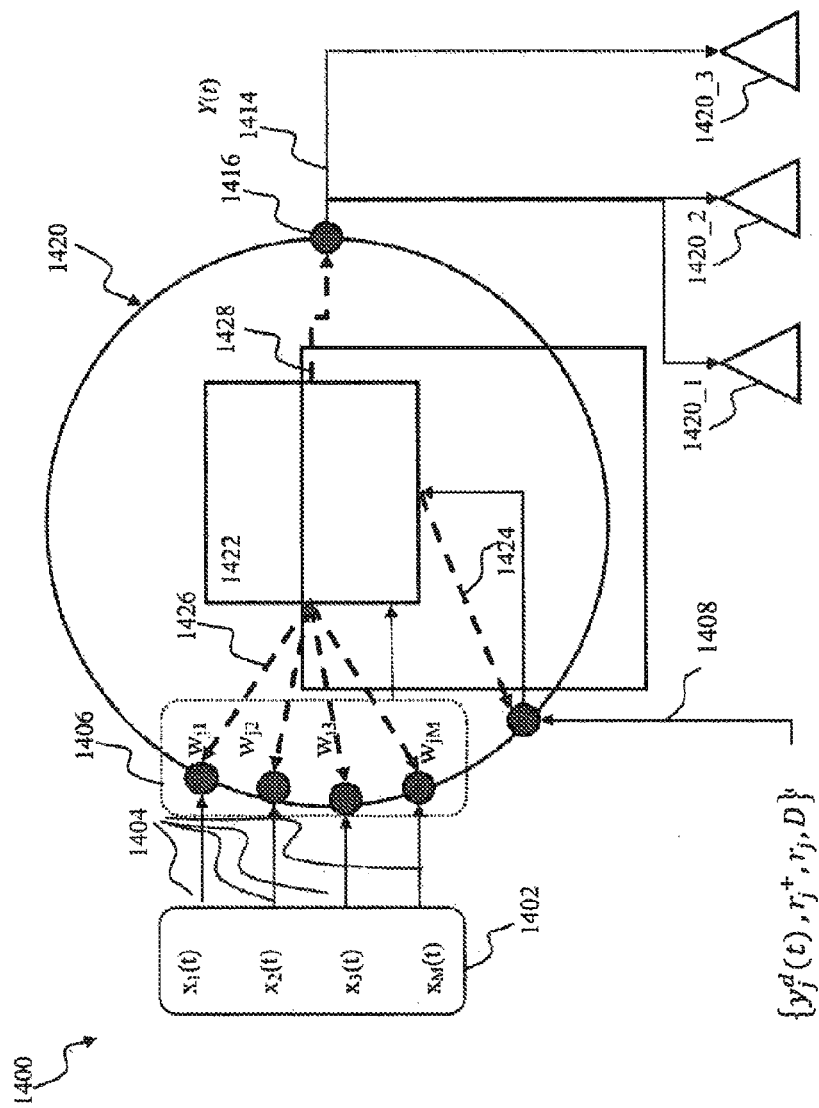
FIG. 14 is a block diagram illustrating spiking neural network for use with event driven updates, in accordance with one or more implementations.

FIG. 14 illustrates event-driven network update mechanisms in accordance with one or more implementations. The network 1400 may comprise at least one spiking neuron 1420, operable according to, for example, a Spike Response Process (SRP) 1422. The neuron 1420 may receive M-dimensional input spiking stream X(t) 1402 via M-input connections 1404. In some implementations, the M-dimensional spike stream may correspond to M-input synaptic connections into the neuron 1420. As shown in FIG. 14, individual input connections may be characterized by a connection parameter 1406 $w_{ij}$ that may be configured to be adjusted during learning. In one or more implementation, the connection parameter may comprise connection efficacy (e.g., weight). In some implementations, the parameter 1406 may comprise synaptic delay. In some implementations, the parameter 1406 may comprise probabilities of synaptic transmission.

In some implementations, the neuron 1420 may be configured to receive external input via the connection 1408. In one or more implementations, the input 1408 may comprise training input, e.g., positive and/or negative reinforcement signal, denoted as r⁺, r⁻ in of FIG. 14. denotes the reinforcement signal spike stream, that may be expressed as:

$$r^+(t)=\Sigma_i \delta(t-t_i^+),\ r^-(t)=\Sigma_i \delta(t-t_i^-),$$

where $t_i^+, t_i^-$ denote the spike times associated, for example, with positive and negative reinforcement, respectively.

In some implementations of supervised learning, a supervisory spike may be used to trigger neuron post-synaptic response.

In some implementations of reinforcement learning, an external signal (e.g., reinforcement spike) may cause to neuron to enter exploratory regime (e.g., by increasing synaptic weights for a short period of time, in one implementation).

The neuron 1420 may be configured to generate output Y(t) (e.g., a post-synaptic spike) that may be delivered to the desired targets (e.g., other neurons 1420_1, 1420_2, 1420_3) via output connections 1414. As shown in FIG. 14, individual the output connections 1414 may be characterized by a connection parameter 1416 that may be adjusted during learning. In one or more implementation, the connection parameter 1416 may comprise connection efficacy (e.g., weight). In some implementations, the parameter 1416 may comprise synaptic delay. In some implementations, the parameter 1416 may comprise synaptic transmission probability.

The neuron 1420 may be configured to implement controller functionality, such as described for example in U.S. patent application Ser. No. 13/487,533, entitled "STOCHASTIC SPIKING NETWORK LEARNING APPARATUS AND METHODS", incorporated supra, in order to control, for example, a robotic arm. The output signal y may include motor control commands configured to move a robotic arm along a desired trajectory. The process 1422 may be characterized by a process internal state q. The internal state q may, for example, comprise a membrane voltage of the neuron, conductance of the membrane, and/or other parameters. The process 1422 may be characterized by one or more learning parameter which may comprise synaptic weights 1406, 1416, response generating (firing) threshold, resting potential of the neuron, and/or other parameters. In one or more implementations, the parameters w may comprise probabilities of signal transmission between the units (e.g., neurons) of the network.

The input signal x(t) may comprise data used for solving a particular control task. In one or more implementations, such as those involving a robotic arm or autonomous robot, the signal x(t) may comprise a stream of raw sensor data (e.g., proximity, inertial, and/or terrain imaging) and/or preprocessed data (e.g., velocity, extracted from accelerometers, distance to obstacle, and/or positions). In some implementations, such as those involving object recognition, the signal x(t) may comprise an array of pixel values (e.g., RGB, CMYK, HSV, HSL, and/or grayscale) in the input image, or preprocessed data (e.g., levels of activations of Gabor filters for face recognition, contours, and/or other preprocessed data). In one or more implementations, the input signal x(t) may comprise desired motion trajectory, for example, in order to predict future state of the robot on the basis of current state and desired motion.

In one or more implementations, then network 1400 may be implemented using High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, incorporated herein by reference in its entirety. In one or more implementations, the HLND framework may be augmented to handle event based update methodology described herein.

The neuron process 1422 may be configured to effectuate event-based updates. In one or more implementations, the event-based updates may comprise multiple event types (e.g., dendritic, axonic, custom, and/or other event types) configured to effectuate various aspects of event-based functionality as described in detail below.

In some implementations, in order to facilitate event-based update functionality, END 2.0 implementation may be extended as described below with respect to FIG. 19. In some implementations, the END 2.0 format 1900 may comprise a POST-SYNAPTIC_EVENT (PE). In one or more implementations of extended END framework (e.g., the END 2.1 implementation 1902 in FIG. 19) an additional single DENRITIC_EVENT may be implemented while leaving the POST-SYNAPTIC_EVENT so as to allow for backward compatibility with the current END 2.0 format, as illustrated by the examples of FIG. 15A-15B, described in detail below.

In some implementations, (e.g., the END 2.1 implementation 1904 in FIG. 19) a CUSTOM_EVENT API may be provided in order to, for example, handle pre-synaptic and/or event-triggered updates without generating post-synaptic responses, as described in detail above. The END 2.1 implementation 1904 is illustrated in the listing of FIG. 15C, described in detail below. The END 2.1 implementation 1904 is backward compatible with the END 2.0 format.

In some implementations, (e.g., the END 2.1 implementation 1906 in FIG. 19) the POST-SYNAPTIC_EVENT may be removed and CUSTOM_EVENT API may be provided in order to, for example, handle pre and/or post updates described above. The END 2.1 implementation 1906 is illustrated in the listing of FIG. 15D-15F, described in detail below. While the END 2.1 implementation 1906 is not backward compatible with the current END 2.0 format, it provides a unified and flexible approach to event handling and may, advantageously, result in a faster code execution, due to, for example, handling of fewer logical conditions. However, a special care needs to be taken by developers, particularly when implementing variable number of events per unit.

Unit type definition may comprise dendritic and/or axonic event conditions:

```
<unit_type>
    ... members of END 2.0 unit type definition (e.g. name,
update_rule)
    dendritic_event_condition
    after_dendritic_event_rule
``` where
  dendritic_event_condition
defines a logical statement configured to detect dendritic events, for example, 'denritic_event_flag==true'. In some implementations, the event rule may be executed at individual clock cycles (model time step). When the class is derived from a base class, then the dendritic_event_condition of the subclass replaces the dendritic_event_condition of the base class.

The Unit Definition Member
  after_dendritic_event_rule
may comprise the code that may be executed when a dendritic event is detected. For a derived subclass, the subclass after_dendritic_event_rule may be executed before the after_dendritic_event_rule of the base class.

Synaptic classes may be augmented by dendritic event:

```
<synaptic_type>
    ... members of END 2.0 synapse type (e.g. presynaptic_event_rule)
    dendritic_event_rule
``` where the code of dendritic_event_rule triggered by generating dendritic_event of the post-synaptic unit. In some implementations, it can execute modulated STDP.

In some implementations, an internal (also referred to as the dendritic) event may be defined in order, for example, to modify input connection (e.g., adjust synaptic weights 1406) of the neuron 1420, as illustrated by the broken arrows 1426 in FIG. 14.

In one or more implementations, the dendritic event may be triggered by an external trigger. In one such implementation, the external trigger may comprise reinforcement signal 1408, shown in FIG. 14. In some implementations, the external signal 1408 may comprise a signal generated by another network entity, such as for example, a timer. In one or more implementations, the signal 1408 may comprise an overflow alarm associated with a buffer, configured to store input and/or output spiking activity (e.g., spike timing) of the network. One implementation of the buffer overflow event generation is described in co-owned U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.

In some implementations, the dendritic event may be triggered internally by the process 1422 of the neuron 1420 of FIG. 14. In one or more implementations, the internal event may comprise internal time expiration, an overflow indicator associated with an internal buffer that may store neuron spiking history (pre-synaptic and/or post-synaptic). It will be appreciated by those skilled in the arts that many other sources of internal and/or external event triggers may exist, such as for example, related to the state of the process 1422.

In accordance with the principles of the disclosure, the internal event may be used to implement synaptic updates without causing the post-synaptic response propagation to the targets (e.g., the neurons 1420_1, 1420_2, 1420_3 in FIG. 14). By way of illustration, the external reinforcement signal 1408 may be used to trigger plasticity updates of one or more input connections 1404 (e.g., modify weights 1406) based on the neuron prior performance, in one or more implementations.

In one or more implementations, synaptic update without post-synaptic response may reduce undesired network spiking activity (e.g., noise). Such undesired spiking may often cause malfunction of a plant (e.g., motor). A more rapid reward signal (e.g., 1 Hz-100 Hz) may be used in conjunction with dendritic events in order to, for example, improve learning convergence of a motor controller without causing unnecessary (e.g., repetitive) motor control commands.

When learning error is sufficiently small, an axonic event may be used in order to cause motor control output, thereby increasing plant longevity.

In some implementations, an internally triggered dendritic event (e.g., pre-synaptic buffer overflow) may cause synaptic updates so that the buffer content may be cleared and integrity of the neuron process 1422 preserved.

In some implementations, the dendritic event may cause plasticity update of the external signal connection 1408, as shown by the broken arrow 1424 in FIG. 14.

FIG. 15A presents one exemplary implementation of plasticity update using externally triggered internal (i.e., dendritic) event. The dendritic update implementation of FIG. 15A illustrates the use of the END and/or HLND extension comprising DENDRITIC_EVENT_RULE.

FIG. 15B illustrates one exemplary implementation of plasticity update using internally triggered internal (i.e., dendritic) event. The dendritic update implementation of FIG. 15B illustrates the use of the END extension comprising DENDRITIC_EVENT_RULE. The update rule of FIG. 15B utilizes internal condition in order to evoke the rule.

The implementation of FIG. 15B illustrates homeostatic mechanism may be configured to decrease excitability (decrease individual weights) when neuron activity exceeds a threshold (e.g., the neuron generates too many spikes)

In some implementations, plasticity update of the input connections may be effectuated using STDP rules such as those described in co-owned and co-pending U.S. patent application Ser. No. 13/152,119, entitled "SENSORY INPUT PROCESSING APPARATUS AND METHODS", filed on Jun. 2, 2011, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, a co-owned U.S. patent application Ser. No. 13/465,918, entitled "SPIKING NEURAL NETWORK OBJECT RECOGNITION APPARATUS AND METHODS", filed May 7, 2012, and a co-owned U.S. patent application Ser. No. 13/488,106, entitled "SPIKING NEURON NETWORK APPARATUS AND METHODS", filed Jun. 4, 2012, each of the foregoing incorporated herein by reference in its entirety.

In some implementations, the plasticity rule used for connection update may be modulated by the timing of the external signal 1408, as described for example, in U.S. Pat. No. 8,103,602, issued Jan. 24, 2012. In one such implementation, weight 1406 of the j-th connection 1404 may be adjusted as follows:

$$w_j \propto \exp[-(t_{out}-t_{in}^j)]\exp[-(t_{out}-t_{ext})] \quad \text{(Eqn. 1)}$$

where:
- $t_{out}$—denotes time of the most recent output (post-synaptic spike) generated by the neuron;
- $t_{in}^j$—denotes time of one or more inputs the most recent inputs (pre-synaptic spike(s)) received by the neuron via the connection j;
- $t_{ext}$—denotes time of the external (trigger) signal.

In one or more implementations, the dendritic events may be utilized in order to facilitate reinforcement learning by the network. By way of illustration, upon receipt of reinforcement input (a 'dendritic spike'), plasticity of incoming synapses of the neuron may be adjusted without delivering the post-synaptic response to post-synaptic targets. Subsequently, then the neuron state reaches super-threshold condition, the axonal event may be used to deliver neuron post-synaptic response to the desired destinations.

In some implementations, the internal event may provide read-access for the input connections (e.g., the connections 1404) to the state of the process (e.g., voltage of the process 1422 in FIG. 14).

In some implementations, during the execution of the internal event, the input connections may be provided with read-access to the contents of the buffer storing pre-synaptic and/or post-synaptic activity history of the neuron.

The implementation of FIG. 15A illustrates modulated STDP for use, for example, with reinforcement learning in robot control applications.

In some implementations, an external (also referred to as the axonic) event may be defined in order, for example, to deliver output (post-synaptic spike) of the neuron (e.g., the neuron 1420 of FIG. 14) to the desired targets (the neuron 1420_1) without necessitating update of the input connections 1404. In one or more implementations, the axonic event may be triggered by the neuron spike response process (e.g., the super-threshold condition).

In some implementations of stochastic neurons, axonic events may be triggered when: (i) the output of a random number generator is greater than a threshold; and/or (ii) when a time counter exceeded a certain value, that may be associated, for example, with the maximum inactivity interval (e.g., when the neuron is silent for more than 100 ms.)

In some implementations, the axonic event may cause plasticity update of the output 1416, as shown by the broken arrow 1426 in FIG. 14.

In some implementations, the internal and the external events may be combined into a single composite event in order to effectuate plasticity update and post-synaptic output delivery thereby providing compatibility for a regular update event, described by the END v1, END 2, supra.

In some implementations, during the execution of the dendritic event execution of axonic events may be temporarily suspended.

In some implementations, the dendritic event may set up a counter, and the axonic may check the counter in order to trigger spike delivery event.

In some implementations, the neuron process (e.g. the process 1422) may comprise two event types: the dendritic event (the triggers the plasticity update) and the common END spike event that evokes synaptic updates and spike delivery.

In some implementations, unit description may comprise two types of events: (i) a "dendritic" spike that may affect plasticity of incoming synapses but does not result in any signaling propagated along the axon to the post-synaptic targets; and (ii) an "axonal" spike that propagates to the post-synaptic targets, but does not do anything to the incoming synapses onto the neuron. The standard "spike" that is used in END 1, 2, 3, in just the combination of the dendritic and axonal spike.

FIG. 15C presents one exemplary implementation of plasticity update using externally triggered external (i.e., dendritic) event. The implementation of FIG. 15C may comprise neuron response condition (e.g., the method spike( ). The explicitly defined AxonicEvent (FIG. 15C lines 28-40) may be used to cause spike propagation to the desired target (OutputNeuron).

In some implementations, the END format may be extended as follows. Unit type definition may comprise dendritic and/or axonic event conditions:

```
<unit_class>
    unit_class_id
    initialization
    execution_condition
    update_rule
    list of
        custom_event_type_id
        custom_event_condition
        after_custom_event_rule
``` where
  Synaptic classes may be augmented by dendritic event:

```
<synaptic_class>
    synapse_class_id
    initialization
    presynaptic_event_rule
    update_rule
    list of
        custom_event_type_id
        custom_event_rule
``` where the code of custom event rule with some id is triggered by generating a custom event of the post-synaptic unit with the same id. Synapse can define several event rules with different id. In some implementations, it can execute modulated STDP.

In one or more implementations, users may define custom events when defining spiking networks using event HLND extension and END framework. In some implementations, the custom event may be used in order to trigger update of a portion of the input connections 1404. By way of illustration, connection providing one type of input (e.g., arm position) to the neuron may be updated using such custom event. The remaining connections (e.g., the connections providing visual input) may be operable in accordance with different plasticity mechanism and not be updated by the same custom event, in one or more implementations.

In some implementations, users may define multiple events and rules that may be evoked by the events. This way, the user can define multiple types of events some of which can serve as 'dendritic' events, others can serve as "axonal" events, others can serve as "green", "blue", and/or other events.

FIGS. 15D-E present exemplary implementations of plasticity update using custom events. The implementation of FIG. 15D illustrates rule trigger condition (e.g., the state parameter v>1). The implementation of FIG. 15D may comprise multiple rule trigger conditions based on state variable and response activity.

FIG. 15F present exemplary implementations of plasticity update comprising multiple custom events. The implementation of FIG. 15F, the synapses of the neuron may be configured to generate TeacherEvent of post-synaptic neuron without defining a conditional flag (as in FIG. 15A) with special function Unit.event (event id). In some implementations, the listing (e.g., the listing of FIG. 15F) may comprise one or more user defined tags.

In some implementations, the END format may be extended as follows. Unit type definition may comprise dendritic and/or axonic event conditions:

```
<unit_class>
    unit_class_id
    initialization
    execution_condition
```

```
    update_rule
    event_condition
    after_event_rule
    list of
        custom_event_type_id
        custom_event_condition
        after_custom_event_rule
``` where
  Synaptic classes may be augmented by dendritic event:

```
<synaptic_class>
    synapse_class_id
    initialization
    presynaptic_event_rule
    post-synaptic_event_rule
    update_rule
    list of
        custom_event_type_id
        custom_event_rule
``` where the code of custom event rule with some id is triggered by generating an custom event of the post-synaptic unit with the same ID. Synapse can define several event rules with different id. Notice that synaptic class still has post-synaptic_event_rule that is triggered by ordinary (not custom event rule in a post-synaptic unit) for backward compatibility with END 2.0. In some implementations, it can execute modulated STDP.

Listing in FIG. 15G illustrates network update comprising dendritic event configured not to perform synaptic update without causing neuron output.

Listing in FIG. 15H illustrates use of a custom event, comprising CUSTOM_EVENT_RULE method, configured to execute synaptic updates.

Figure 16A:
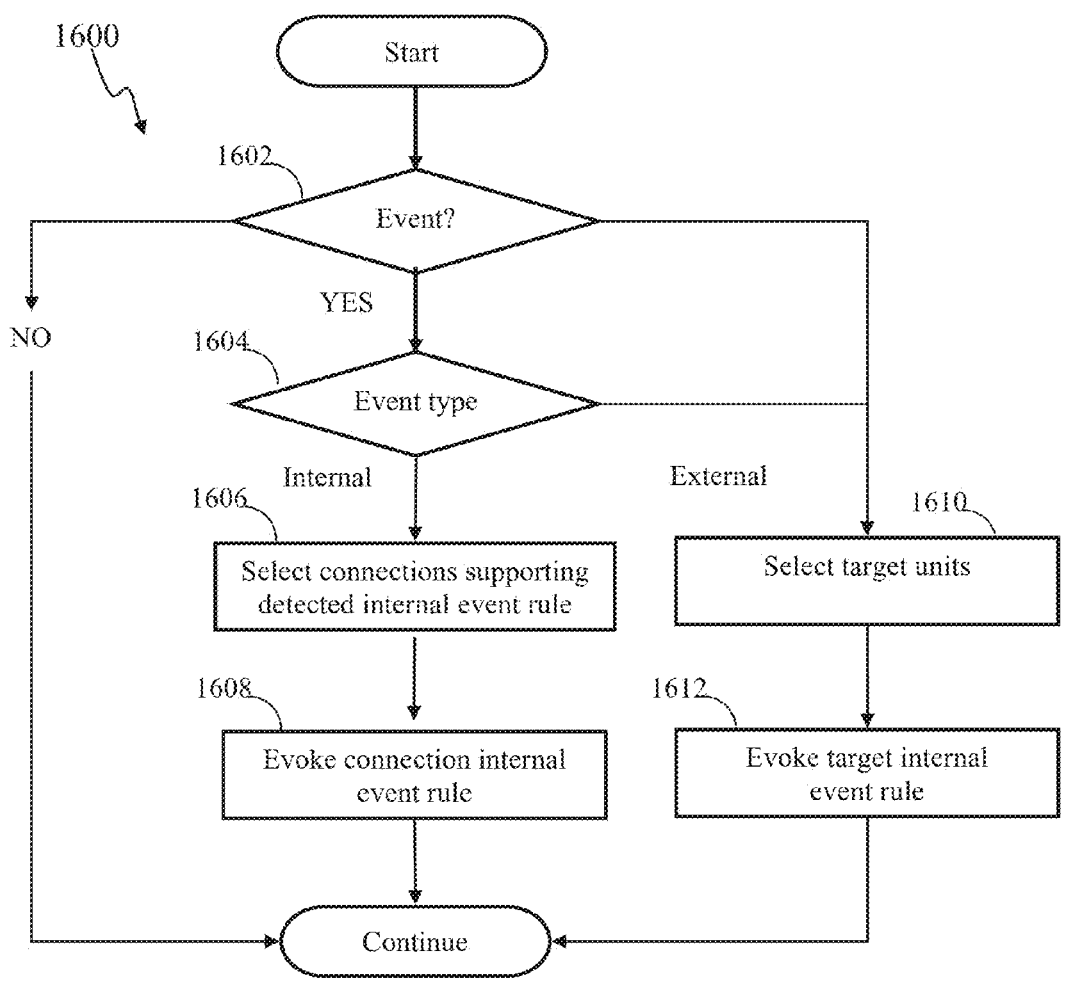
FIG. 16A is a logical flow diagram illustrating efficient update method, for use with network connections of FIG. 14, in accordance with one or more implementations.
Figure 16B:
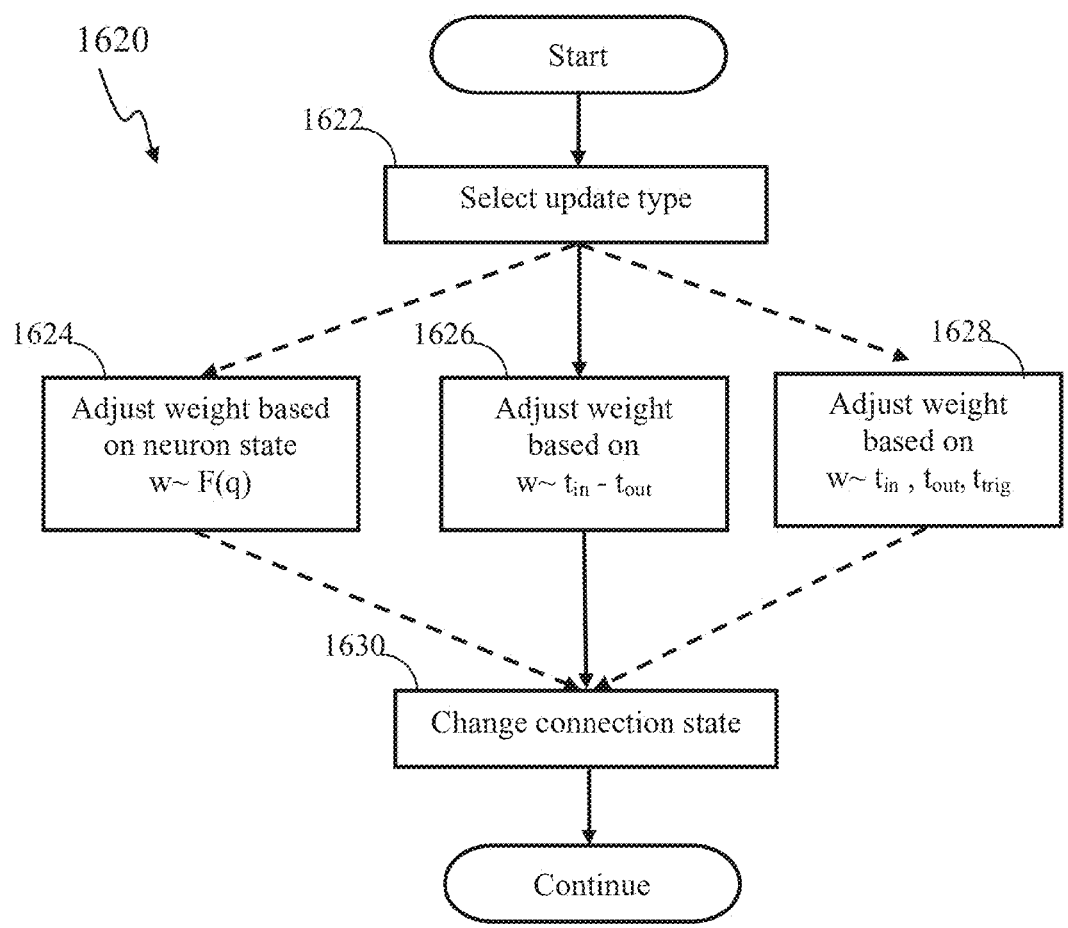
FIG. 16B is a logical flow diagram illustrating efficient update method, comprising time invariant connection dynamics, for use with neural network of FIG. 14, in accordance with one or more implementations.
Figure 16C:
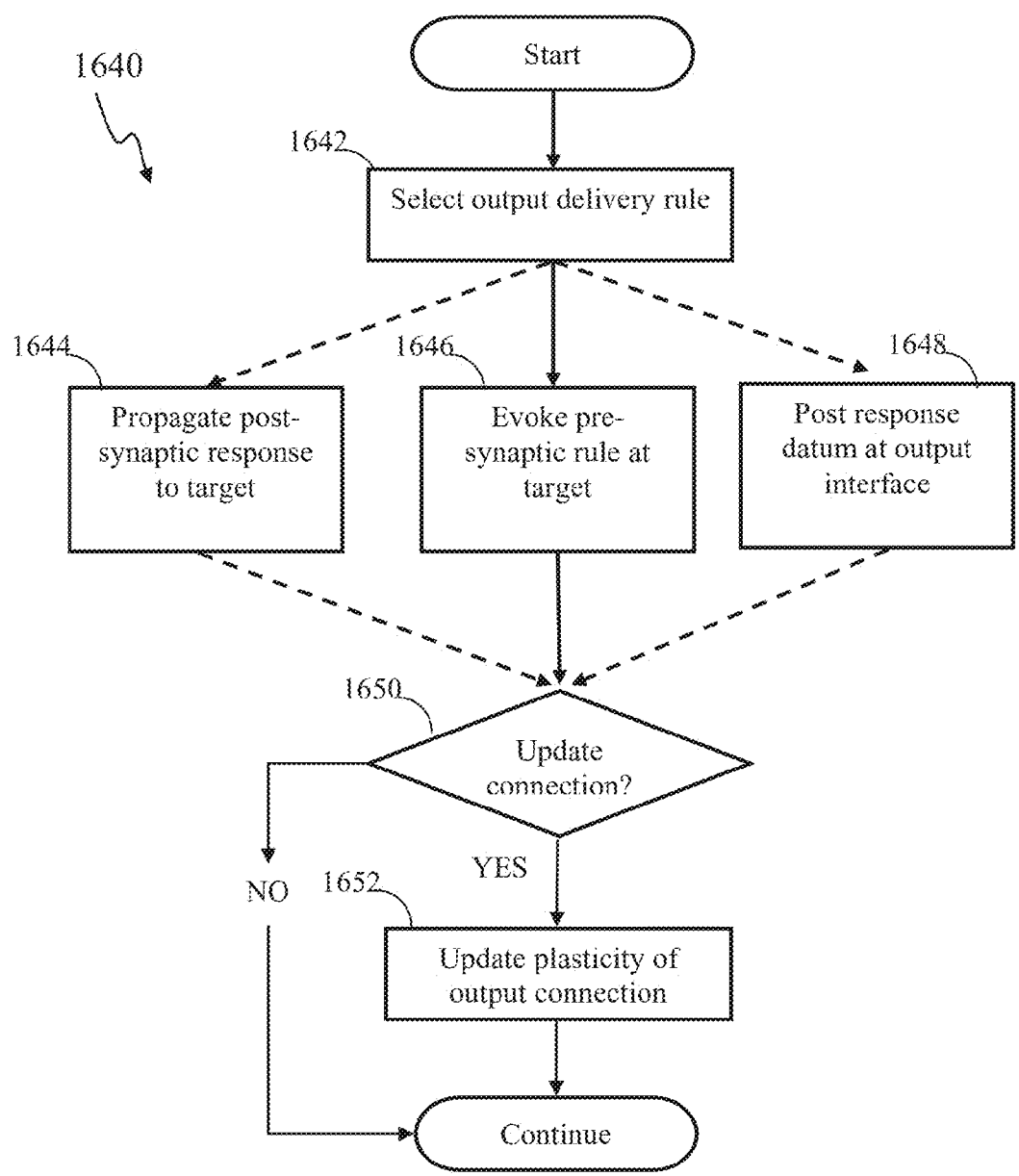
FIG. 16C is a logical flow diagram illustrating efficient update of synaptic weights, for use with neural network of FIG. 14, in accordance with one or more implementations.

FIGS. 16A-16C illustrate exemplary methods of implementing event-driven updates of the disclosure. In some implementations, methods of FIG. 16A-16C may be used, for example, for operating the neurons 1420 of FIG. 14. Moreover, methods of FIGS. 16A-16C may be implemented in a network apparatus (e.g., the apparatus 1130 of FIG. 11C). Methods of FIGS. 16A-16C may be implemented in sensory processing in a spiking neuronal network, such as for example network of the sensory processing apparatus described with respect to FIG. 17, infra, thereby advantageously aiding, inter alia, reinforcement learning when processing sensory input.

Returning now to FIG. 16A, at step 1602 of method 1600, a check may be performed whether an event has been triggered. When detected, at step 1604 event type may be step determined When internal (i.e., dendritic) event is detected, the method may proceed to step 1606 where one or more input connections that support the detected event type may be selected. In one or more implementations, one or more different dendritic event types may be supported by the one or more input connections.

At step 1608, the appropriate internal event rule may be evoked for the one or more input connections selected at step 1606.

When external (i.e., axonic) event is detected, the method may proceed to step 1610 where one or more output targets may that support the detected output event type may be selected.

At step 1612, the appropriate external event rule (e.g., the PRESYNAPTIC rule of FIG. 15A) may be evoked for the one or more targets selected at step 1610.

FIG. 16B illustrates one exemplary implementation of internal event rule for use, for example, with method 1600 of FIG. 16A described above.

At step 1622 of method 1620, type of connection update may be selected. In one or more implementations, network (e.g., the network 1400 of FIG. 14) may support one or more different plasticity rules.

In some implementations, the plasticity rule may comprise weight adjustment that is based on the state of the neuron (e.g., the membrane voltage of the neuron 1420 in FIG. 14), as illustrated by the weight adjustment at step 1624 of method 1620.

In some implementations, the plasticity rule may comprise weight adjustment that is based on the timing between input spikes delivered by the connection ($t_{in}$) and timing of output responses (output spiked) $t_{out}$ generated by the neuron (i.e., STDP rule), as illustrated by the weight adjustment at step 1626 of method 1620.

In some implementations, the plasticity rule may comprise weight adjustment that is based on the timing between input spikes delivered by the connection ($t_{in}$), timing of output responses (output spiked) $t_{out}$ generated by the neuron (i.e., STDP rule), and timing of the trigger associated with the dendritic event, as illustrated by the weight adjustment at step 1628 of method 1620. In one or more implementations, the dendritic event trigger may comprise an external signal (e.g., reinforcement spike) delivered to the neuron 1420 via the connection 1408 in FIG. 14. In some implementations, the plasticity of step 1628 may be effectuated using methodology of Eqn. 2.

At step 1630, the appropriate adjustment may be applied to the connection (such as, for example, the connections selected at step 1606 of FIG. 16A).

FIG. 16C illustrates one exemplary implementation of external event rule for use, for example, with method 1600 of FIG. 16A described above.

At step 1642 of method 1640, output delivery rule may be selected for one or more targets (e.g., the neurons 1420_1, 1420_2, 1420_3 in FIG. 14). In one or more implementations, network (e.g., the network 1400 of FIG. 14) may support one or more different output (e.g., spike delivery) rules.

In one or more implementations, the target selection may be effectuated via the HLND framework at the compile time.

In some implementations, the response delivery rule may comprise propagating neuron post-synaptic response to the appropriate target, as illustrated by the rule of step 1644 of method 1640. In one or more implementations, the post-synaptic response propagate may comprise applying an output signal to the target (e.g., a drive current to a motor, or a control signal (e.g., pulse-width modulated voltage) to a motor controller).

In some implementations, the response delivery rule may comprise posting weight adjustment that may be based on the timing between input spikes delivered by the connection ($t_{in}$) and timing of output responses (output spiked) $t_{out}$ generated by the neuron (i.e., STDP rule), as illustrated by the weight adjustment at step 1626 of method 1620.

In some implementations, the response delivery rule may comprise posting weight adjustment that may be based on the timing between input spikes delivered by the connection ($t_{in}$), timing of output responses (output spiked) $t_{out}$ generated by the neuron (i.e., STDP rule), and timing of the trigger associated with the dendritic event, as illustrated by the weight adjustment at step 1628 of method 1620. In one or more implementations, the dendritic event trigger may comprise an external signal (e.g., reinforcement spike) delivered to the neuron 1420 via the connection 1408 in FIG. 14. In some implementations, the plasticity of step 1628 may be effectuated using methodology of Eqn. 3.

At step 1630, the appropriate adjustment may be applied to the connection (such as, for example, the connections selected at step 1606 of FIG. 16A).

In some implementations (not shown), the plasticity rule may comprise connection delay, and/or transmission probability adjustment.

Various exemplary spiking network apparatus implementing one or more of the methods set forth herein (e.g., using the exemplary event-driven update mechanisms explained above) are now described with respect to FIGS. 17 and 11A-11D.

Figure 17:
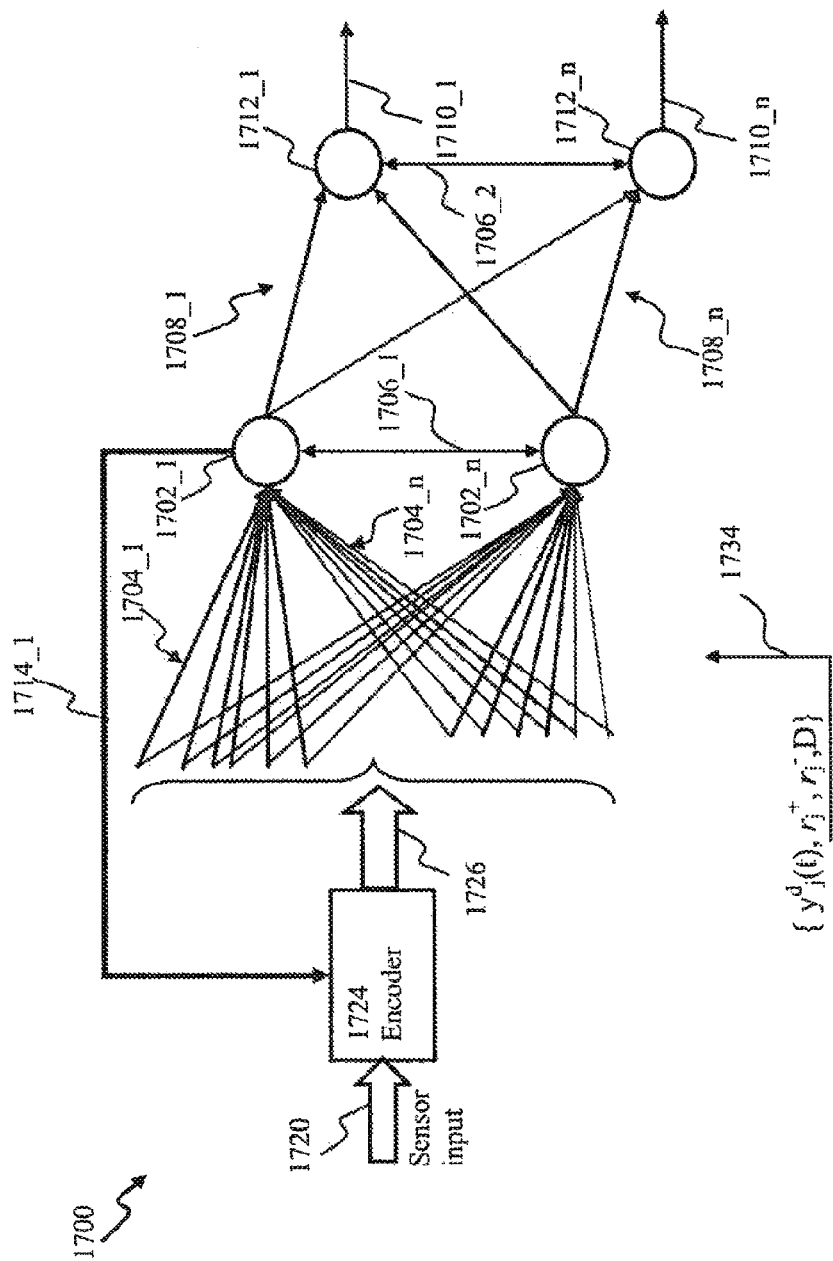
FIG. 17 is a block diagram illustrating sensory processing apparatus configured to implement event driven update mechanism in a spiking network, in accordance with one or more implementations.

One apparatus for processing of sensory signal information (e.g., visual, audio, somatosensory) using a spiking neural network (including one or more of the event-driven update mechanisms described herein) is shown in FIG. 17. The illustrated processing apparatus 1700 may include an input interface configured to receive an input sensory signal 1720. In some implementations, this sensory input may comprise electromagnetic waves (e.g., visible light, IR, UV, and/or other wavelengths) entering an imaging sensor array (comprising RGCs, a charge coupled device (CCD), CMOS device, or an active-pixel sensor (APS)). The input signal in this case is a sequence of images (image frames) received from a CCD or CMOS camera via a receiver apparatus, or downloaded from a file. The image may comprise a two-dimensional matrix of RGB values refreshed at a 24 Hz frame rate. It will be appreciated by those skilled in the art that the above image parameters and components are merely exemplary, and many other image representations (e.g., bitmap, CMYK, grayscale, and/or other image representations) and/or frame rates may be equally useful with the present technology.

The apparatus 1700 may include an encoder 1724 configured to transform (encode) the input signal so as to form an encoded signal 1726. In some implementations, the encoded signal may comprise a plurality of pulses (also referred to as a group of pulses) configured to model neuron behavior. The encoded signal 1726 may be communicated from the encoder 1724 via multiple connections (also referred to as transmission channels, communication channels, or synaptic connections) 1704 to one or more neuronal nodes (also referred to as the detectors) 1702.

In the implementation of FIG. 17, different detectors of the same hierarchical layer may be denoted by an "_n" designator, such that e.g., the designator 1702_1 denotes the first detector of the layer 1702. Although only two detectors (1702_1, 1702_n) are shown in FIG. 17 for clarity, it is appreciated that the encoder can be coupled to any number of detector nodes that may be compatible with the detection apparatus hardware and software limitations. A single detector node may be coupled to any practical number of encoders.

In one implementation, individual ones of the detectors 1702_1, 1702_n may contain logic (which may be implemented as a software code, hardware logic, or a combination of thereof) configured to recognize a predetermined pattern of pulses in the encoded signal 1704, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1708. In FIG. 17, the designators 1708_1, 1708_n denote output of the detectors 1702_1, 1702_n, respectively.

In one implementation, the detection signals may be delivered to a next layer of the detectors 1712 (comprising detectors 1712_1, 1712_m, 1712_k) for recognition of complex object features and objects, similar to the exemplary configuration described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this configuration, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

Individual ones of the detectors 1702 may output detection (post-synaptic) signals on communication channels 1708_1, 1708_n (with appropriate latency) that may propagate with different conduction delays to the detectors 1712. The detector cascade of the apparatus of FIG. 17 may contain any practical number of detector nodes and detector banks determined, inter alia, by the software/hardware resources of the detection apparatus and complexity of the objects being detected.

In some implementations, the apparatus 1700 may be configured to provide external input to one or more neurons 1702, 1712, via the connection 1734. In one or more implementations, the input 1734 may comprise training input, e.g., positive and/or negative reinforcement signal, as described with respect to FIG. 14 supra.

The signal processing apparatus implementation illustrated in FIG. 17 may comprise lateral connections 1706. In some implementations, the connections 1706 may be configured to communicate post-synaptic activity indications between neighboring neurons of the same hierarchy level, as illustrated by the connection 1706_1 in FIG. 17. In some implementations, the neighboring neuron may comprise neurons having overlapping inputs (e.g., the inputs 1704_1, 1704_n in FIG. 17), so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1700 may also comprise feedback connections 1714, configured to communicate context information from detectors within one hierarchy layer to previous layers, as illustrated by the feedback connections 1714_1 in FIG. 17. In some implementations, the feedback connection 1714_2 may be configured to provide feedback to the encoder 1724 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Computerized Neuromorphic System

Figure 11A:
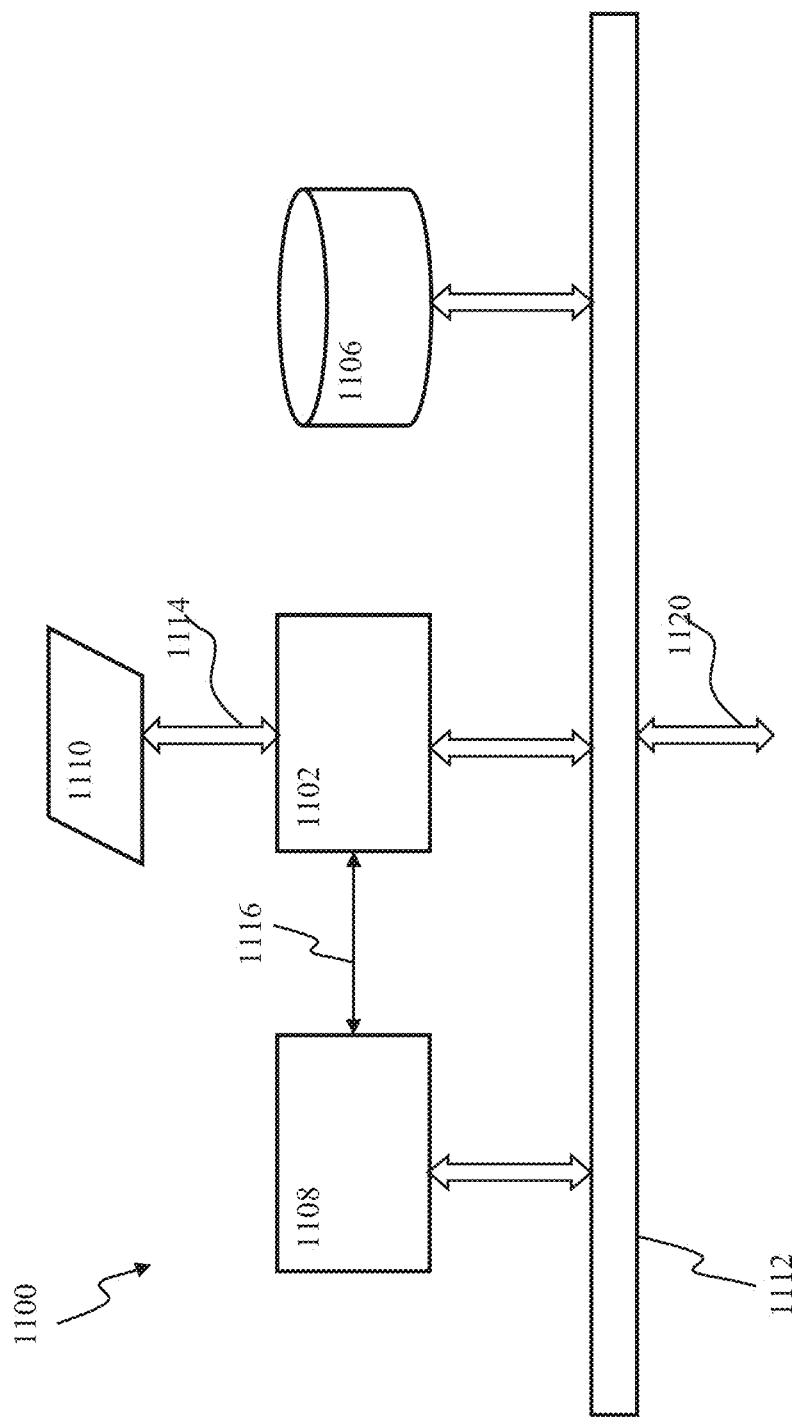
FIG. 11A is a block diagram illustrating computerized system useful with event driven update mechanism in a spiking network, in accordance with one or more implementations.

One particular implementation of the computerized neuromorphic processing system, adapted for operating a computerized spiking network (and implementing the exemplary event-driven update methodology described supra), is illustrated in FIG. 11A. The computerized system 1100 of FIG. 11A may comprise an input interface 1110, such as for example an image sensor, a computerized spiking retina, an audio array, a touch-sensitive input device, and/or other components. The input interface 1110 may be coupled to the processing block (e.g., a single or multi-processor block) via the input communication interface 1114. The system 1100 may comprise a random access memory (RAM) 1108, configured to store neuronal states and connection parameters (e.g., weights 1406 in FIG. 14), and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 may be coupled to the processor 1102 via a direct connection (memory bus) 1116. The memory 1108 may be coupled to the processor 1102 via a high-speed processor bus 1112).

The system 1100 may comprise a nonvolatile storage device 1106, comprising, inter alia, computer readable instructions configured to implement various aspects of spiking neuronal network operation (e.g., sensory input encoding, connection plasticity, operation model of neurons, and/or other aspects of spiking neuronal network operation). The nonvolatile storage 1106 may be used for instance to store state information of the neurons and connections when, for example, saving/loading network state snapshot, or implementing context switching (e.g., saving current network configuration (comprising, inter alia, connection weights and update rules, neuronal states and learning rules, and/or other information) for later use, and loading of a previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

In some implementations, the apparatus 1100 may be configured to provide external input to the processor operating the neural network. In one or more implementations, the input may comprise training input, e.g., positive and/or negative reinforcement signal provided for example via the interface 1114.

In some implementations, the input/output interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to implementations of the technology including, for example, an LCD/LED monitor, touch-screen input and display device, speech input device, stylus, light pen, trackball, end the likes.

Figure 11B:
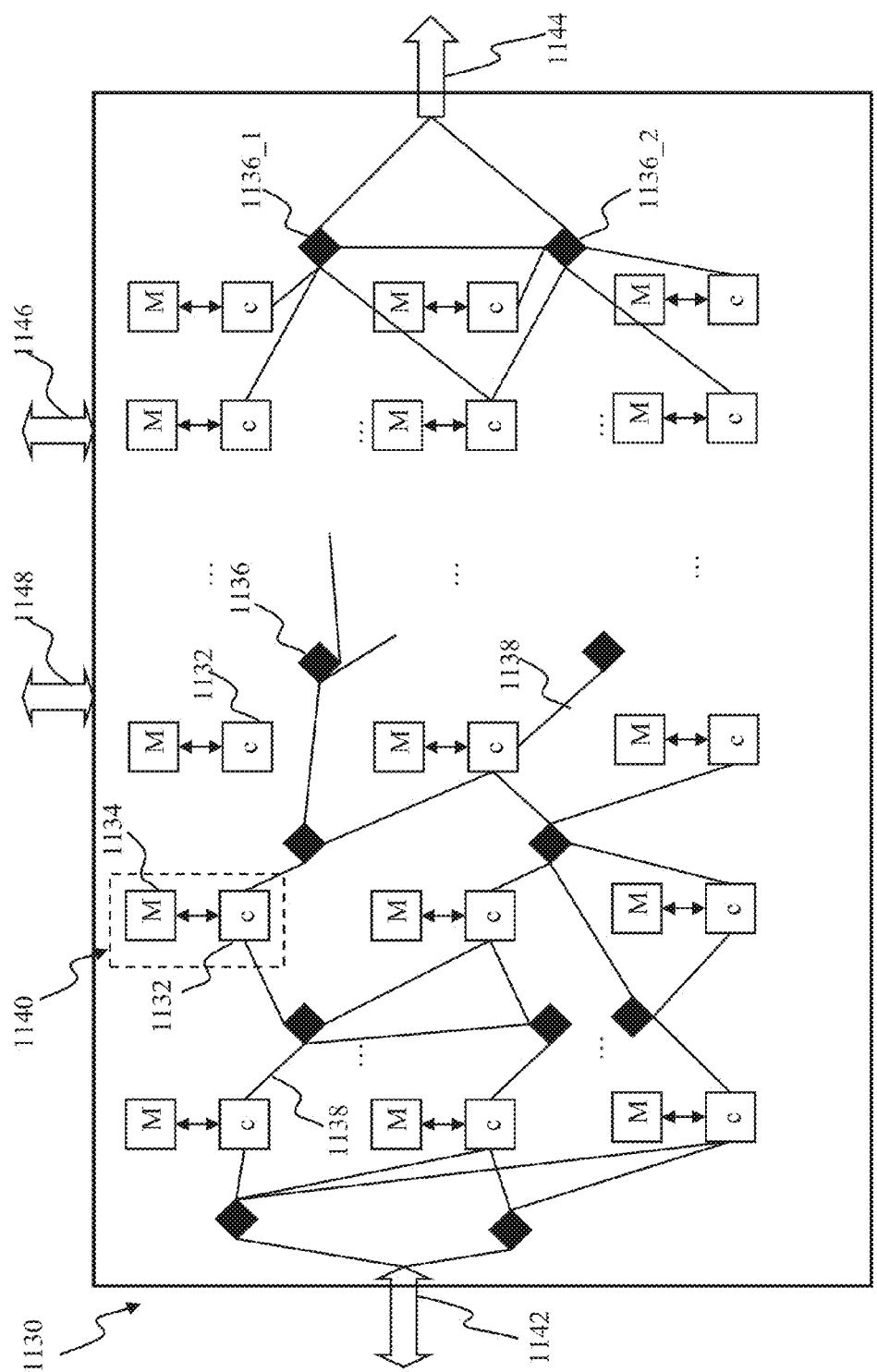
FIG. 11B is a block diagram illustrating a neuromorphic computerized system useful with event driven update mechanism in a spiking network, in accordance with one or more implementations.

Referring now to FIG. 11B, one implementation of neuromorphic computerized system configured to implement event-drive update mechanism in a spiking network is described in detail. The neuromorphic processing system 1130 of FIG. 11B may comprise a plurality of processing blocks (micro-blocks) 1140, where individual micro-blocks may comprise a computing logic core 1132 and a memory block 1134. The logic core 1132 may be configured to implement various aspects of neuronal node operation, such as the node model, and synaptic update rules (e.g., the I-STDP) and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other connection implementations) may be compatible with the disclosure.

The neuromorphic apparatus 1130 may be configured to receive input (e.g., visual input) via the interface 1142. In one or more implementations, applicable for example to interfacing with a computerized spiking retina or an image array, the apparatus 1130 may provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

In some implementations, the apparatus 1130 may be configured to provide external input to the one or more blocks 1132. In one or more implementations, the external signal may comprise training input provided to the one or more blocks via the interface 1142.

The apparatus 1130, in one or more implementations, may interface to external fast response memory (e.g., RAM) via high bandwidth memory interface 1148, thereby enabling storage of intermediate network operational parameters (e.g., spike timing). The apparatus 1130 may interface to external slower memory (e.g., Flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place.

Figure 11C:
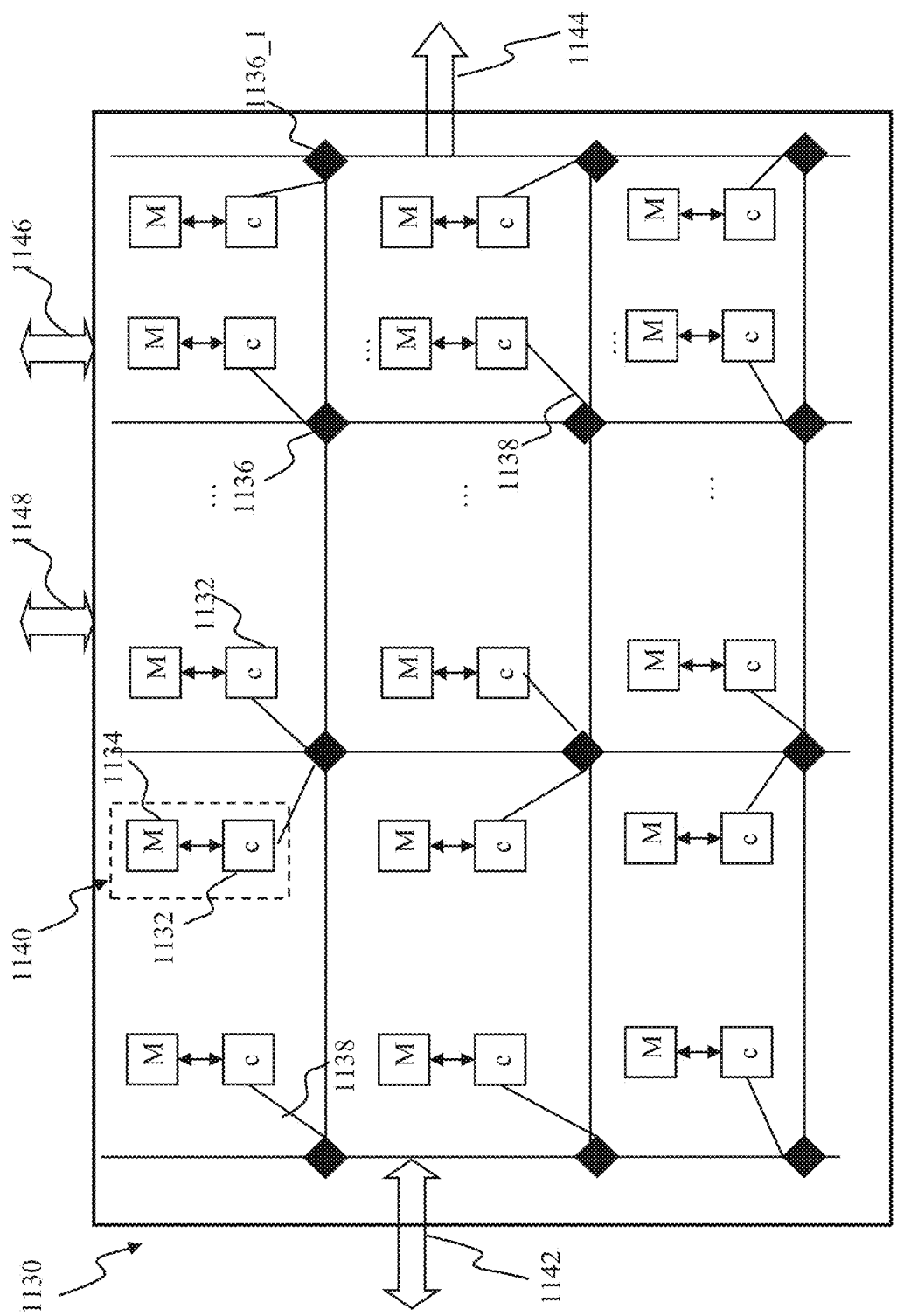
FIG. 11C is a block diagram illustrating a hierarchical neuromorphic computerized system architecture useful with event driven update mechanism in a spiking network, in accordance with one or more implementations.

FIG. 11C illustrates implementations of a shared bus neuromorphic computerized system comprising micro-blocks 1140, described with respect to FIG. 11B, supra, coupled to a shared interconnect. The apparatus 1145 of FIG. 11C utilizes one (or more) shared bus(es) 1146 in order to interconnect micro-blocks 1140 with one another.

Figure 11D:
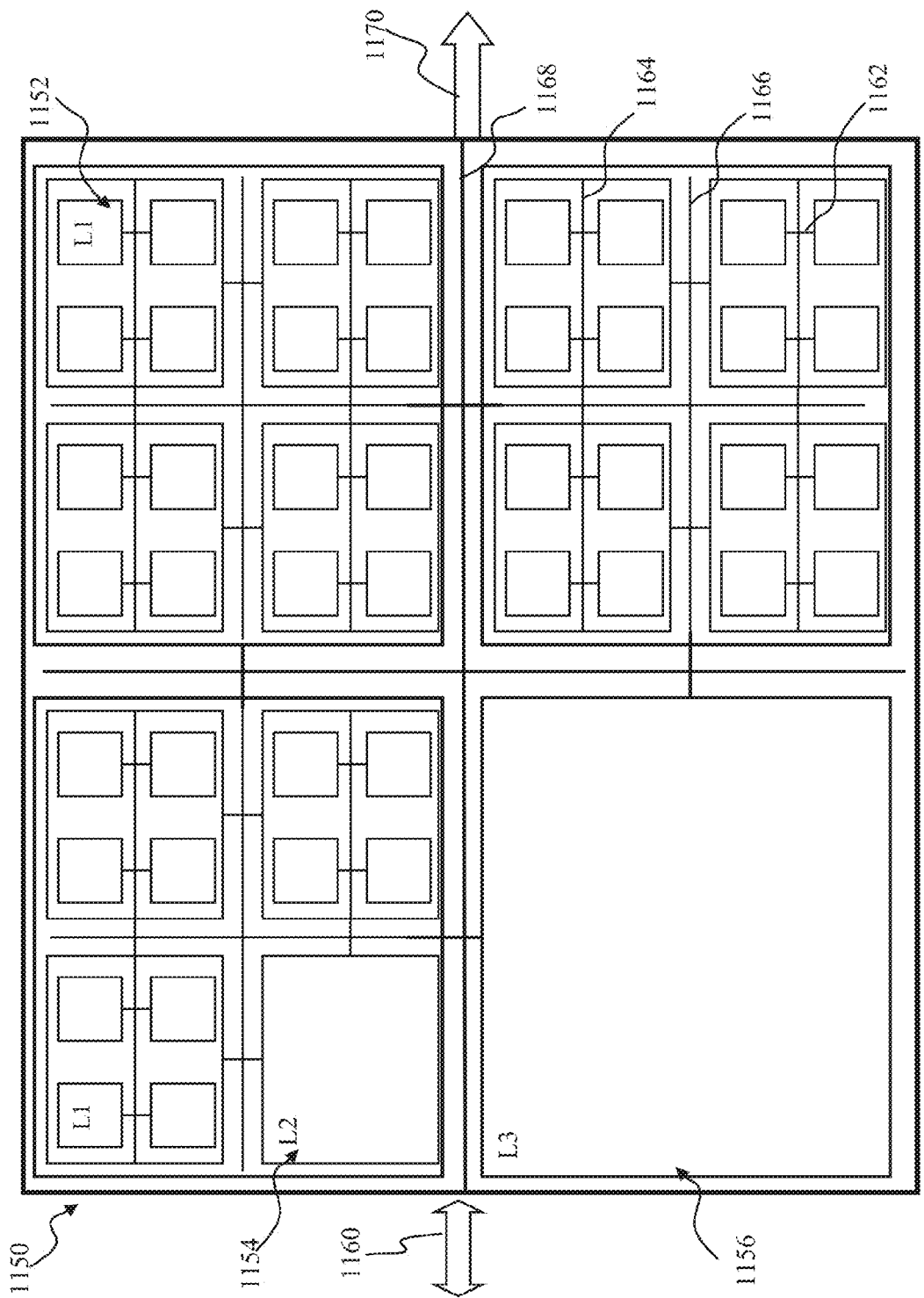
FIG. 11D is a block diagram illustrating cell-type neuromorphic computerized system architecture useful event driven update mechanism in a spiking network, in accordance with one or more implementations.

FIG. 11D illustrates one implementation of cell-based neuromorphic computerized system architecture configured to implement event-drive update mechanism in a spiking network. The neuromorphic system 1150 of FIG. 11D may comprise a hierarchy of processing blocks (cells block). In some implementations, the lowest level L1 cell 1152 of the apparatus 1150 may comprise logic and memory, and may be configured similar to the micro block 1140 of the apparatus shown in FIG. 11B. A number of cell blocks may be arranges in a cluster and communicate with one another a local interconnects 1162, 1164. Individual ones of such clusters may form a higher-level cell, e.g., cell L2, denoted as 1154 in FIG. 11d. Similarly, several L2 clusters may communicate with one another via a second-level interconnect 1166 and form a super-cluster L3, denoted as 1156 in FIG. 11D. The super-clusters 1154 may for example communicate via a third level interconnect 1168, and may form a next level cluster, and so on. It will be appreciated by those skilled in the arts that the hierarchical structure of the apparatus 1150, comprising a given number (e.g., four) cells per level, is merely one exemplary implementation, and other implementations may comprise more or fewer cells per level, and/or fewer or more levels, as well as yet other types of architectures.

Different cell levels (e.g., L1, L2, L3) of the exemplary apparatus 1150 of FIG. 11D may be configured to perform functionality with various levels of complexity. In one implementation, different L1 cells may process in parallel different portions of the visual input (e.g., encode different frame macro-blocks), with the L2, L3 cells performing progressively higher-level functionality (e.g., edge detection, object detection). Different L2, L3 cells may perform different aspects of operating for example a robot, with one or more L2/L3 cells processing visual data from a camera, and other L2/L3 cells operating a motor control block for implementing lens motion when e.g., tracking an object, or performing lens stabilization functions.

The neuromorphic apparatus 1150 may receive input (e.g., visual input) via the interface 1160. In one or more implementations, applicable for example to interfacing with a computerized spiking retina or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform some or all of the I/O functionality using single I/O block (not shown).

In some implementations, the apparatus 1150 may be configured to provide external input to the one or more blocks 1152, 1154, 1156. In one or more implementations, the external signal may comprise training input received by the apparatus via the interface 1160.

In one or more implementations, one or more portions of the apparatus 1150 may be configured to operate one or more learning rules, as described for example in owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

The apparatus 1150, in one or more implementations, may interface to external fast response memory (e.g., RAM) via high bandwidth memory interface (not shown), thereby enabling storage of intermediate network operational parameters (e.g., spike timing and/or other parameters). The apparatus 1150 may interface to external slower memory (e.g., flash, or magnetic (hard drive)) via lower bandwidth memory interface (not shown), in order to facilitate program loading, operational mode changes, and retargeting, where network node and connection information for a current task may be saved for future use and flushed, and a previously stored network configuration may be loaded in its place.

Event driven update mechanism of the disclosure may advantageously enable, inter alia, flexible network updates.

In some implementations, dendritic events may be used to perform timely plasticity updates of input connections in reinforcement learning applications in response to a reward signal. In some implementations, axonic events may be used to perform post-synaptic response delivery to desired targets and/or outgoing connection updates. In some implementations, custom events may enable custom update rules, such as, for example, enable update of a portion of neuron connections, for example, using a dendritic update of the connections that interface to a motor control portion of a robotic apparatus, while allowing other connection (e.g., that process visual sensor data) to be updated in accordance with a standard spike response event.

Contrast with the prior art approaches, the use, for example, of dendritic and axonic events of the disclosure may decouple plasticity updates from post-synaptic response delivery. Accordingly, weights of the incoming synapses may be changed upon receipt of teaching spikes by the neuron without affecting the internal state (excitability) and/or the output of the neuron.

Such functionality may advantageously enable more accurate control of network learning. By way of illustration in one motor control application, frequent (e.g., 1-100 Hz) dendritic events may be utilized in order to increase controller relearning speed. Once the controller performance reaches the desired level (e.g., characterized by a performance measure) an axonic event may be used in order to issue motor command to the motor. Such separation of the reward driven updates and performance driven responses may advantageously eliminate excessive network output to the plant (e.g., the motor controller) increase plant longevity.

It is appreciated by those skilled in the arts that above implementation are exemplary, and the framework of the technology may be equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the present innovation may be useful in a variety of devices including without limitation prosthetic devices, autonomous and robotic apparatus, and other electromechanical devices requiring sensory processing functionality Examples of such robotic devises include one or more of manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), and/or other robotic devices.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure may be applicable to a wide assortment of applications including computer human interaction (e.g., recognition of gestures, voice, posture, face, and/or other applications), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence may be processed to produce an estimate of the object position (and hence velocity) either at individual points in the image or in the 3D scene, or even of the camera that produces the images. Examples of such tasks may be: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In some implementations, portions of the object recognition system may be embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the technology may be described in terms of a specific sequence of steps of a method, these descriptions are only illustrative of the broader methods of the technology, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the technology disclosed and claimed herein.

While the above detailed description has shown, described, and pointed out novel features of the technology as applied to various implementations, it will be understood that various omissions, substitutions, and changes in the form and details of the device or process illustrated may be made by those skilled in the art without departing from the technology. The foregoing description is of the best mode presently contemplated of carrying out the technology. This description is in no way meant to be limiting, but rather should be taken as illustrative of the general principles of the technology. The scope of the technology should be determined with reference to the claims.

What is claimed is:

1. A computer-implemented method of operating an artificial neuron having an input connection and an output connection, the method being performed by one or more processors configured to execute computer program modules, the method comprising:

providing a first event of a first event type, the first event based on an external signal provided to the neuron via an interface configured separate from the input connection, the external signal provided based on a neuron performance metric, the first event being configured to effectuate an update of a plasticity of the input connection independent of delivery of a response of the neuron, the plasticity of the input connection being used to update a parameter associated with the input connection, the update characterized by a time period; and providing a second event of a second event type, the second event being configured to effectuate delivery of the response of the neuron via the output connection, the second event type being different than the first event type.

2. The method of claim 1, wherein
the parameter comprises input connection weight.

3. The method of claim 2, wherein:
the input connection is configured to provide a feed-forward stimulus to the neuron;
the neuron is operable in accordance with a learning process configured to produce a target outcome; and
the external signal comprises a reinforcement signal configured based on whether the response is within a pre-determined range from the target outcome.

4. The method of claim 3, wherein:
the feed-forward stimulus comprises a plurality of spikes characterized by an inter spike interval (ISI) comprising an interval between individual ones of the plurality of spikes; and
the time period exceeds the ISI determined for consecutive individual ones of the plurality of spikes.

5. The method of claim 1, wherein the external signal is configured to cause the one or more events of the first event type independently from the one or more events of the second event type.

6. The method of claim 1, wherein a given event of the first event type is configured to be triggered independently from a given event of the second event type so as to enable a response-free time interval subsequent to the given event of the first event type being triggered.

7. The method of claim 6, wherein:
a modification of input connection weights is characterized by a plasticity time window; and
the response-free time interval is configured in excess of the plasticity time window.

8. The method of claim 1, wherein the input connection is configured to provide feed-forward stimulus to the neuron.

9. The method of claim 1, wherein the plasticity update of the input connection is configured based on a time at which the external signal is provided.

10. The method of claim 9, wherein:
the feed-forward stimulus comprises at least one spike; and
the plasticity update is further configured based on a time associated with the at least one spike.

11. The method of claim 9, wherein:
the plasticity update comprises adjusting a probability of data transmission through the input connection, the adjusting being based on one or both of (i) a time interval between the providing of the external signal and a neuron response time, or (ii) a time interval between the at least one spike and the neuron response time; and
the neuron response time is associated with a response of the neuron generated prior to the external signal being provided.

12. The method of claim 9, wherein:
the plasticity update comprises adjusting efficacy associated with the input connection determined based on one or both of (i) a time interval between the providing of the external signal and the neuron response time, or (ii) a time interval between the at least one spike and the neuron response time; and
the neuron response time is associated with a response of the neuron generated prior to the external signal being provided.

13. The method of claim 9, wherein:
the plasticity update comprises adjusting (a) communication delay or (b) a weight associated with the input connection, the adjusting being determined based on one or both of (i) a time interval between the providing of the external signal and the neuron response time, or (ii) a time interval between the at least one spike and the neuron response time; and
the neuron response time is associated with a response of the neuron generated prior to the external signal being provided.

14. The method of claim 1, wherein:
the neuron is configured to operate in accordance with a neuron process characterized by a state, the state having a response generation threshold associated therewith, and the response generation threshold being associated with the neuron generating the response;
the response is based on one or more input spikes provided to the neuron via the input connection to the neuron; and
the response is characterized by the state breaching the response generation threshold.

15. The method of claim 14, further comprising:
storing a present value of the state in a memory location associated with the neuron;
wherein the one or more events of the first event type are configured to provide the input connection with read-only access to the memory location.

16. The method of claim 14, wherein:
the first event is configured based on one or more of: (i) a timer expiration; (ii) a buffer overflow signal; or (iii) a trigger associated with the neuron process; and
a buffer is configured to store a time history of the one or more input spikes.

17. The method of claim 14, wherein the one or more events of the first event type are configured to provide the input connection with read-only access to the time history of the one or more input spikes.

18. The method of claim 17, wherein the one or more events of the first event type are further configured to provide the input connection with read-only access to a time history of the neuron response.

19. The method of claim 1, further comprising providing a third event of a third event type, the third event being associated with a pre-synaptic event, the pre-synaptic event causing the plasticity update of the input connection.

20. The method of claim 1, wherein the first event and the second event are configured to be provided contemporaneously with one another.

21. The method of claim 1, wherein the second event triggers a plasticity update of the output connection.

22. A computer-implemented method of reinforcement learning for an artificial neuron network, the method being performed by one or more processors configured to execute computer program modules, the method comprising:
operating the neuron in accordance with a reinforcement learning process, the reinforcement learning process being configured to generate an output based on an input signal and reinforcement signal, the reinforcement signal provided to the neuron based on neuron performance; and
based on the reinforcement signal, selectively triggering a first event of a first event type, the first event being configured to cause a plasticity update of a connection of the neuron;

wherein:
the selective triggering is configured to enable application of the plasticity update independent from the generation of the output; and
the input signal conveys information about environment external to the neuron.

23. The method of claim 22, wherein:
the connection is configured to provide the input to the neuron;
the reinforcement learning process is configured to achieve a target outcome; and
the reinforcement signal is based on a measure characterizing discrepancy between the desired outcome and the output.

24. The method of claim 23, wherein the reinforcement signal comprises a negative reward determined based on the discrepancy being outside a predetermined value.

25. A computerized neuron network system configured to implement an event-based update in the network, the system comprising:
one or more processors configured to execute computer program modules, the execution of the computer program modules causes the one or more processors, based on a first event, to update a first and a second interface respectively associated with a first and a second neuron of the network;
wherein the first event is characterized by an absence of a first and a second output being respectively generated by the first and the second neuron responsive to the event and being based on an external signal provided to the first and second neuron based on a network performance metric.

26. The system of claim 25, wherein the execution of the computer program modules causes the one or more processors to generate a second event configured to cause delivery of one or both the first output or the second output via one or both of the first output interface or the second output interface associated, respectively, with the first and the second neuron.

27. The system of claim 25, wherein the execution of the computer program modules causes the one or more processors to generate a custom event configured to execute a user-defined update of one or both of the first neuron or the second neuron.

28. An apparatus for operating an artificial neuron having an input connection and an output connection, the apparatus comprising:
means for providing a first event of a first event type, the first event based on an external signal provided to the neuron via an interface configured separate from the input connection, the external signal provided based on a neuron performance metric, the first event being configured to effectuate an update of a plasticity of the input connection independent of delivery of a response of the neuron, the plasticity of the input connection being used to update a parameter associated with the input connection, the update characterized by a time period; and
means for providing a second event of a second event type, the second event being configured to effectuate delivery of the response of the neuron via the output connection, the second event type being different than the first event type.

29. A non-transitory computer readable medium having encoded thereon program code for operating an artificial neuron having an input connection and an output connection, the program code being executed by a processor and comprising:
program code to provide a first event of a first event type, the first event based on an external signal provided to the neuron via an interface configured separate from the input connection, the external signal provided based on a neuron performance metric, the first event being configured to effectuate an update of a plasticity of the input connection independent of delivery of a response of the neuron, the plasticity of the input connection being used to update a parameter associated with the input connection, the update characterized by a time period; and
program code to provide a second event of a second event type, the second event being configured to effectuate delivery of the response of the neuron via the output connection, the second event type being different than the first event type.

* * * * *